United States Patent
Takesue et al.

(10) Patent No.: US 12,370,806 B2
(45) Date of Patent: Jul. 29, 2025

(54) IMAGE PROCESSING APPARATUS, IMAGE PROCESSING METHOD, NON-TRANSITORY COMPUTER-READABLE STORAGE MEDIUM, AND IMAGE FORMING APPARATUS

(71) Applicant: CANON KABUSHIKI KAISHA, Tokyo (JP)

(72) Inventors: Naoya Takesue, Tokyo (JP); Hisashi Ishikawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 18/101,832

(22) Filed: Jan. 26, 2023

(65) Prior Publication Data

US 2023/0166527 A1   Jun. 1, 2023

Related U.S. Application Data

(63) Continuation of application No. PCT/JP2021/028092, filed on Jul. 29, 2021.

(30) Foreign Application Priority Data

Jul. 30, 2020 (JP) ................... 2020-129486
Jul. 28, 2021 (JP) ................... 2021-123567

(51) Int. Cl.
   *B41J 2/045* (2006.01)
   *B41J 2/21* (2006.01)
(52) U.S. Cl.
   CPC ......... *B41J 2/2146* (2013.01); *B41J 2/04586* (2013.01)
(58) Field of Classification Search
   CPC .. B41J 2/2146; B41J 2/04586; B41J 2/16529; B41J 29/393; B41J 2029/3935;
   (Continued)

(56) References Cited

U.S. PATENT DOCUMENTS

| 9,186,887 B1 | 11/2015 | Mantell |
| 2011/0084996 A1 | 4/2011 | Hirato et al. |
| 2019/0291461 A1 | 9/2019 | Neeb et al. |

FOREIGN PATENT DOCUMENTS

| JP | 11-165407 A | 6/1999 |
| JP | 2006-240232 A | 9/2006 |

(Continued)

OTHER PUBLICATIONS

International Search Report dated Oct. 5, 2021, in International Application No. PCT/JP2021/028092.

(Continued)

*Primary Examiner* — Kristal Feggins
(74) *Attorney, Agent, or Firm* — Venable LLP

(57) ABSTRACT

An image processing apparatus for generating image data for recording in a recording apparatus including a recording unit having a plurality of nozzles discharging ink, includes a converting unit which converts, based on characteristic information according to a characteristic of each nozzle included in the recording unit, image data corresponding to an input print job into image data to be used for recording by the recording unit and a control unit which executes one of a plurality of correction processes based on image data obtained by reading an image recorded by the recording unit. The plurality of correction processes include first correction processing that is performed after the recording of the image according to the print job is stopped, and second correction processing that is performed without stopping the recording of the image according to the print job.

6 Claims, 49 Drawing Sheets

(58) Field of Classification Search
CPC .... B41J 2/2139; B41J 2/2142; B41J 2/04505; B41J 2/04508; B41J 2/04526; B41J 2/04538; B41J 2/0454; B41J 2/04535; B41J 2/04553; B41J 2/04555; B41J 2/04556; B41J 2/04558; B41J 2/04563; B41J 2/04565; B41J 2/04561; B41J 2/0456; B41J 2/04568; B41J 2/04571; B41J 2/04591; B41J 19/147; B41J 19/145; B41J 11/42; B41J 2/0459; B41J 2/12; B41J 2/2135; B41J 2/16579; B41J 2/16517; B41J 2/165; H04N 1/4078; H04N 1/6036; H04N 1/4015
See application file for complete search history.

(56) References Cited

FOREIGN PATENT DOCUMENTS

| | | |
|---|---|---|
| JP | 2012-126111 A | 7/2012 |
| JP | 2015-047725 A | 3/2015 |
| JP | 2015-160352 A | 9/2015 |
| JP | 2017-094579 A | 6/2017 |
| JP | 2017-213698 A | 12/2017 |
| JP | 2019-034480 A | 3/2019 |

OTHER PUBLICATIONS

Extended European Search Report dated Sep. 20, 2024, in European Patent Application No. 21848787.4.

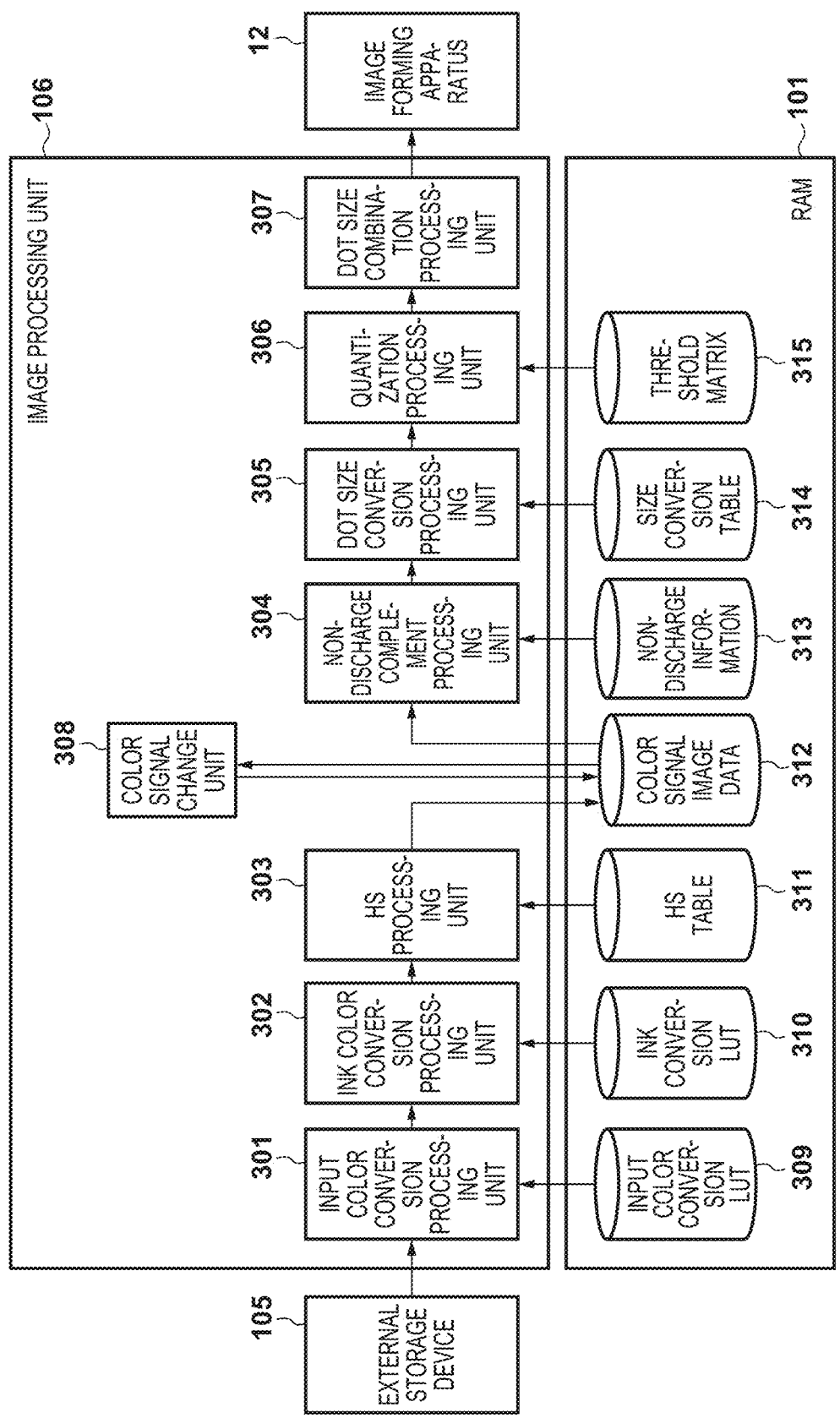

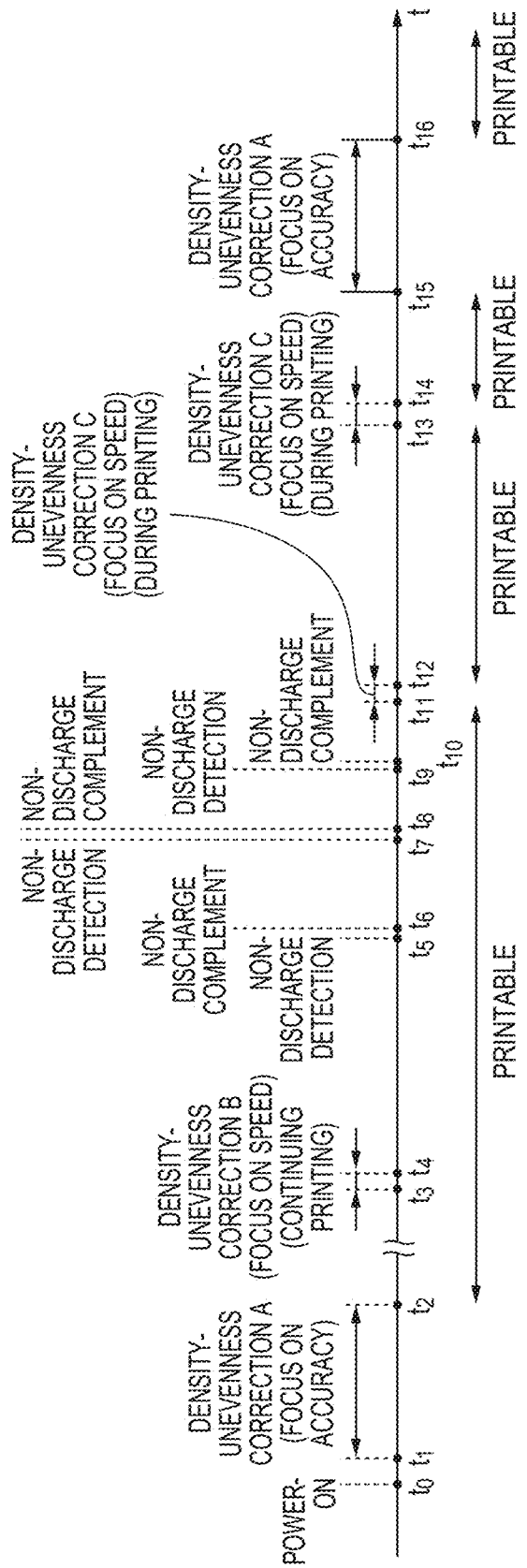

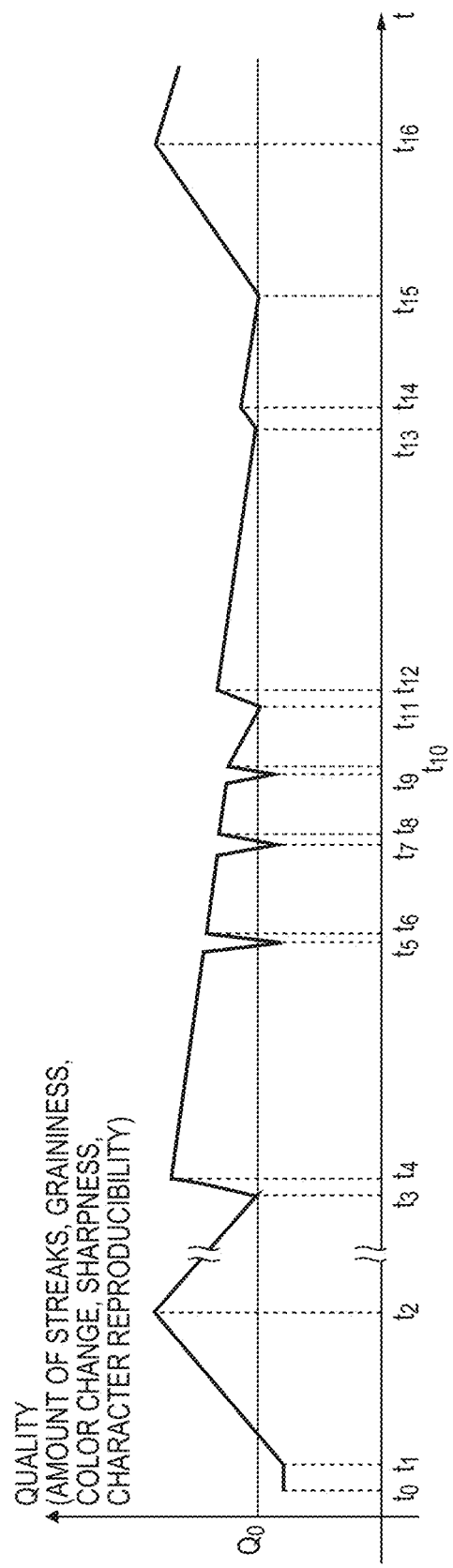

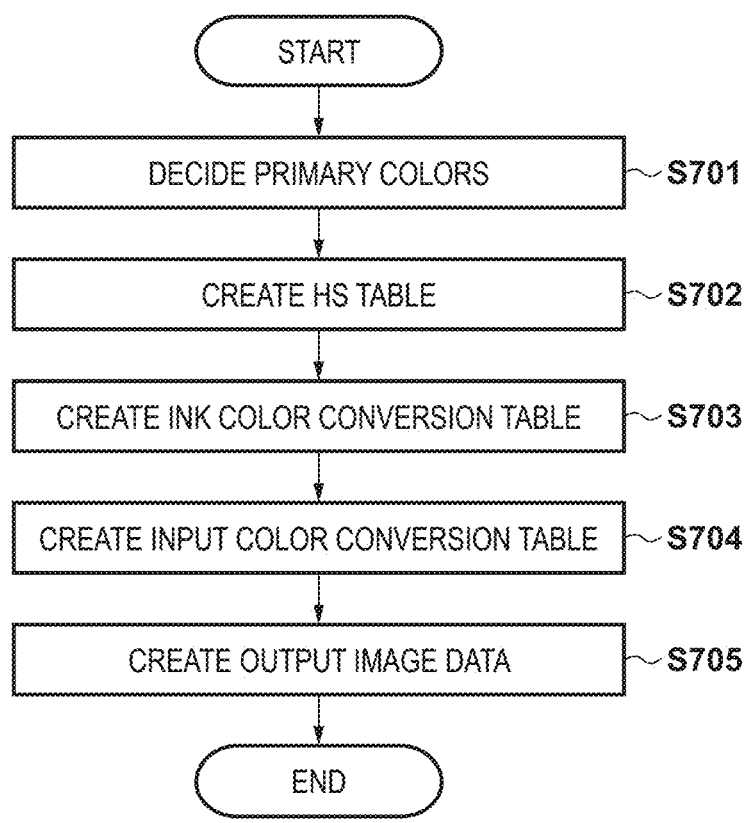

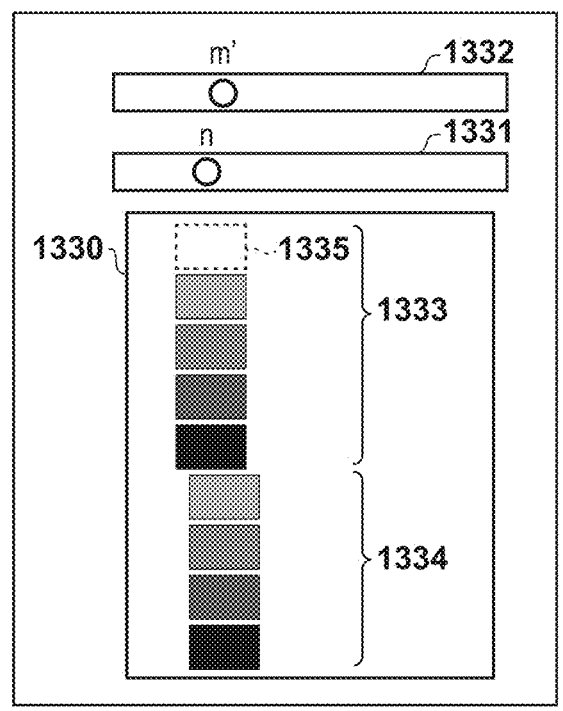
F I G. 13D
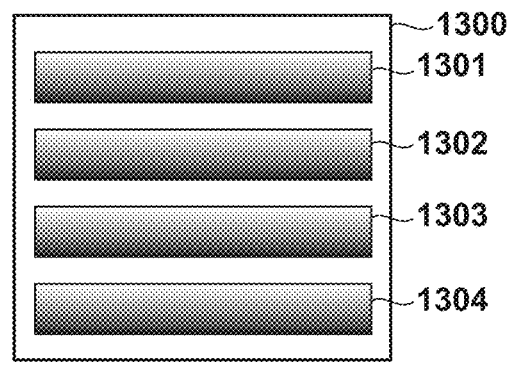
F I G. 13E

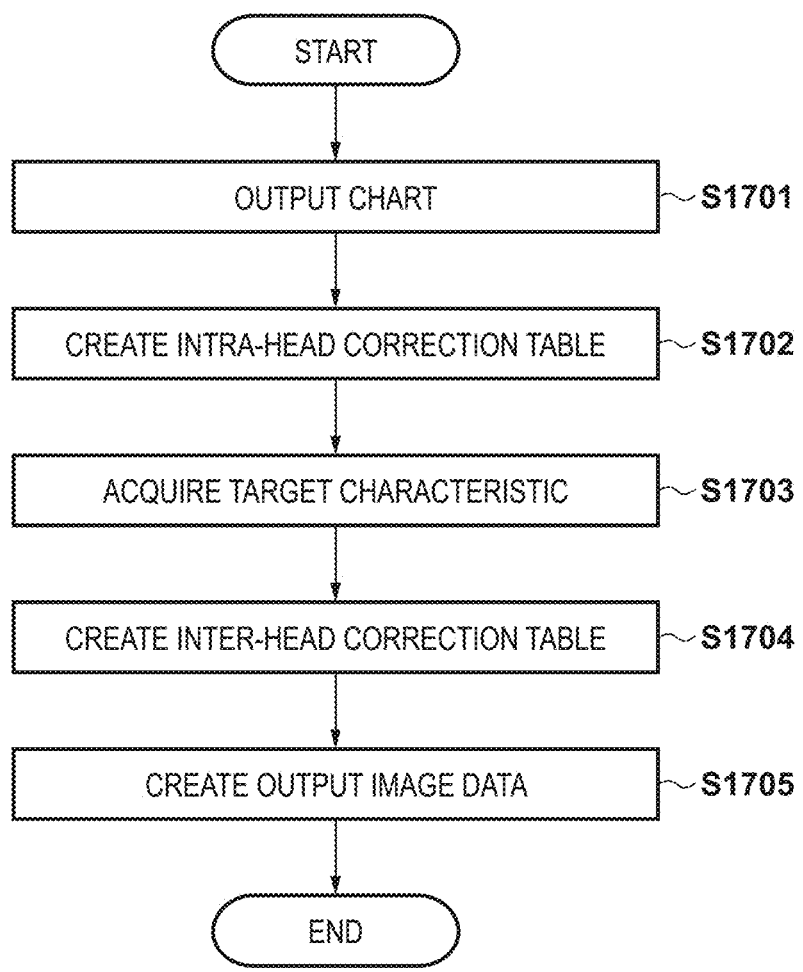

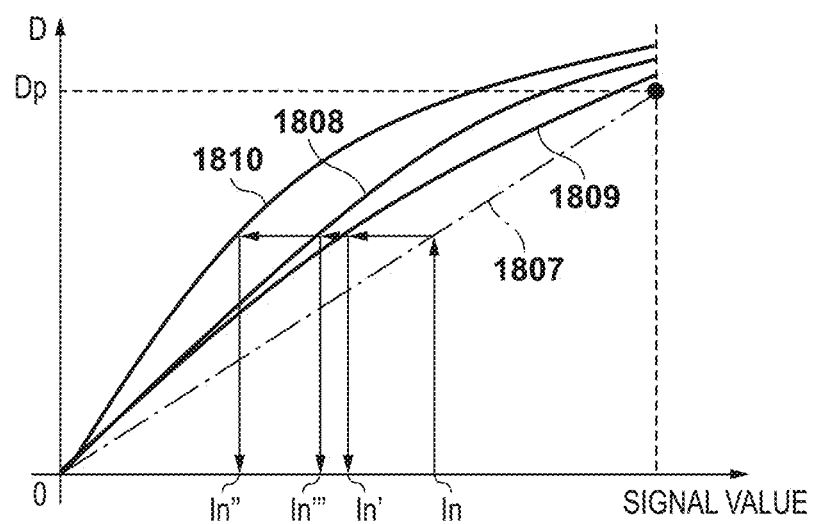
F I G. 18C

F I G. 19A

| R | G | B | X | Y | Z |
|---|---|---|---|---|---|
| 0 | 0 | 0 | 0.013 | 0.015 | 0.064 |
| 0 | 0 | 17 | 0.012 | 0.009 | 0.047 |
| 0 | 0 | 34 | 0.095 | 0.057 | 0.080 |
| ⋮ | ⋮ | ⋮ | ⋮ | ⋮ | ⋮ |
| 0 | 0 | 255 | 0.225 | 0.050 | 0.011 |
| 0 | 17 | 0 | 0.060 | 0.055 | 0.050 |
| 0 | 17 | 17 | 0.065 | 0.125 | 0.133 |
| ⋮ | ⋮ | ⋮ | ⋮ | ⋮ | ⋮ |
| 0 | 255 | 255 | 0.472 | 0.771 | 0.751 |
| 17 | 0 | 0 | 0.035 | 0.063 | 0.037 |
| 17 | 0 | 17 | 0.057 | 0.041 | 0.096 |
| ⋮ | ⋮ | ⋮ | ⋮ | ⋮ | ⋮ |
| 255 | 255 | 238 | 0.911 | 0.941 | 0.980 |
| 255 | 255 | 255 | 0.905 | 0.903 | 0.936 |

F I G. 19B

| INPUT SIGNAL VALUE | NOZZLE 0 | NOZZLE 1 | ... | NOZZLE 5000 |
|---|---|---|---|---|
| 0 | 0 | 0 | ... | 0 |
| 17 | +1.5 | −0.5 | ... | +0.1 |
| 34 | +2.6 | −1.2 | ... | +0.4 |
| ⋮ | ⋮ | ⋮ | ⋮ | ⋮ |
| 255 | +0.4 | +0.1 | ... | −0.5 |

F I G. 19C

| INPUT SIGNAL VALUE | LEFT HEAD | CENTER HEAD | RIGHT HEAD |
|---|---|---|---|
| 0 | 0 | 0 | 0 |
| 17 | 8.1 | 7 | 7.9 |
| 34 | 22.3 | 15.4 | 20.0 |
| ⋮ | ⋮ | ⋮ | ⋮ |
| 255 | 235.8 | 162.9 | 192.1 |

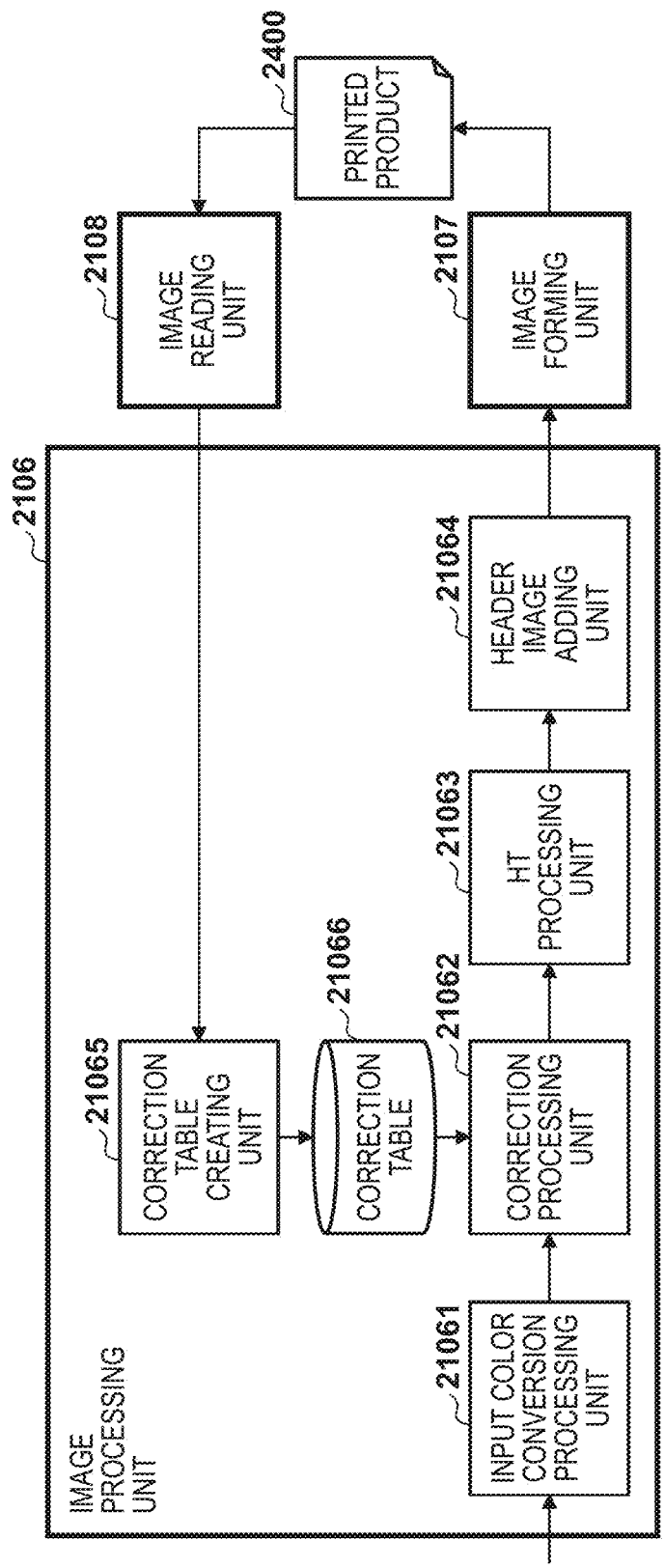

FIG. 24

| INPUT COLOR SIGNAL | PRINTHEAD 2201 (K) | | | PRINTHEAD 2202 (C) | | | PRINTHEAD 2203 (M) | | | PRINTHEAD 2204 (Y) | | |
|---|---|---|---|---|---|---|---|---|---|---|---|---|
| | 2201a | 2201b | 2201c | 2202a | 2202b | 2202c | 2203a | 2203b | 2203c | 2204a | 2204b | 2204c |
| 0 | 0 | 0 | 0 | 0 | 0 | 0 | 0 | 0 | 0 | 0 | 0 | 0 |
| 16 | 14 | 16 | 20 | 15 | 16 | 12 | 10 | 16 | 13 | 22 | 16 | 15 |
| 32 | 28 | 32 | 39 | 31 | 32 | 25 | 20 | 32 | 26 | 46 | 32 | 30 |
| ... | ... | ... | ... | ... | ... | ... | ... | ... | ... | ... | ... | ... |
| 240 | 221 | 240 | 255 | 238 | 240 | 185 | 148 | 240 | 197 | 255 | 240 | 232 |
| 255 | 236 | 255 | 255 | 250 | 255 | 202 | 159 | 255 | 211 | 255 | 255 | 252 |

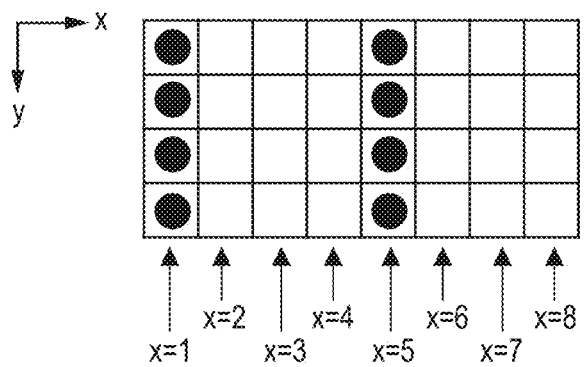
F I G. 29A
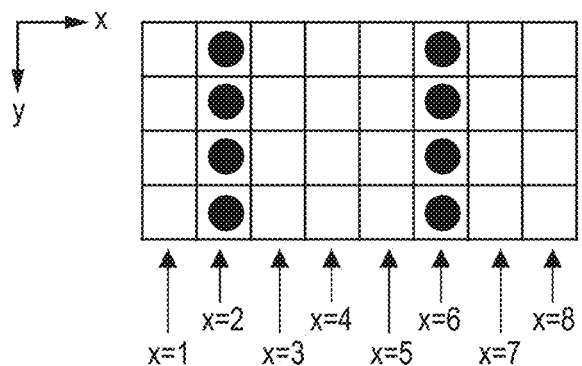
F I G. 29B
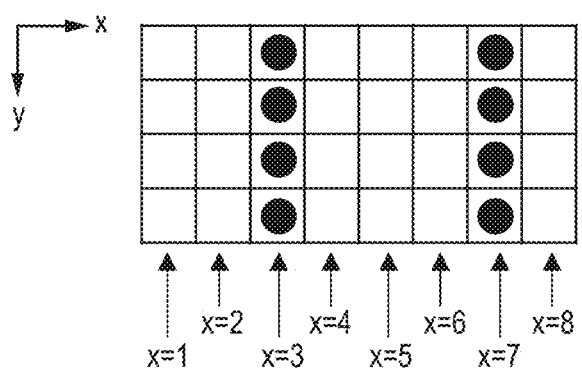
F I G. 29C
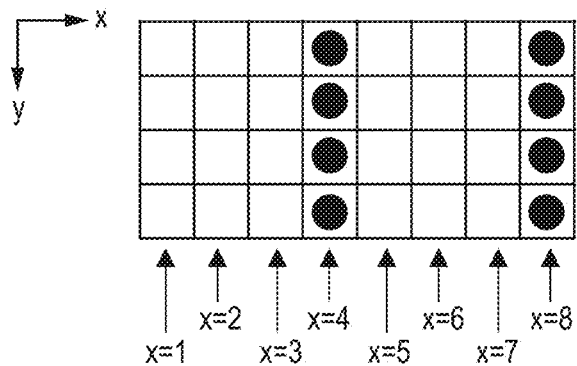
F I G. 29D

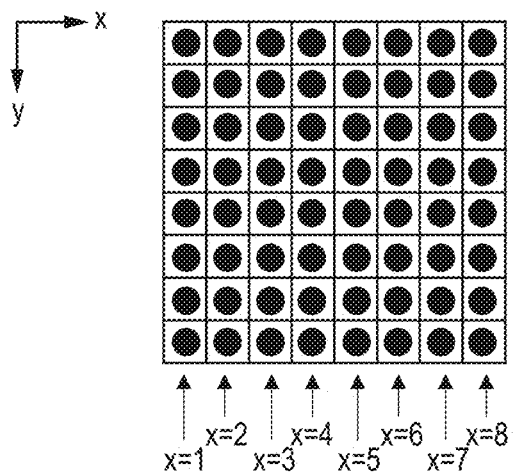
F I G. 30A
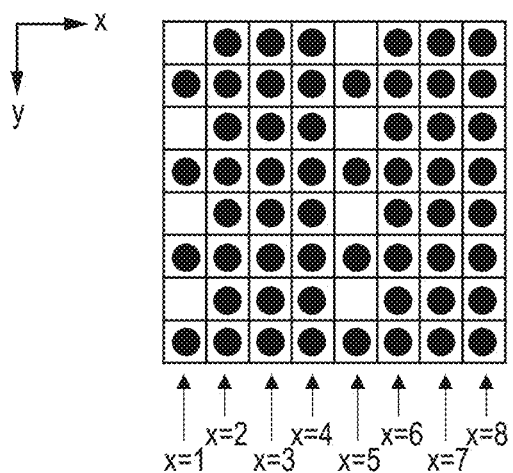
F I G. 30B
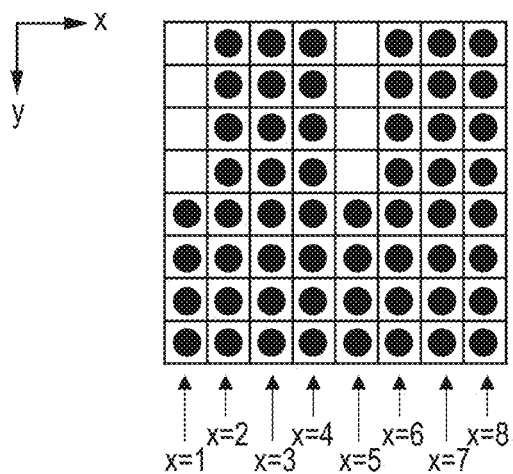
F I G. 30C

IMAGE PROCESSING APPARATUS, IMAGE PROCESSING METHOD, NON-TRANSITORY COMPUTER-READABLE STORAGE MEDIUM, AND IMAGE FORMING APPARATUS

CROSS-REFERENCE TO RELATED APPLICATIONS

This application is a Continuation of International Patent Application No. PCT/JP2021/028092, filed Jul. 29, 2021, which claims the benefit of Japanese Patent Application No. 2020-129486, filed Jul. 30, 2020, and Japanese Patent Application No. 2021-123567, filed Jul. 28, 2021, all of which are hereby incorporated by reference herein in their entirety.

BACKGROUND OF THE INVENTION

Field of the Invention

The present invention relates to an image processing apparatus, an image processing method, a non-transitory computer-readable storage medium, and an image forming apparatus.

Background Art

A printhead used in an ink-jet recording apparatus is provided with a plurality of nozzles configured to discharge ink. Due to a reason such as errors in manufacturing, the discharge amount may vary between the nozzles. Such a variation in the discharge amount causes density-unevenness in a recorded image. Conventionally, the HS (Head Shading) technique is known as processing of reducing such density-unevenness. HS processing is processing of increasing or reducing the number or size of finally recorded ink dots in accordance with information (nozzle characteristic) concerning the discharge amount of each nozzle, and this reduces density-unevenness generated in a recorded image. When acquiring the nozzle characteristic, a method of printing a patch image (for example, an even image for each tone) on a sheet surface and acquiring/analyzing the image by a scanner is generally used.

However, it is known that the characteristic of a nozzle changes depending on recording environments such as ink adhesion to the periphery of a nozzle, aging of a piezoelectric element or heater configured to control ink discharge, and temperature/humidity. To cope with such a change of the nozzle characteristic, there is also known a technique of continuously reducing density-unevenness by updating the nozzle characteristic at a predetermined interval. Patent Literature 1 discloses a technique of judging the necessity of density-unevenness correction for each ink color and each dot size using a determination chart and reacquiring only a characteristic that needs density-unevenness correction, thereby shortening the time necessary for density-unevenness reduction processing.

CITATION LIST

Patent Literature

PL1: Japanese Patent Laid-Open No. 2015-160352

In the above-described patent literature 1, two types of charts, that is, a determination chart and a correction chart are necessary. Also, for a color judged to need correction, uniform correction processing is performed independently of the cause of density-unevenness, the area of occurrence, and the like. However, density-unevenness of a certain type can sometimes be reduced not by uniform processing but by simple processing according to the cause or area. In addition, since the determination chart used to judge the necessity of density-unevenness correction is necessary, and correction is done for all tones/nozzles at the time of correction, the productivity lowers.

SUMMARY OF THE INVENTION

The present invention provides a technique of performing necessary correction processing for a temporal change of density-unevenness, thereby suppressing lowering of image quality and productivity.

According to an aspect of the invention, there is provided an image processing apparatus for generating image data for recording in a recording apparatus including a recording unit including a plurality of nozzles configured to discharge ink, comprising: a converting unit configured to convert, based on characteristic information according to a characteristic of each nozzle included in the recording unit, image data corresponding to an input print job into image data to be used for recording by the recording unit; and a control unit configured to execute one of a plurality of correction processes based on image data obtained by reading an image recorded by the recording unit, wherein the plurality of correction processes include first correction processing that is performed after the recording of the image according to the print job is stopped, and second correction processing that is performed without stopping the recording of the image according to the print job.

Further features of the present invention will become apparent from the following description of exemplary embodiments with reference to the attached drawings.

BRIEF DESCRIPTION OF THE DRAWINGS

FIG. 3 is a view showing the functional configuration of an image processing unit.

FIG. 4A is a view showing the outline of density-unevenness correction processing.

FIG. 4B is a view showing the outline of density-unevenness correction processing.

FIG. 7 is a flowchart showing static correction processing.

FIG. 13D is a view showing examples of output charts.

FIG. 13E is a view showing examples of output charts.

FIG. 17 is a flowchart showing static correction processing.

FIG. 18C is a view showing the outline of correction value calculation processing.

FIG. 19A is a view showing examples of correction tables.

FIG. 19B is a view showing examples of correction tables.

FIG. 19C is a view showing examples of correction tables.

FIG. 23 is a view showing the functional configuration of an image processing unit according to the fourth embodiment.

FIG. 24 is a view showing an example of a correction table according to the fourth embodiment.

FIG. 29A is a view showing an example of an HT pattern according to the fourth embodiment.

FIG. 29B is a view showing an example of an HT pattern according to the fourth embodiment.

FIG. 29C is a view showing an example of an HT pattern according to the fourth embodiment.

FIG. 29D is a view showing an example of an HT pattern according to the fourth embodiment.

FIG. 30A is a view showing an example of a discharge pattern in a preliminary discharge region according to the fourth embodiment.

FIG. 30B is a view showing an example of a discharge pattern in a preliminary discharge region according to the fourth embodiment.

FIG. 30C is a view showing an example of a discharge pattern in a preliminary discharge region according to the fourth embodiment.

DESCRIPTION OF THE EMBODIMENTS

Figure 1:
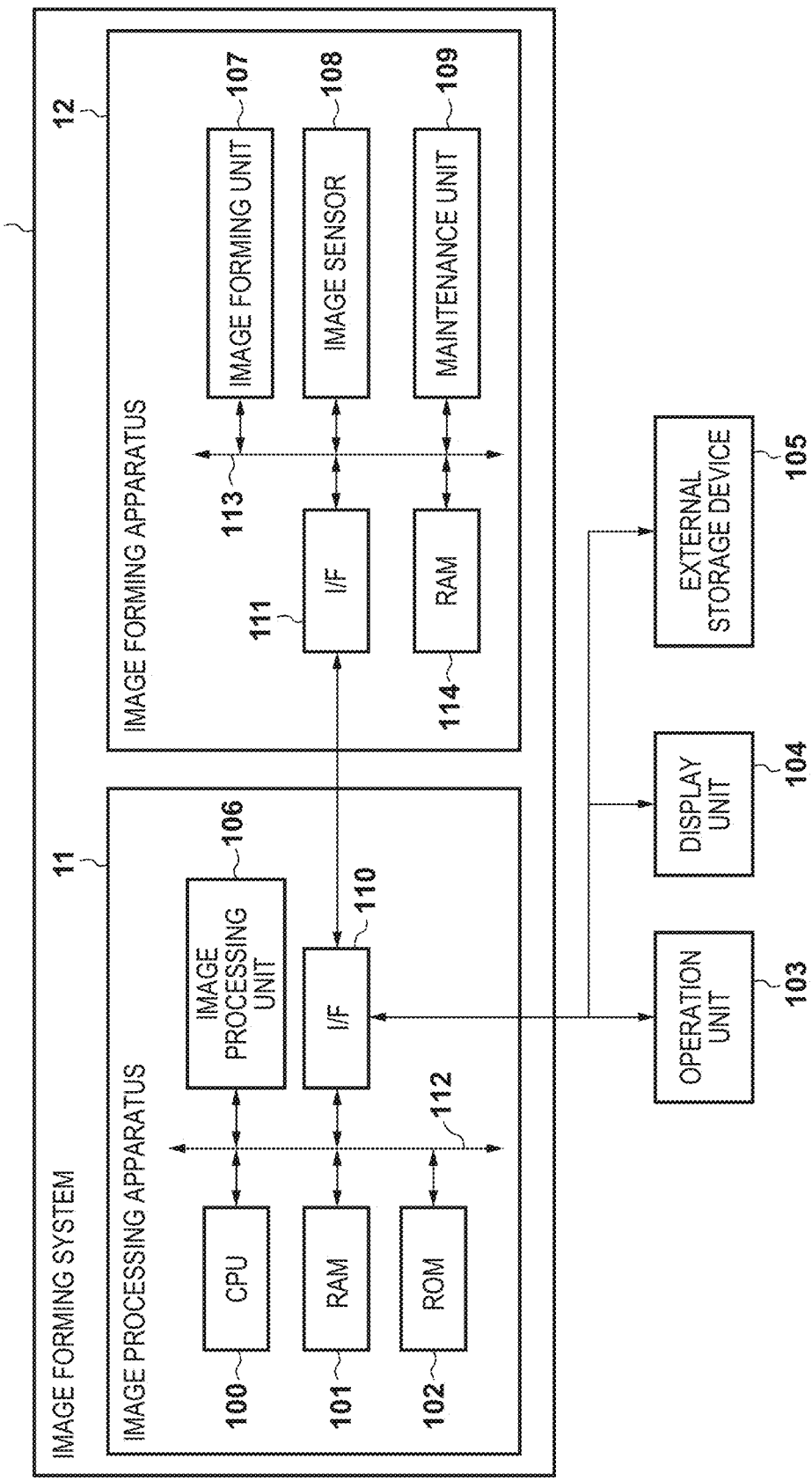
FIG. 1 is a view showing the hardware configuration of an image forming system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Hardware Configuration of Image Forming System>

FIG. 1 is a view showing the hardware configuration of an image forming system 1. The image forming system 1 according to this embodiment includes an image processing apparatus 11 that functions as an image processing controller incorporated in the image forming system, and an image forming apparatus 12 that forms an image on a recording medium using a recording material. The image processing apparatus 11 includes a CPU (Central Processing Unit) 100, a (RAM Random Access Memory) 101, a ROM (Read Only Memory) 102, an image processing unit 106, an I/F (interface) unit 110, and a bus 112. The image forming apparatus 12 includes an image forming unit 107, an image sensor 108, a maintenance unit 109, an I/F (interface) unit 111, a bus 113, and a RAM 114. Also, the image processing apparatus 11 is connected to an operation unit 103, a display unit 104, and an external storage device 105 via the I/F (interface) unit 110. The I/F unit 110 also stores an interface that communicates with a network.

Note that the units in the image processing apparatus 11 and the image forming apparatus 12 are connected to the bus 112 and the bus 113, respectively, and can transmit/receive data via the buses. The units that form the image processing apparatus 11 and the image forming apparatus 12 will be described below.

The CPU 100 executes input data and computer programs stored in the RAM 101 and the ROM 102, thereby controlling the operation of the entire image forming system 1. Note that although a case in which the CPU 100 controls the entire image forming system will be described here as an example, the entire image forming system may be controlled by causing a plurality of pieces of hardware to share processing.

The RAM 101 includes a storage area configured to temporarily store computer programs and data read out from the external storage device 105 and data received from the outside via the I/F unit 110. Also, the RAM 101 is used as a storage area (including the characteristic information of nozzles of a printhead) used by the CPU 100 to execute various kinds of processing, or a storage area used by the image processing unit 106 to execute image processing. The ROM 102 includes a storage area configured to store setting parameters for setting the units in the image forming system, a boot program, and the like.

The image processing unit 106 is implemented as a processor capable of executing a computer program or a dedicated image processing circuit, and executes various kinds of image processing for converting image data input as a print target or image data based on a print job, in accordance with the recording characteristics of nozzles and the like, into recording image data that can be recorded by the image forming apparatus 12. Note that instead of preparing a dedicated processor as the image processing unit 106, the CPU 100 may perform various kinds of image processing as the image processing unit 106.

The I/F unit 110 functions as an interface configured to connect the image processing apparatus 11, the image forming apparatus 12, and external devices. The I/F unit 110 also functions as an interface configured to exchange data with a communication apparatus using infrared communication, a wireless LAN (Local Area Network), or the like, or an interface configured to connect the Internet.

The operation unit 103 is an input device such as a keyboard or a mouse and accepts an operation (instruction) by an operator. That is, the operator can thus input various kinds of instructions to the CPU 100. The display unit 104 is a display device such as a CRT (Cathode Ray Tube) or a liquid crystal screen, and can display the processing result of the CPU 100 as an image, characters, or the like. Note that if the display unit 104 is a touch panel capable of detecting a touch operation, the display unit 104 may function as a part of the operation unit 103.

The external storage device 105 is a mass information storage device represented by a hard disk drive. The external storage device 105 stores computer programs, data, and the like configured to cause the OS (Operating System) or the CPU 100 to execute various kinds of processing. The external storage device 105 also holds temporary data (for example, image data to be input/output, a color conversion table and a threshold matrix used by the image processing unit 106, position information of a non-discharge nozzle that cannot discharge ink, a nozzle characteristic to be used in HS processing, and the like) generated by processing of the units. The computer programs and data stored in the external storage device 105 are appropriately read out under the control of the CPU 100 and stored in the RAM 101 as a target to be processed by the CPU 100.

The I/F unit 111 functions as an interface configured to connect the image forming apparatus 12 to the image processing apparatus 11.

The RAM 114 is used as a storage area configured to temporarily store output image data acquired from the image forming apparatus 12. The image forming unit 107 forms an image on a recording medium using a recording material based on the image data stored in the RAM 114. The image forming unit 107 according to this embodiment is of an ink jet type that forms an image by discharging ink from nozzles onto a recording medium, and includes a recording element array in which a plurality of recording elements capable of discharging ink are arrayed.

Figure 2:
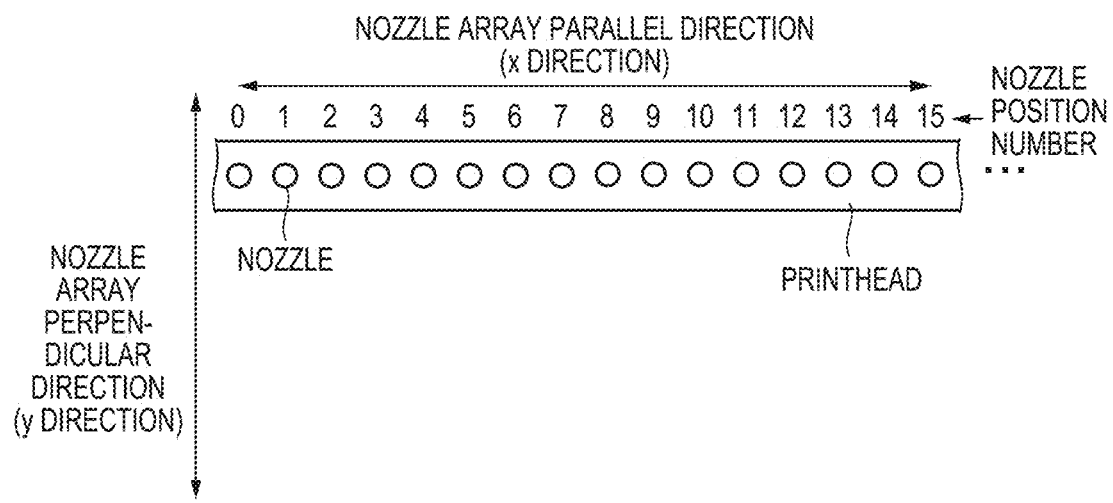
FIG. 2 is a view showing an example of the configuration of a printhead.

FIG. 2 is a view showing an example of the configuration of a printhead in the image forming unit 107. Note that although the printhead typically includes nozzles for four types of inks, that is, cyan (C), magenta (M), yellow (Y), and black (K), only black (K) is shown to simplify the description.

The printhead according to this embodiment is a long line head that covers the whole range of a drawing region in a nozzle array parallel direction (x direction) that is the first direction. The image forming unit 107 generates a drive signal configured to control the printhead based on halftone image data. The printhead generates dots while relatively moving a recording medium such as a recording sheet in a nozzle array perpendicular direction (y direction) that is the second direction perpendicular to the nozzle array parallel direction based on the drive signal, thereby forming an image on the recording medium.

The image sensor 108 includes an image sensor (a line sensor or an area sensor) configured to read or capture a formed image formed on the recording medium by the image forming unit 107, and functions as a means for acquiring non-discharge nozzles and nozzle characteristic from the captured formed image. In this embodiment, the image sensor 108 will be described as an in-line scanner mounted on the printhead. However, an off-line scanner or the like may be used.

The maintenance unit 109 functions as a means for performing a head recovery operation of eliminating nozzle clogging of the line head provided in the image forming unit 107. As the head recovery operation, for example, there is a method of moving the printhead to a position where a waste ink absorber (a sponge or the like) exists and driving the printhead such that it discharges a large quantity of ink. A method of forcibly pushing out ink by applying a pressure to the ink from the ink tank side is also usable. Alternatively, a method of forcibly sucking ink by applying a negative pressure from the outside of the nozzles to eliminate clogging can also be used.

<Functional Configuration of Image Processing Unit 106>

The functional configuration of the image processing unit 106 will be described next with reference to FIG. 3. The image processing unit 106 is formed by an input color conversion processing unit 301, an ink color conversion processing unit 302, an HS processing unit 303, a non-discharge complement processing unit 304, a dot size conversion processing unit 305, a quantization processing unit 306, a dot size combination processing unit 307, and a color signal change unit 308. Note that each component of one pixel of image data handled by the image processing unit 106 is represented by 8 bits (256 tones), and the resolution is the same as the resolution of the nozzle arrangement of the printhead, for example, 1,200 dpi.

The input color conversion processing unit 301 converts input image data from the external storage device 105 into image data corresponding to the color reproduction region of the printer. The input image data is, for example, data representing color coordinates (R, G, B) in color space coordinates such as sRGB that are the expression colors of a monitor. The input color conversion processing unit 301 converts input image data R, G, and B into image data (R', G', B') in the color reproduction region of the printer. For the conversion, a known method such as matrix calculation processing or processing using a three-dimensional LUT (LookUp Table) can be used. In this embodiment, a three-dimensional input color conversion LUT 309 held in the RAM 101 is used, and conversion processing is performed using an interpolation operation together.

The ink color conversion processing unit 302 performs, for the image data converted by the input color conversion processing unit 301, conversion processing of converting the image data into color signals corresponding to a plurality of inks used in the image forming unit 107. For example, if the image forming unit 107 uses black (K), cyan (C), magenta (M), and yellow (Y) inks, the image data of the RGB signals are converted into image data formed by K, C, M, and Y color signals each formed by 8 bits. This color conversion is also performed using a three-dimensional ink conversion LUT 310, like the above-described input color conversion processing unit. Note that as another conversion method, a method such as matrix calculation processing can be used.

The HS processing unit 303 performs correction according to the discharge characteristic of each nozzle of the printhead for the color signal image data converted by the ink color conversion processing unit 302. In this embodiment, HS processing is performed using an HS table 311 generated in advance based on the characteristic of each nozzle. In this embodiment, color signal data 312 after the HS processing are held in the RAM 101. Note that to avoid interference with non-discharge complement processing to be described later, in this embodiment, HS correction data is generated using an image in a state in which non-discharge has not occurred. Details of HS processing will be described later.

Based on information (non-discharge information) 313 of anon-discharge nozzle acquired in advance, the non-discharge complement processing unit 304 performs non-discharge complement processing for the color signal data 312. In this embodiment, ink color data corresponding to the non-discharge nozzle is distributed to nozzles near the non-discharge nozzle. Note that the non-discharge complement processing is not limited to that described above, and the HS table 311 near the non-discharge nozzle may be corrected before the processing by the HS processing unit 303. Alternatively, a dot pattern after quantization processing by the quantization processing unit 306 to be described later may be changed.

The dot size conversion processing unit 305 performs conversion processing of converting each color signal data into 8-bit size signals corresponding to dot sizes. For example, if the image forming unit 107 can form three dot sizes, that is, large, medium, and small dot sizes, image data of each of K, C, M, and Y is converted into a plurality of items of image data corresponding to the large, medium, and small dot sizes. That is, if the number of ink colors is four (C, M, Y, and K), and the number of dot sizes is three (large, medium, and small), the dot size conversion processing unit 305 generates a total of 12 items of image data by combining all ink colors and all dot sizes. Note that the dot size conversion processing unit 305 can perform the conversion processing using a size conversion table 314 that is a one-dimensional lookup table in which the signal value of each dot size is associated with the color signal value of each color together with an interpolation operation.

The quantization processing unit 306 performs, for the image data each formed by 8 bits (256 tone values) and processed by the dot size conversion processing unit 305, conversion processing to tones that can be expressed by the image forming unit 107 and halftone processing of deciding the dot arrangement formed by a nozzle group, thereby generating halftone image data. In this embodiment, the quantization processing unit 306 converts image data including 8 bits per pixel into halftone image data (output image data) in which one bit has a binary value of 0 or 1 on a pixel basis. In the halftone image data, a pixel whose pixel value (output value) is 0 represents OFF of the dot, and a pixel whose pixel value (output value) is 1 represents ON of the dot. Note that error diffusion processing, dither processing, or the like, which is a known method, can be applied to the halftone processing. In this embodiment, quantization is performed by dither processing using a threshold matrix 315.

The dot size combination processing unit 307 combines the dot data of each dot size generated by the quantization processing unit 306 on a pixel basis and outputs the data to the image forming unit 107. The output image data is transferred to the image forming apparatus 12 via the I/F unit 110 and the I/F unit 111 and stored in the RAM 114 of the image forming apparatus 12. The image forming apparatus 12 performs recording processing by the image forming unit 107 based on the image data stored in the RAM 114.

The color signal change unit 308 performs change processing for the color signal data 312 based on the reading result of the image sensor 108. Detailed processing of the color signal change unit 308 will be described later.

The configuration of the image forming system 1 has been described above. Density-unevenness or streak reduction processing based on the configuration will be described below.

<Outline of Density-Unevenness Correction>

FIG. 4A is a conceptual view showing processing concerning density-unevenness correction of the image forming system 1 according to this embodiment along a time base t. FIG. 4B is a conceptual view showing a quality Q of a formed image along the time base t, like FIG. 4A. Density-unevenness correction according to this embodiment will be described below with reference to FIGS. 4A and 4B.

Assume that the image forming system 1 is powered on at time to, as shown in FIG. 4A. At this time, the image forming system 1 acquires the quality Q (t0) of an image to be formed by the image forming unit 107.

The quality Q(t) is a conceptual value representing general image quality at the time t. More specifically, the quality Q is a value at least including evaluation of density-unevenness or streaks remaining on a formed image even after correction processing by the HS processing unit 303. Note that the quality Q(t) is represented along one axis in FIG. 4B but may be a value expressed along multiple axes in actuality. In this embodiment, a general evaluation value considering not only density-unevenness and streaks but also graininess, color change, sharpness, character reproducibility, and the like is used as the quality Q(t).

Next, the image forming system 1 compares Q(t0) with quality Q0 that is a predetermined threshold. If the quality at that time is lower than the threshold (when Q(t0)<Q0), the image forming system 1 executes one of a plurality of density-unevenness correction processes. In the example shown in FIG. 4A, the image forming system 1 holds three different correction processes, which are shown as "density-unevenness correction A", "density-unevenness correction B", and "density-unevenness correction C" for the descriptive convenience. In addition to the density-unevenness correction processes, the function of the non-discharge complement processing unit 304 to make a complement to a non-discharge nozzle is also provided, and this processing is shown as "non-discharge complement" in FIG. 4A.

In the example shown in FIG. 4A, the density-unevenness correction A is executed from time t1 to t2. The density-unevenness correction A includes output, reading, and analysis of a plurality of measurement charts, correction value calculation processing, or execution of the head recovery operation by the maintenance unit 109. For this reason, the correction accuracy is high, and graininess deterioration or color change upon correction hardly occurs, as compared to the other density-unevenness correction processes. On the other hand, the density-unevenness correction A needs a long processing time, and printing of a user image cannot be performed during the correction processing.

As shown in FIG. 4B, quality Q (t2) higher than the threshold Q0 is obtained by the density-unevenness correction A. From t2, the image forming system can print the user image. As described above, the nozzle characteristic changes due to printing of the user image and a temporal change. For this reason, the density-unevenness suppressing effect by the density-unevenness correction processing decreases from t2, and as a result, density-unevenness or streaks remain in the formed image, and the quality Q lowers. In the example shown in FIG. 4B, the quality Q decreases to the threshold Q0 (falls below the threshold Q0) at time t3.

In this embodiment, the image forming system 1 monitors the quality Q (t) at a predetermined interval, and upon detecting that the quality Q (t) has decreased to the threshold Q0, executes one of the plurality of density-unevenness correction processes again. At this time, the correction processing to be executed is selected based on, for example, the predicted value of the quality Q after each correction processing, a processing time necessary for density-unevenness correction, and a downtime during which the user image cannot be printed.

In the example shown in FIGS. 4A and 4B, the density-unevenness correction B is executed from time t3 to t4. The density-unevenness correction B does not include output of charts or execution of the head recovery operation. For this reason, the density-unevenness correction processing is executed while continuing printing of the user image or maintaining a printable state.

On the other hand, the quality Q(t4) after the processing by the density-unevenness correction B is lower than the quality Q(t2) after the processing by the density-unevenness correction A due to the accuracy of correction or a harmful effect of correction. Alternatively, improvement of the quality by the density-unevenness correction B depends on the nozzle characteristic before the processing, as compared to the density-unevenness correction A, and it is sometimes difficult to obtain the improvement.

Note that separately from the temporal change of the nozzle characteristic, bubble inclusion into a nozzle or dirt adhesion may cause a non-discharge nozzle that does not form a dot. In such a case, the image forming system executes non-discharge complement processing by the non-discharge complement processing unit 304, thereby suppressing lowering of the quality Q by the non-discharge nozzle. In FIGS. 4A and 4B, non-discharge nozzles are generated at times t5, 17, and 19, and complement processing is completed at times t6, t8, and t10. Note that in this embodiment, non-discharge complement processing is executed while continuing printing of a user image or maintaining a printable state.

In the example shown in FIG. 4B, at time t11, the quality Q decreases to the threshold Q0 again due to density-unevenness or streaks whose cause is not a non-discharge nozzle. Upon judging that with the density-unevenness correction B in which the downtime or the time needed until correction is reflected is shorter, the correction accuracy is insufficient, or the harmful effect of correction is large, the image forming system 1 selects the density-unevenness correction C of higher accuracy.

In the example shown in FIG. 4A, from time t11 to 112, the image forming system 1 executes the density-unevenness correction C. The density-unevenness correction C includes output of charts for correction processing, and a downtime during which the user image cannot be printed during correction processing is included. However, when the correction range (tones and nozzles) is limited, the number of charts to be output and the processing time necessary for analysis and correction value calculation are less than the density-unevenness correction A, and the head recovery operation is not included. For this reason, in the density-unevenness correction C, the downtime or the time needed until correction is reflected is shorter than in the density-unevenness correction A, as shown in FIG. 4A.

In the example shown in FIG. 4A, the density-unevenness correction C is executed again from time t13 to t14. At this time, although the same density-unevenness correction C is executed, the quality Q(t14) after correction by the density-unevenness correction C of the second time is lower than the quality Q(t12) after the preceding density-unevenness correction C due to accumulation of the harmful effect of correction or correction errors.

Upon judging that the quality cannot be improved by the density-unevenness corrections B and C because of the accumulation of the harmful effect or correction errors, the image forming system executes the density-unevenness correction A again. In the example shown in FIG. 4A, the density-unevenness correction A is executed again from time t15 to t16. At this time, the quality Q(t16) after correction almost matches the quality Q(t2) after correction by the density-unevenness correction A.

In this way, when a plurality of density-unevenness corrections processes with different accuracies, downtimes, processing times, and harmful effect occurrences are held, and these are selectively used based on the predicted value of the quality Q after each correction processing the processing time necessary for density-unevenness correction, and the downtime during which the user image cannot be printed, execution of excessively large or small processing can be suppressed while maintaining predetermined image quality for a temporal change of density-unevenness.

More specifically, when the density-unevenness corrections B and C are executed at times t3, t11, and t13 in FIG. 4A, it is possible to reduce the downtime as compared to a case in which the density-unevenness correction A is executed at all timings and improve the productivity per unit time while maintaining the quality of an output image higher than the threshold Q0. Note that if the density-unevenness corrections B and C are a part of the density-unevenness correction A, processing can be shared, and the circuit scale and the program memory can be saved.

<Image Processing Procedure>

Figure 5:
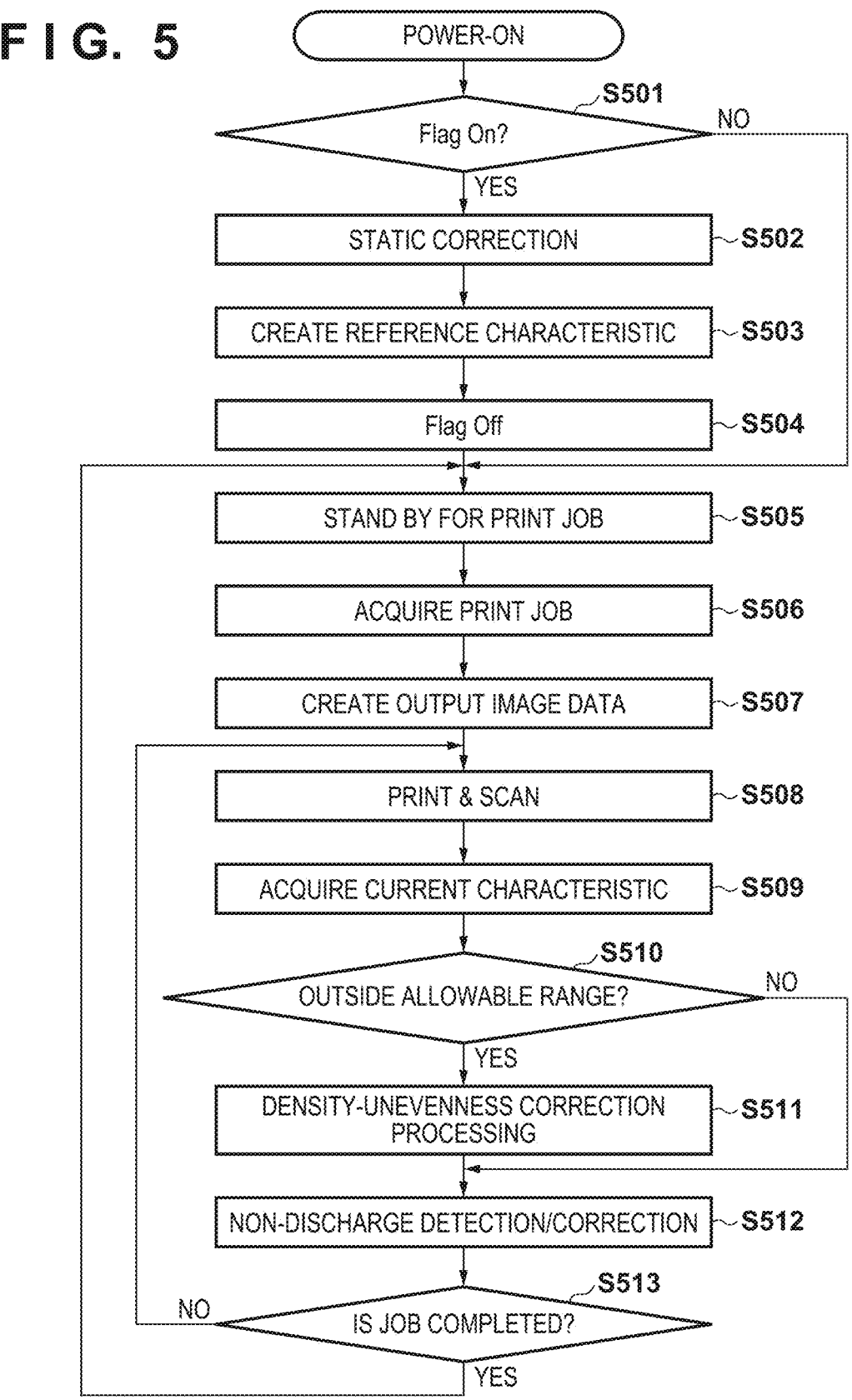
FIG. 5 is a flowchart showing the processing of the image processing unit.

FIG. 5 shows the image processing procedure of the image processing unit 106 according to this embodiment. The image forming system 1 according to this embodiment holds a plurality of density-unevenness correction processes that are different in accordance with the accuracy, downtime, processing time, and harmful effect occurrence.

In the description of FIGS. 4A and 4B, the description has been made assuming that three types of density-unevenness corrections A, B, and C exist. The density-unevenness correction A requires a long time until completion of the processing because a plurality of charts are printed. In the density-unevenness correction C, charts in a sufficiently small number (in this embodiment, one) as compared to the density-unevenness correction A are printed, a scan image is obtained, and correction is performed, as will be apparent in detail from a description to be made later. In the density-unevenness correction B, correction is performed during normal job processing without printing charts. To simplify the description, first, an example in which the two different density-unevenness correction processes A and B are prepared and selectively used to reduce the downtime caused by the density-unevenness correction processing will be described below.

One of the two density-unevenness correction processes is dynamic correction processing in which correction is performed at a high speed without outputting correction charts while continuing printing of a user image or maintaining a printable state. This is correction processing corresponding to the density-unevenness correction B (including the density-unevenness correction C) in the description made above with reference to FIGS. 4A and 4B. In the dynamic correction according to this embodiment, the variation direction of the nozzle characteristic is detected, and color signal data are changed in accordance with a predetermined correction amount, thereby implementing high-speed correction.

The other is static correction processing in which various kinds of tables to be used to create output image data are calibrated, and output data creation including HS processing is performed again using the tables after the calibration. This is correction processing corresponding to the density-unevenness correction A in the description made above with reference to FIGS. 4A and 4B. In the static correction processing according to this embodiment, a plurality of charts are output to calibrate the tables. Since the number of chart types and the number of charts to be output for HS correction are large, and the calculation load needed for correction is large, printing of an image from the user is interrupted or stopped in the static correction processing. Each step of the image processing procedure will be described below with reference to FIG. 5.

Note that in the above description, the threshold used to determine whether the quality of an output image has lowered is Q0. To describe a more detailed example, an example in which the determination is done based on a color difference ΔE between a target color and a color of an actually recorded image will be described below.

First, when the image forming system 1 is powered on, the image processing unit 106 refers to a flag stored in the RAM 101 or the external storage device 105 (step S501). The flag according to this embodiment represents the necessity of static correction processing. Upon determining, as the result of reference, that the flag is on, the image processing unit 106 advances to step S502 to perform static correction processing and then advances the process to step S503. Note that details of the static correction processing will be described later. On the other hand, upon determining that the flag is off, the image processing unit 106 skips the processes of steps S502 to S504 and advances the process to step S505.

In step S503, the image processing unit 106 creates a reference characteristic from the result of the static correction processing in step S502. The reference characteristic created here is the color development characteristic of a formed image with respect to an input image signal. In dynamic correction processing to be described later, correction is performed such that the characteristic of each nozzle reproduces the reference characteristic. More specifically, the reference characteristic is held in the RAM 101 or the external storage device 105 as the color characteristic LUT of a device-independent color space such as XYZ or Lab for the RGB combination of an input image. Note that a detailed acquisition method of the reference characteristic will be described later.

In step S504, the image processing unit 106 turns off the flag stored in the RAM 101 or the external storage device 105. By this step, the processes of steps S502 to S504 can be skipped until the flag is turned on, and the downtime at the time of starting can be shortened.

In step S505, the image processing unit 106 is set in a standby state until a print job is input. When the user inputs a print job via the operation unit 103, the image processing unit 106 advances the process to step S506.

In step S506, the image processing unit 106 acquires the print job input by the user. More specifically, the image processing unit 106 acquires the path to each image data to be printed and print conditions such as a print count, print quality, and a recording medium. Note that the pieces of information concerning the print job acquired here are stored in the RAM 101 and referred to in subsequent processing. Next, in step S507, the image processing unit 106 acquires user image data designated by the print job, and executes various kinds of image processing to convert the image data into image data (output image data) that can be output by the image forming unit 107. More specifically, first, the image processing unit 106 expands, on the RAM, various kinds of tables and matrices stored in the external storage device 105 in advance, and then executes processing by the units indicated by reference numerals 301 to 307 in FIG. 3. After that, the image processing unit 106 transfers obtained output image data to the image forming apparatus 12. Note that at this time, the image processing unit 106 stores the color signal data 312 corresponding to the ink colors in the RAM 101. In non-discharge complement processing and dynamic correction processing according to this embodiment, complement and correction processes are applied to the color signal data 312.

Next, in step S508, in accordance with the print job stored in the RAM 101, the image processing unit 106 instructs the image forming apparatus 12 to print the image on one recording medium. At this time, the CPU 100 controls the image sensor 108 and causes it to capture the image formed on the recording medium. As a result, the obtained captured image is transferred to the image processing apparatus 11 via the I/F 111 and the I/F 110 and stored as a scan image in the RAM 101 or the external storage device 105. Next, in step S509, the image processing unit 106 calculates the current color development characteristic of each nozzle from the scan image stored in step S508. Details will be described later.

Next, in step S510, the image processing unit 106 compares the current color development characteristic of each nozzle calculated in step S509 with the reference characteristic created in step S503, and determines whether the difference between these falls outside a predetermined allowable range. More specifically, the color difference $\Delta E$ between the color development characteristics is used for the determination. For example, if $\Delta E > 3$, the color difference $\Delta E$ falls outside the allowable range. Note that the color difference $\Delta E$ used in this step may be referred to in density-unevenness correction processing to be described later and is therefore stored in the RAM 101 in association with the time of acquisition. Upon judging in step S510 that the color difference $\Delta E$ falls outside the allowable range, the image processing unit 106 advances to step S511 to execute one of the density-unevenness correction processes. Details will be described later. On the other hand, if it is judged in step S510 that the color difference $\Delta E$ falls within the allowable range, the image processing unit 106 skips step S511 and advances the process to step S512.

Next, in step S512, the image processing unit 106 performs detection and correction of non-discharge by the non-discharge complement processing unit 304. At this time, a known method can be used to detect non-discharge. For example, a staircase-shaped chart is embedded in advance at an image end portion, and a non-discharge nozzle is detected from the region in the scan image. Alternatively, a non-discharge detection chart may be output at a predetermined interval, and a non-discharge nozzle may be detected based on the chart. Based on the position of the non-discharge nozzle detected in this way, the non-discharge complement processing unit 304 applies non-discharge complement processing to the color signal data 312 stored in the RAM 101. Note that instead of using a chart in non-discharge detection, a non-discharge nozzle may be detected based on comparison between the input image and the scan image. Alternatively, instead of acquiring a non-discharge nozzle from an image, a non-discharge nozzle may be detected by combining an infrared emitting device (not shown) and an infrared sensor. A non-discharge nozzle can also be detected by monitoring an ink flow amount in the head.

In step S513, the image processing unit 106 judges whether the print job acquired in step S506 is wholly completed. That is, it is judged whether all designated user images are printed in a designated number. Upon determining that the job is incomplete, the image processing unit 106 returns the process to step S508 to continue printing. On the other hand, if the job is completed, the image processing unit 106 returns the process to S505 and is set in the standby state until the next print job is input.

<Density-Unevenness Correction Processing Procedure>

More detailed processing of the density-unevenness correction processing of step S511 in FIG. 5 will be described next with reference to FIG. 6. As described above, in the density-unevenness correction processing according to this embodiment, two correction processes (dynamic correction and static correction) are selectively used.

First, in step S601, the image processing unit 106 refers to the flag stored in the RAM 101 or the external storage device 105. The flag referred to here is the same as the flag referred to in step S501 or S504 described above. In steps S605 and S607 to be described later, the flag is operated to be turned off after static correction and on after dynamic correction. For this reason, if dynamic correction has never been performed after static correction, the flag is off.

If the flag referred to in step S601 is off, the process advances to S606 to perform dynamic correction. In step S607 after that, the flag is turned on. On the other hand, if the flag is already on, the process advances to S602 to judge whether streaks have been aggravated by the previous (immediately preceding) dynamic correction. More specifically, the color difference $\Delta E$ used in immediately preceding step S510 and a color difference $\Delta E'$ used in previous step S510 are compared. If $\Delta E > \Delta E'$, it is judged that streaks have been aggravated.

Upon judging in step S602 that streaks have not been aggravated, the image processing unit 106 determines that further density-unevenness correction can be performed by dynamic correction, and advances the process to step S606 to perform dynamic correction again. On the other hand, upon judging in step S602 that streaks have been aggravated by dynamic correction, the image processing unit 106 considers that current density-unevenness cannot be corrected by dynamic correction, and executes static correction in step S603. Note that not only density-unevenness and color misregistration but also the reproducibility and graininess of characters may be included in the judgment in step S602. For example, the variance in an almost uniform area in the scan image in step S503 is held as the variance of reference. If the variance in the same area of the scan image in step S508 is larger than the variance of reference by a predetermined value or more, static correction processing may be executed.

After the static correction is performed in step S603, the image processing unit 106 according to this embodiment creates a reference characteristic (step S604), as in steps S503 and S504, and turns off the flag (step S605). As described above, in this embodiment, the flag represents whether dynamic correction is performed at least once after static correction, in addition to the necessity of static correction. That is, by using this flag, if the system is powered on and off after dynamic correction is performed at least once, static correction is executed. This is because dynamic correction gives priority to the time needed for correction, the processing amount, and the number of charts to be printed, and therefore, errors and the harmful effect of correction occur at high possibility. That is, it can be said that the flag according to this embodiment indicates that errors and the harmful effect of dynamic correction have occurred, and the quality of the image forming system can further be improved by executing static correction.

<Static Correction Processing Procedure>

FIG. 7 shows the procedure of static correction processing in step S603 described above. As described above, in the static correction processing according to this embodiment, a plurality of charts are output and analyzed to calibrate tables to be used by the processing units 301 to 307 in the image processing unit 106. Also, in this embodiment, to avoid interference with non-discharge complement processing, HS correction data in a state in which non-discharge is absent is generated. The static correction processing according to this embodiment will be described below in more detail with reference to FIG. 7.

First, in step S701, the image processing unit 106 decides primary colors of ink colors (CMYK). A primary color is a color development characteristic corresponding to a maximum signal value (255 for an 8-bit signal) generated by the ink color conversion processing unit 302. It is very rare that the amounts of ink discharged from the nozzles completely match because of factors such as errors in manufacturing and interaction in the printhead. Hence, if all nozzles output (solid output) large dots to all lattices of an output resolution (for example, 1,200 dpi×1,200 dpi), a solid image whose density changes between columns corresponding to the nozzle arrays is formed on the recording medium even if the input is uniformly made.

In this case, by the processing of the HS processing unit 303, the density can be adjusted by thinning out dots or reducing the dot size in nozzles for which the density is higher than in the other nozzles. On the other hand, it is impossible to discharge dots beyond the output resolution, and dots larger than the large dots cannot be output. That is, it is impossible to perform the adjustment such that the nozzles of density lower than in the other nozzles output dots at a higher density. Hence, the primary colors are preferably set in accordance with nozzles of the lowest density. Also, if the density of the nozzles of the lowest density changes due to a temporal change, the primary colors are preferably changed.

Figure 8A:
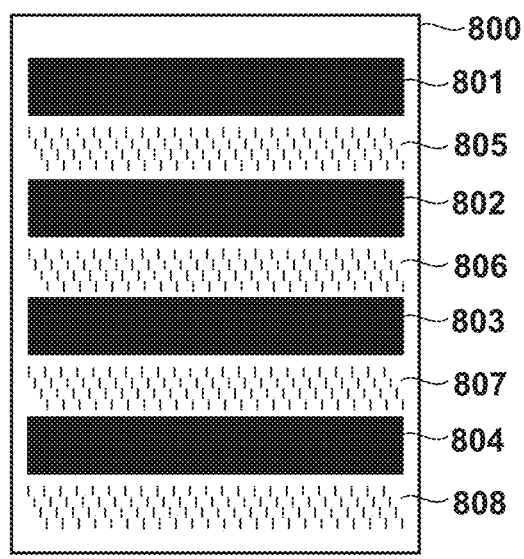
FIG. 8A is a view showing examples of output charts.

More specifically, the image processing unit 106 causes the image forming apparatus 12 to output a solid output chart 800 shown in FIG. 8A in each dot size. The solid output chart 800 shown in FIG. 8A is formed by solid patches 801 to 804 and non-discharge nozzle detection patterns 805 to 808 corresponding to ink colors (CMKY). The solid patch 801 is a solid patch corresponding to K ink, and in the region, large-size dots in the single K ink color are formed on all lattices of the output resolution (for example, 1,200 dpi×1,200 dpi). Reference numeral 805 denotes a non-discharge nozzle detection pattern for the K ink. Similarly, reference numerals 802 to 804 denote solid patches corresponding to C, M, and Y inks, and reference numerals 806 to 808 denote non-discharge nozzle detection patterns corresponding to the C, M, and Y inks. Also, the image processing unit 106 decides the primary colors of the ink colors from the solid output chart captured by the image sensor 108. That is, if there are four ink colors, that is, C, M, Y, and K colors, four primary colors corresponding to these are decided.

More specifically, in the image data obtained by the image sensor 108, the image processing unit 106 averages image regions corresponding to the solid patches 801 to 804 in the conveyance direction and converts these into one-dimensional data, and decides a color closest to the paper color in the obtained one-dimensional data as a primary color. At this time, when one-dimensional data conversion is performed after conversion processing using a scan color conversion LUT is performed in advance for the scan image of the solid output chart 800, the primary color can be decided as a device-independent value. The scan color conversion LUT is an LUT that associates the device value of the image sensor with device-independent color characteristics (Lab values, XYZ values, density values, or the like). For example, the scan color conversion LUT can be generated by scanning a calibration chart with a known color characteristic in advance by the image sensor 108 and associating values on the scan image.

Note that considering that the nozzle of the lowest density can be corrected by peripheral nozzles by HS processing, a color closet to paper white may be decided as the primary color after filter processing using a filter corresponding to the visual sensitivity (VTF) is performed. Note that if a non-discharge nozzle is included at the time of primary color detection, the primary color is assumed to be excessively light. Hence, in this embodiment, before the primary color is decided, non-discharge detection processing based on the non-discharge nozzle detection patterns 805 to 808 of the ink colors (heads) is executed. As a result, if a non-discharge nozzle is detected, a recovery operation by the maintenance unit 109 is executed, and after that, the solid output chart 800 is output again. Non-discharge detection and the recovery operation are repeated based on the output of the chart, thereby obtaining a solid output chart that does not include a non-discharge nozzle.

Figure 8B:
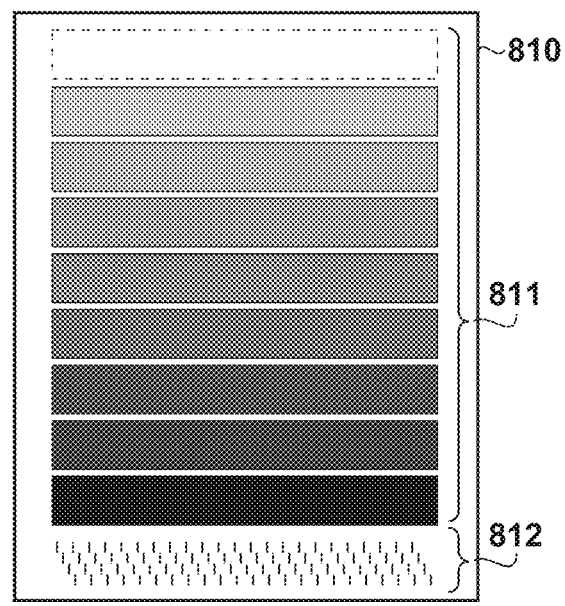
FIG. 8B is a view showing examples of output charts.

Referring back to FIG. 7, next, in step S702, the image processing unit 106 creates the HS table 311 to be used by the HS processing unit 303. More specifically, the image processing unit 106 first outputs a nozzle specific characteristic acquisition chart 810 shown in FIG. 8B. The nozzle specific characteristic acquisition chart 810 shown in FIG. 8B is formed by a tone patch portion 811 and a non-discharge nozzle detection pattern 812. Note that a marker configured to facilitate alignment of each nozzle to be described later may additionally be included in the chart 810.

The tone patch portion 811 is formed by even patches of nine different input values. For example, as the input values, values (0, 32, 64, . . . , 224, and 255) obtained by evenly dividing the range (0 to 255) into nine parts are used. In this embodiment, the nozzle specific characteristic acquisition chart 810 shown in FIG. 8B is output in the ink colors (CMYK) and analyzed, thereby obtaining (number of ink colors×number of nozzles) characteristics.

More specifically, dot size conversion, quantization processing, and dot size combining processing are performed for the nozzle specific characteristic acquisition chart 810, and the image forming apparatus 12 forms the chart as an image on a recording medium. Also, each patch region of the tone patch portion 811 is extracted from the scan image of the formed image, and averaged in the conveyance direction, thereby obtaining one-dimensional data. When the thus obtained one-dimensional data and the position of each nozzle are associated, a characteristic for the input value of each nozzle can be obtained.

Based on the acquired nozzle characteristics, the image processing unit 106 generates the HS table 311 such that all nozzles obtain a uniform characteristic for inputs of 0 to 255. Details will be described later. Note that in this embodiment, the HS table 311 is created for each nozzle. These are stored in the RAM 101 and used in HS processing later. Note that if a non-discharge nozzle occurs at the time of output of the nozzle specific characteristic acquisition chart 810, HS processing and non-discharge complement processing overlap in the region corresponding to the non-discharge nozzle and peripheral nozzles. As a result, correction is excessive in the overlap region, and black streaks or density-unevenness may occur.

In this embodiment, before creation of the HS table 311, non-discharge detection processing based on the non-discharge nozzle detection pattern 812 is executed. As a result, if a non-discharge nozzle is detected, a recovery operation by the maintenance unit 109 is executed, and after that, the chart 810 is output again. At this time, non-discharge detection and the recovery operation are repeated based on the output of the chart, thereby obtaining an HS table that does not include a non-discharge nozzle, and overlap of HS processing and non-discharge complement processing can be avoided. Note that a correction value may be calculated for each nozzle after filter processing is executed for the above-described one-dimensional data. For example, when a filter corresponding to the visual characteristic VTF is used as the filter, streaks and density-unevenness in a frequency band that can easily visually be recognized can be corrected with priority.

Referring back to FIG. 7, in step S703, the image processing unit 106 newly calculates the ink conversion table 310 in consideration of the change of the primary colors and the HS tables 311. Note that the ink conversion table can be created using a known method. For example, CMY values obtained by C=255−R, M=255−G, and Y=255−B are replaced with black by known UCR (Under Color Removal) processing, thereby creating the ink conversion table. The created table is stored on the RAM 101 as an ink conversion LUT and used in ink color conversion processing later.

Next, in step S704, the image processing unit 106 creates an input color conversion table. For example, patches obtained by evenly dividing the color solid of an RGB space are output, and associated with R', G' and B' which implement Lab values as the target values of RGB, thereby forming an LUT. The created LUT is stored as the input color conversion LUT 309 in the RAM 101 and used in input color conversion processing later.

Particularly, if the primary colors are changed by the temporal change or the change of the print medium in step S701, the ink conversion table 310 and the input color conversion table 309 are preferably regenerated in accordance with the change because the gamut that can be reproduced in the image forming system changes. In addition, if the color conversion tables are calculated based on image quality items such as graininess, sharpness, and glossiness, the balance between these is often changed by HS processing. Hence, when the HS tables 311 are changed, the color conversion tables 309 and 310 are preferably changed from the viewpoint of image quality. Calibration of the various kinds of tables is completed by steps S701 to S704.

Next, in step S705, the image processing unit 106 updates the output image data created in step S507 using the various kinds of tables created in steps S701 to S704. That is, various kinds of image processing by the units 301 to 307 are performed using the various kinds of tables updated by static correction processing to generate new output image data, and the output image data is transferred to the image forming apparatus 12. Also, the image forming apparatus 12 overwrites the received output image data in the RAM 114 and performs image formation using the data after the overwrite in accordance with a print instruction in step S508 later.

According to the above-described static correction processing, after various kinds of tables are updated in consideration of a temporal change, output image data is newly generated. By the static correction processing, color development characteristic correction is performed in addition to density-unevenness correction. Note that in addition to the above-described updating of various kinds of tables, the threshold matrix 315 to be used by the quantization processing unit 306 may be changed in consideration of the increase/decrease of dots by HS processing. Alternatively, after creation of the HS tables 311 in step S702, the dot size conversion table 314 may be recreated based on characteristics (graininess, sharpness, streaks/density-unevenness, color misregistration, and character reproducibility) after HS processing. In this case, the change of the dot size conversion table may influence the density-unevenness. For this reason, it is preferable to execute step S702 again using the newly generated dot size conversion table 314 and update the HS tables 311.

<Generation of HS Table 311>

Figure 9A:
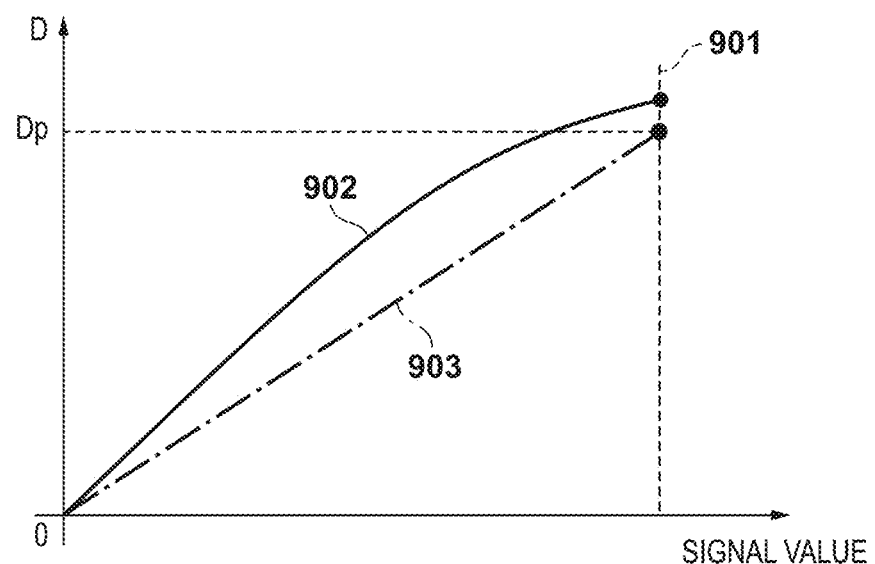
FIG. 9A is a view showing the outline of HS table creation processing.

Creation processing of the HS table 311 in step S702 will be described next in more detail with reference to FIGS. 9A and 9B. The horizontal axis in FIG. 9A represents the signal value of the tone patch portion 811, and the vertical axis represents a distance D from the recording medium color (paper white) on, for example, the Lab space. The distance D from the paper white can be calculated by equation (1) below. Note that $L_w$, $a_w$, and $b_w$ in equation (1) are the Lab values of the recording medium color, respectively.

$$D=\sqrt{(L-L_w)^2+(a-a_w)^2+(b-b_w)^2} \qquad (1)$$

Note that Dp in FIG. 9A is the distance D of the primary color decided in step S701 from paper white. In addition, reference numeral 901 in FIG. 9A indicates an upper limit value of the horizontal axis, which is 255 when the input signal value is represented by 8 bits. A curve 902 in FIG. 9A shows an example of a nozzle characteristic. The nozzle characteristic 902 can be obtained as a continuous value by performing an interpolation operation based on the signal value of the tone patch portion 811 and the value D corresponding to the signal value. At this time, an arbitrary interpolation method can be used, and, for example, piecewise linear interpolation, a known spline curve, or the like is used. In addition, an alternate long and short dashed line denoted by reference numeral 903 in FIG. 9A indicates a characteristic as the target of each nozzle. In this embodiment, the line that connects Dp and paper white (the origin in FIG. 9A) indicates the target characteristic 903.

Calculation of a correction value will be described next with reference to FIG. 9B. First, a target value Dt corresponding to an input value In is calculated from the target characteristic 903. Also, a signal value corresponding to the target value Dt is acquired as a correction value In' from the nozzle characteristic 902. The acquired correction value In' is associated with the input value In and stored as the HS table 311 of a nozzle of interest in the RAM 101. At this time, correction values are calculated for all values of 0 to 255 as the input value In and held as a table for the nozzle of interest. Alternatively, only values corresponding to nine tones may be calculated and held as a table. In this case, when using the correction table, values other than the nine tones are calculated from the nine values by known interpolation processing (for example, linear interpolation).

Figure 9B:
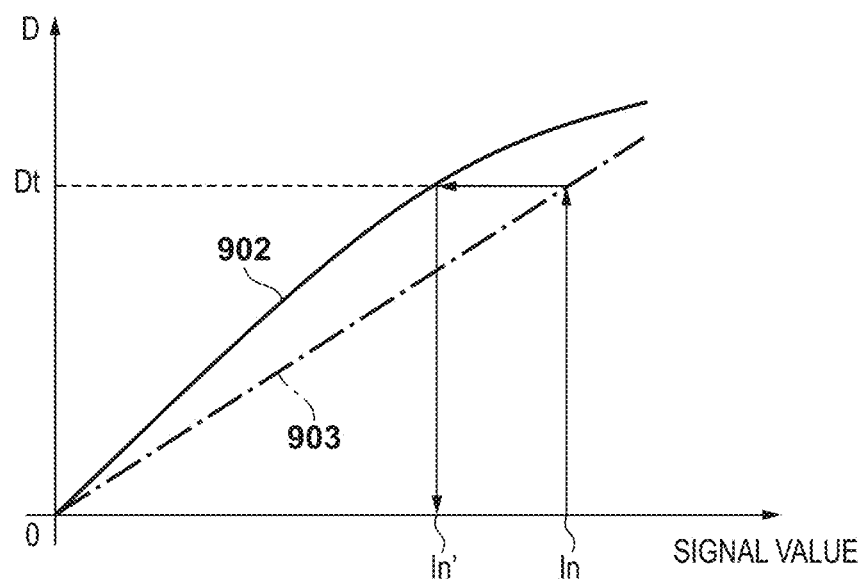
FIG. 9B is a view showing the outline of HS table creation processing.

Note that although only one nozzle characteristic 902 is plotted in FIGS. 9A and 9B to simplify the description, curves corresponding to (number of ink colors×number of nozzles) characteristics are obtained in fact. Hence, when the above-described processing is repeated for all nozzles, the HS tables 311 corresponding to all nozzles are calculated. Note that an arbitrary color space can be used to calculate the HS table 311, and instead of using the distance D from paper white, the correction amounts can also be calculated using a block density, tristimulus values XYZ, an optical density, scanner RGB, or the like.

<Reference Characteristic Acquisition>

Reference characteristic acquisition in steps S503 and S604 will be described here. In this embodiment, the reference characteristic is represented by the tristimulus values XYZ corresponding to the signal value of each nozzle. More specifically, to acquire the reference characteristic, first, the nozzle specific characteristic acquisition chart 810 shown in FIG. 8B is output after correction processing using the HS tables 311 generated in step S702. For the captured image, color conversion processing of converting the device values (RGB values) of the image sensor 108 into XYZ values is performed. This processing is performed using a color conversion LUT calculated in advance. Also, patch regions are cut out from the captured image after color conversion and averaged in the conveyance direction, thereby obtaining one-dimensional XYZ data for each input value.

The thus obtained one-dimensional XYZ data and the position of each nozzle are associated, thereby obtaining the reference characteristic (tristimulus values XYZ) for the input value of each nozzle. At this time, the nozzle specific characteristic chart is output for the ink colors (CMYK), and products are used for the secondary colors or tertiary colors of these. Alternatively, reference characteristics for the secondary colors or tertiary colors may be held by outputting and capturing patches including the secondary colors or tertiary colors. Note that when calculating secondary colors or tertiary colors from the products of primary colors, values obtained by normalizing the tristimulus values XYZ by the tristimulus values of the recording medium (paper white) are preferably used as the reference characteristic.

FIG. 19A shows an example of the reference characteristic. As shown in FIG. 19A, in this embodiment, the reference characteristic is held as an LUT that holds the tristimulus values XYZ for the input RGB values at a predetermined interval. Note that the table shown in FIG. 19A may be held for each nozzle, or the characteristics of all nozzles may be averaged, and one table may be held in correspondence with all nozzles. Not all nozzles need be used as the target, and a table may be held for some nozzles (nozzle group) more than the nozzles as the target of static correction. Alternatively, instead of outputting the nozzle specific characteristic chart, the target characteristic of static correction, which is denoted by reference numeral 903 in FIGS. 9A and 9B, may be used as the reference characteristic. As the color development characteristic, not the XYZ values but Lab values or block density may be held as the reference characteristic. Alternatively, not the input signal value but color development characteristics corresponding to the number of dots after HS processing may be held.

<Dynamic Correction Processing Procedure>

Figure 10:
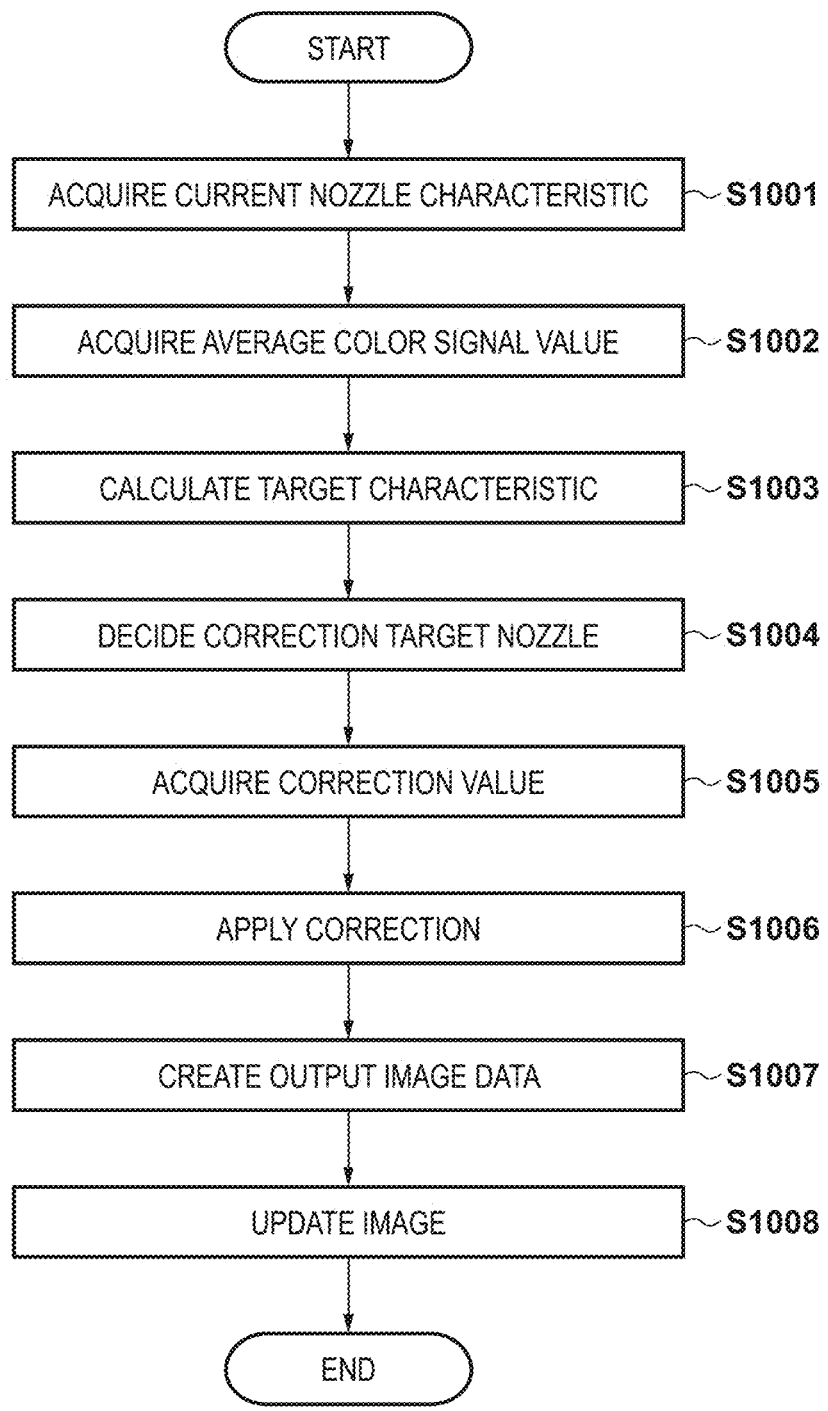
FIG. 10 is a flowchart showing dynamic correction processing.

FIG. 10 shows the procedure of dynamic correction processing in step S606 described above. As described above, in the dynamic correction processing according to this embodiment, no charts are output, and correction is performed in accordance with a predetermined correction amount determined in advance, thereby implementing high-speed density-unevenness correction as compared to static correction. The dynamic correction processing will be described below in more detail with reference to the processing shown in FIG. 10.

First, in step S1001, the image processing unit 106 acquires the nozzle characteristics of all nozzles calculated in step S509. More specifically, in this embodiment, average XYZ values are acquired from the scan image on a nozzle basis. This will be described in more detail with reference to FIGS. 11A to 11D. Reference numeral 1100 in FIG. 11A indicates an example of input image data input in step S506. At this time, the above-described scan color conversion LUT is used for the scan image of the input image 1100, thereby obtaining the tristimulus values XYZ for each pixel. Also, the obtained tristimulus values XYZ are averaged in the conveyance direction (y direction) and associated with each nozzle position, thereby calculating average XYZ values of each nozzle in correspondence with the input image.

Figure 11A:
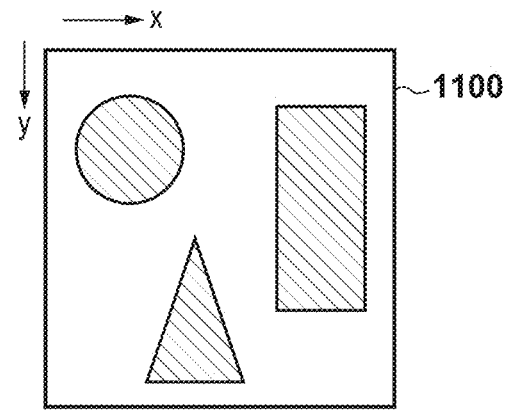
FIG. 11A is a view showing the outline of nozzle characteristic acquisition processing.
Figure 11B:
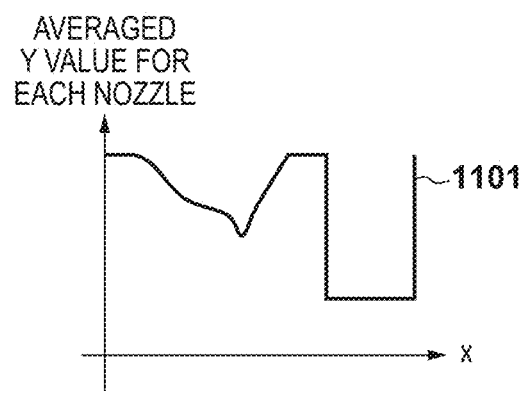
FIG. 11B is a view showing the outline of nozzle characteristic acquisition processing.

A curve 1101 in FIG. 11B indicates, as an example, the averaged Y value of each nozzle, which is calculated in the above-described way. Note that the horizontal axis in FIG. 11B represents a nozzle number (or a nozzle position), and the vertical axis represents a Y value calculated from the scan image.

Referring back to the flowchart of FIG. 10, in step S1002, the image processing unit 106 acquires an average color signal value of each nozzle. More specifically, first, color signal data corresponding to each ink color, which is stored in the RAM 101 or the external storage device 105 in step S507 or S705, is acquired. In addition, when the acquired color signal data are averaged in the conveyance direction (y direction), average color signal data of each nozzle for the input image can be calculated.

Figure 11C:
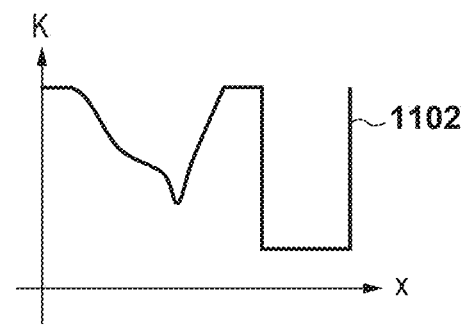
FIG. 11C is a view showing the outline of nozzle characteristic acquisition processing.

Reference numeral 1102 in FIG. 11C indicates an example in which the K signals of the color signal image data 312 corresponding to the input image data 1100 shown in FIG. 11A are averaged. Note that the horizontal axis in FIG. 11C represents a nozzle number, and the vertical axis represents an average K signal value calculated from the K signal image.

Referring back to the flowchart of FIG. 10, next, in step S1003, the image processing unit 106 calculates a target characteristic of each nozzle position corresponding to the input image 1100 based on the nozzle specific reference characteristic acquired in step S503 or S604. More specifically, the average K signal value indicated by reference numeral 1102 in FIG. 11C is converted into XYZ values using the reference characteristic. Similarly. CMY signal values are converted into XYZ values, and products thereof are obtained, thereby obtaining target XYZ values of each nozzle.

Figure 11D:
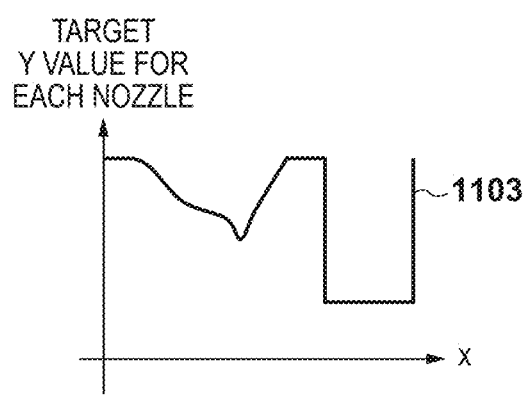
FIG. 11D is a view showing the outline of nozzle characteristic acquisition processing.

Note that instead of averaging the K signal values to obtain one-dimensional data, after the K signal value of each pixel of the color signal image is converted into XYZ values, the XYZ values may be converted into one-dimensional data. Alternatively, the XYZ values may be held for on/off of the dot of each pixel in the output image after HS processing, thereby similarly obtaining the target XYZ values of each nozzle from the output image. A curve 1103 in FIG. 11D indicates, as an example, a target Y value of each nozzle calculated in this way. Note that the horizontal axis in FIG. 11D represents a nozzle number, and the vertical axis represents a calculated target Y value.

Next, in step S1004, the image processing unit 106 decides a nozzle position as the target of dynamic correction. More specifically, the current nozzle characteristic (reference numeral 1101 in FIG. 11B) acquired in step S1001 and the target characteristic of each nozzle calculated in step S1003 are compared. More specifically, each characteristic is converted into Lab values, and a nozzle position at which the absolute value of the color difference ΔE between these is equal to or larger than a predetermined threshold is decided as the correction target. Also, an ink color as the correction target is decided at the decided nozzle position. Details of these processes will be described later.

Next, in step S1005, the image processing unit 106 (color signal change unit 308) acquires a correction value for each nozzle specified in step S1004. More specifically, the magnitudes of the current characteristic and the reference characteristic are acquired for each nozzle of the correction target, and a predetermined correction coefficient is acquired. For example, for a nozzle for which the acquired value is larger than the reference, the correction coefficient is set to 0.99. On the other hand, for a nozzle for which the acquired value is smaller than the reference, the correction coefficient is set to 1.01. Details will be described later.

Next, in step S1006, the image processing unit 106 (color signal change unit 308) reads out pixel values of a line region formed by the correction target nozzle in the color signal image stored in step S508 or S707. Furthermore, the readout signal value of the image is multiplied by the correction coefficient of the corresponding nozzle, thereby acquiring a signal value after correction. Next, in step S1007, the image processing unit 106 causes the non-discharge complement processing unit 304, the dot size conversion processing unit 305, the quantization processing unit 306, and the dot size combination processing unit 307 to operate, thereby generating new output image data from the color signal image data 312 after change. Finally, in step S1008, the image processing unit 106 transfers the new output image data to the image forming apparatus 12, and ends the dynamic correction processing. Note that the image forming apparatus 12 overwrites the image data after correction in the RAM 114 and performs image formation based on the data after the overwrite in accordance with a print instruction in step S508 later.

As described above, in the dynamic correction, the color signal image is directly corrected without outputting correction charts, thereby performing correction at a high speed while continuing printing of a user image or maintaining a printable state. Note that although in step S1002, the whole input image is averaged in the y direction to obtain one-dimensional data, as described above, the input image may be divided into small regions, and processing may be performed for each small region. In this case, the magnitudes and substantial matching of nozzle characteristics are calculated in each region, and if it is determined a predetermined number of times or more that a nozzle characteristic is large or small, the nozzle is set to the correction target. Alternatively, in the dynamic correction, part of characteristic information may be updated without outputting correction charts.

Also, the correction value may be changed in accordance with the difference between the current nozzle characteristic and the reference characteristic. More specifically, the higher the characteristic of a nozzle of high density becomes than the reference characteristic, the larger the correction amount may be set. Alternatively, the lower the density is, the larger the correction amount may be set. The correction value may be changed in accordance with the signal value of a small dot image. More specifically, since density-unevenness is readily visually recognized in a halftone, the correction amounts for a highlight portion and a shadow portion may be suppressed with respect to the correction amounts in a halftone region. Also, only a specific ink color in a plurality of ink colors may be set to the target of dynamic correction. For example, only the K ink that is assumed to largely contribute to density-unevenness in the CMYK inks may be set to the target of dynamic correction processing. In this case, correction color specifying processing to be described below is unnecessary.

<Details of Correction Nozzle Specifying Processing>

As described above, in step S1004, a color signal to be corrected is specified for the nozzle position as the target of dynamic correction. In this embodiment, the ink color as the correction target is decided from the Lab values of a region corresponding to a correction target nozzle position xt and the Lab values of a reference characteristic. More specifically, the difference vector between the characteristics on the Lab space is projected to a line passing through each ink color and paper white. The nozzle number xt of the ink color in which the largest projection vector is obtained is set to the correction target. Specifying of an ink color to be corrected in step S1004 will be described in more detail with reference to FIGS. 12A to 12D.

Figure 12A:
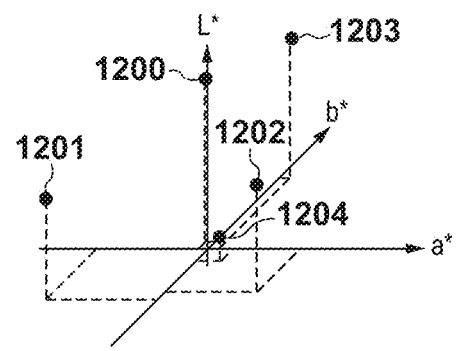
FIG. 12A is a view showing the outline of ink color specifying processing.

FIG. 12A is a view showing the color (paper white) of a recording medium and color development characteristics averaged for all nozzles in a case in which the inks (CMYK) are solid-output to the recording medium, which are plotted on the Lab space. That is, axes in FIG. 12A represent $L^*$, $a^*$, and $b^*$, respectively.

Points 1200 to 1204 in FIG. 12A represent the color development characteristics of the paper white (point 1200), the C ink (point 1201), the M ink (point 1202), the Y ink (point 1203), and the K ink (point 1204), respectively. At this time, three-dimensional vectors from the paper white to the color development characteristics of the inks can be defined on the Lab space. Note that although actual processing is defined and executed on an Lab space as shown in FIG. 12A, the following description will be made using a two-dimensional plane for the sake of simplicity.

Figure 12B:
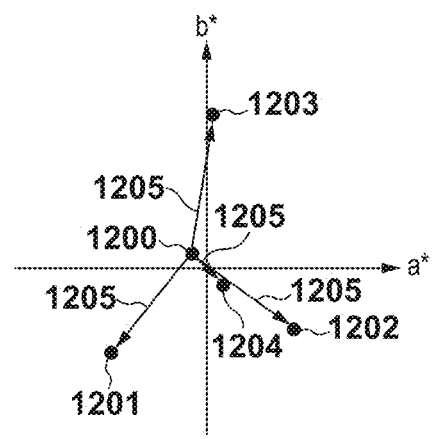
FIG. 12B is a view showing the outline of ink color specifying processing.

FIG. 12B is a view showing FIG. 12A viewed from the $L^*$-axis direction. Note that the points 1200 to 1204 are points representing the color development characteristics of the paper white, the C ink, the M ink, the Y ink, and the K ink, respectively. At this time, four lines that connect the paper white and the points corresponding to the ink colors can be defined as dotted lines 1205 to 1208 in FIG. 12C. For example, the dotted line 1205 is a line that connects the C ink and the paper white.

These lines represent the color development tendencies of corresponding inks. More specifically, when a corresponding ink is increased or decreased, the line is expected to move almost in parallel to the corresponding line. Hence, these color development tendencies and the tendencies of deviations from the reference characteristics are compared, thereby deciding a correction target ink.

Figure 12C:
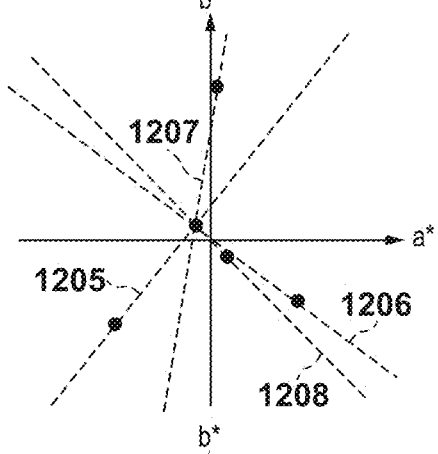
FIG. 12C is a view showing the outline of ink color specifying processing.
Figure 12D:
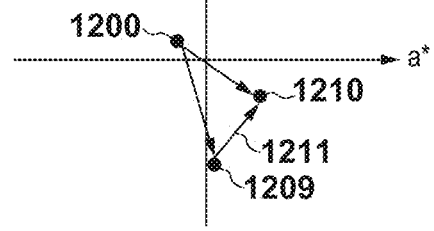
FIG. 12D is a view showing the outline of ink color specifying processing.

A point indicated by reference numeral 1209 in FIG. 12D is a point that plots a characteristic as the target of a nozzle of interest. Similarly, reference numeral 1210 indicates a point that plots the current color development characteristic of the nozzle of the number xt. Note that in FIG. 12D, the above-described distance D from paper white is represented by the lengths of vectors from the point 1200 representing the paper white to the points 1209 and 1210.

Reference numeral 1211 in FIG. 12D indicates a vector from the point 1209 representing the reference characteristic to the point 1210 representing the current characteristic, that is, the difference vector representing the color difference considering the visual characteristics of these and its tendency. The magnitudes of vectors obtained by projecting the difference vector onto the lines indicating the tendencies of the color development of the ink colors shown in FIG. 12C are obtained, thereby specifying the ink color suitable for difference correction. More specifically, the magnitudes of the projection vectors are compared, and the ink for which the largest projection vector is obtained is decided as the ink of the correction target.

More specifically, if the difference vector indicated by reference numeral 1211 in FIG. 12D is projected onto the line representing the color development tendency of the cyan ink indicated by reference numeral 1205 in FIG. 12C, and a projection vector larger than those of the remaining lines is obtained, the nozzle number xt of cyan is specified as the nozzle of the correction target. Note that the nozzle specifying processing is performed not on the ab plane but on the three-dimensional Lab space, as described above. In addition, for the ink color in which no dot is discharged at the nozzle number xt, that is, the color signal value corresponding to the nozzle number xt is 0, it is preferable that the line 1207 and its projection vector are not obtained, and the ink is not set to the correction target ink.

Note that as described above, the difference vector is a vector representing the difference between the reference characteristic and the current characteristic, and when the magnitude is obtained, the deviation amount from the reference characteristic can be predicted. In step S510 described above, the inside/outside of the allowable range may be determined based on not the distance D from the paper white but the magnitude of the difference vector. Alternatively, a threshold for the magnitude of the projection vector may be held in advance, and the magnitude relative to the threshold may be judged for each nozzle of each ink. In this case, nozzles of an ink color corresponding to vectors larger than the threshold may collectively be set to the correction target. Also, this processing may be used to determine the inside/outside of the allowable range in step S510.

<Modifications Concerning Correction Timing>

Several modifications concerning the timing of correction in the above-described correction processing will be described. In the description made above with reference to FIG. 5, every time an image is output, density-unevenness allowability determination (step S510) and correction (step S511) and non-discharge detection/complement (step S512) are performed. However, because of the processing speed, it is sometimes impossible to execute image scan and analysis every time an image is output. In this case, the processes may be executed at different timings in consideration of the influence on quality in the case of occurrence and the load of processing.

Figure 6:
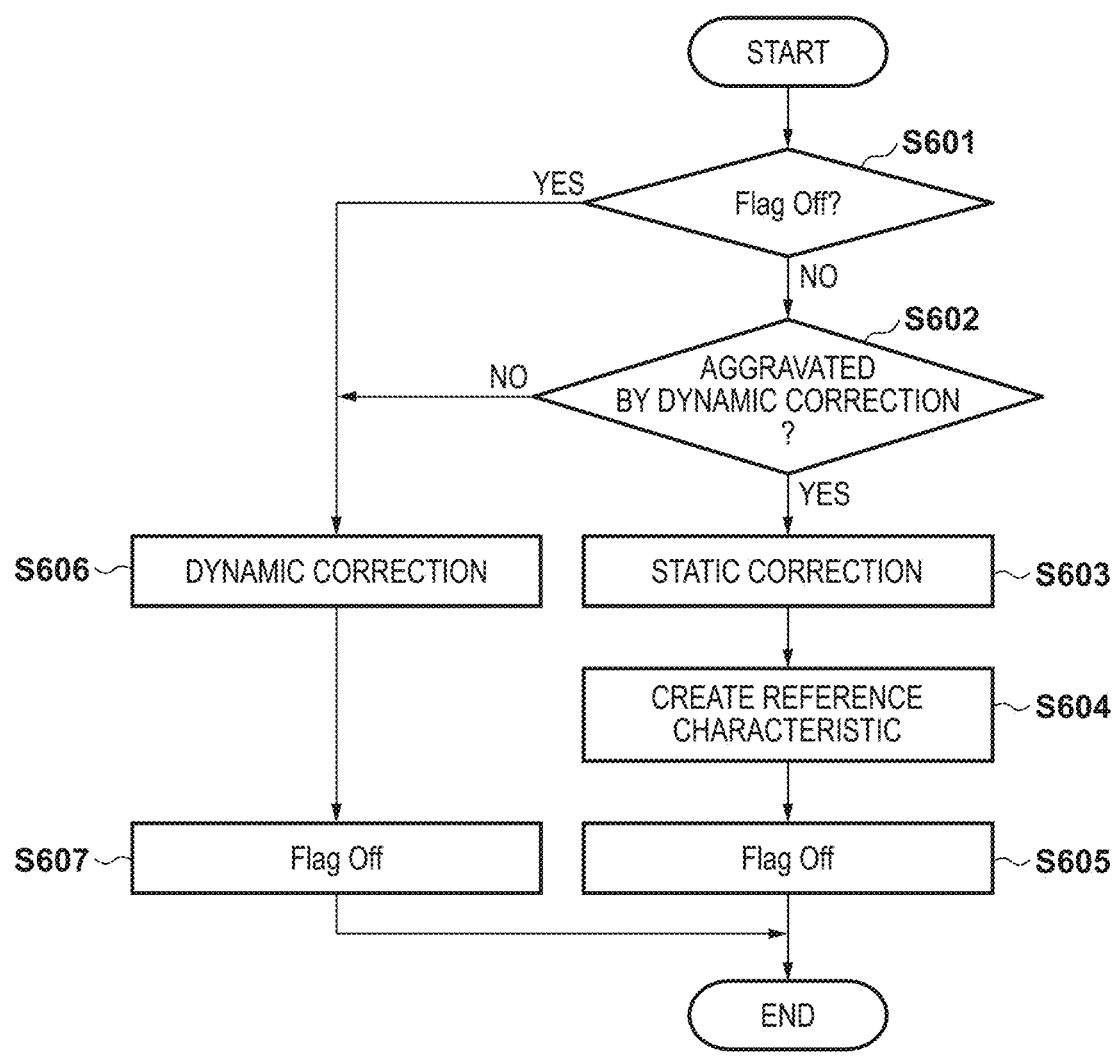
FIG. 6 is a flowchart showing density-unevenness correction processing.

In the description made with reference to FIG. 6, static correction processing (step S603) is executed based on only the result of dynamic correction processing (step S602). However, for example, static correction processing may be executed in consideration of the number of printed sheets, the elapsed time, and the operation time from previous static correction. For example, executability of non-discharge detection, dynamic correction, and static correction may be judged every time 10 sheets, 100 sheets, and 10,000 sheets are output, respectively. Alternatively, the processing may be executed always for every output. Alternatively, the processing may be judged and executed based on different indices such as 10 sheets, five minutes, and one day.

Alternatively, instead of performing determination of the outside of the allowable range in step S510 described above, dynamic correction may always be performed. In this case, determination of the outside of the allowable range is performed in place of steps S601 and S602, and static correction may be performed if outside the allowable range.

In addition, the image processing apparatus 11 and the image forming apparatus 12 can operate without synchronizing. For example, a job acquired in step S506 may be expanded on the RAM 114 in the image forming apparatus 12 and output to the image forming unit 107 anytime in accordance with the job contents. At this time, the image processing apparatus performs dynamic correction using, as a trigger, transmission of a scan image by the image sensor 108 via the I/Fs 111 and 110. Without stopping printing, the image forming apparatus 12 may replace the image as soon as a new output image is received via the I/Fs 110 and 111. In this case, dynamic correction is applied five or 10 sheets after the scan image.

Note that in the example shown in FIG. 5, if a shutdown instruction is received from the user in any step, the image forming system operates up to the print job waiting state in step S505, stores various kinds of tables in the external storage device 105, and ends the system. At this time, the image forming system confirms whether the flag is on. If the flag is on, the end processing preferably includes static correction processing and processing of turning off the flag. When the flag is confirmed at the end of the system, processing (steps S501 to S504) after power-on can be skipped, and the possibility that the downtime for the user can be shortened becomes high.

Also, the user may be allowed to set the timings of executing dynamic correction and static correction. That is, execution of static correction may be permitted only at the time of power-off by a user setting. Alternatively, if the standby state in step S505 continues for a predetermined time, for example, 30 min or more, the flag may be turned off, and static correction may be executed. Alternatively, a setting may be made to suppress dynamic correction and static correction during printing of the same image or same job. For example, if correction processing is executed when the degradation of quality of the image forming system is moderate, and a time has elapsed from the preceding correction, the difference between output images may be large, and density-unevenness may be noticeable. In this case, execution of correction processing is preferably suppressed during printing of the same job or same image. For example, in accordance with an instruction from the user, execution of correction is inhibited during printing of the same job or same image. Alternatively, the threshold for correction possibility judgement is changed to make it difficult to perform correction.

<Modifications Concerning Correction Target>

Several modifications concerning the correction target in the above-described correction processing by the image processing unit 106 will be described. In the above description, in dynamic correction processing, correction is performed for the color signal image data 312, thereby implementing high-speed correction. However, if dynamic correction is executed for output image data after quantization, dot size conversion processing and quantization processing in step S1006 are unnecessary, and processing can be performed at a higher speed. For example, a plurality of drive signals for small dots are held in the image forming apparatus 12. In dynamic correction, the signals are switched, thereby performing correction for output image data after quantization. More specifically, not an image represented by 1 bit (0 or 1) per pixel but an image represented by 4 bits (0 to 15) per pixel is used as the output image of small dots. The printhead forms dots by discharge signals corresponding to 0 to 15. At this time, the signals are designed in advance such that the larger the value is, the larger the discharge amount is.

Also, in static correction, the correction processing is performed using the median (for example, 4) of possible discharge signals. In dynamic correction processing, the output image is read out, and the signal values on a line are uniformly changed depending on whether the density of the line is higher than the reference characteristic. For example, if the density of the line is high, the pixel values are uniformly decreased by 1. Note that the pixel values may be changed not uniformly but probabilistically based on the difference from the reference characteristic. However, if probability processing is performed for binary data, dispersibility in the obtained pattern is often poorer than in a pattern obtained by correcting the above-described data before quantization. For this reason, if the harmful effect of graininess degradation by correction processing is taken into consideration, it is preferable to correct multivalued data before quantization.

Note that in the block diagram of FIG. 3, dot size conversion processing is performed after HS processing. However, dot separation may be performed before HS processing. That is, one-dimensional LUTs are used for the color signal data after ink color (CMYK) conversion, thereby generating an image corresponding to a dot size. For example, if there are three types of dot sizes, 4 ink colors×3 types of dot sizes=a total of 12 color signal image data are generated.

At this time, the HS processing unit performs correction processing for each of the color signal data (12 types in the above example).

Alternatively, a plurality of HT matrices may be prepared for each dot size, and the quantization processing unit 306 may perform dot size conversion. In this case, the HS processing unit 303 performs HS processing for each of the images of the dot sizes (for example, large, medium, and small). Note that although dynamic correction necessity judgement and correction processing are performed for each nozzle in the above description, there can also be performed for a plurality of nozzles. For example, correction may be performed using a coefficient of 1.01 for a nozzle tx as the correction target and a coefficient of 1.005 for an adjacent nozzle.

<Modifications Concerning Third Correction Processing>

In this embodiment, two correction processes including dynamic correction and static correction are selectively used, as described above. However, three or more correction processes can be held. For example, in addition to dynamic correction and static correction, third correction processing corresponding to the density-unevenness correction C can further be held. For example, in the third correction processing, only one correction chart as shown in FIG. 13A is output, and correction processing is performed based on the scan image of the chart.

Figure 13A:
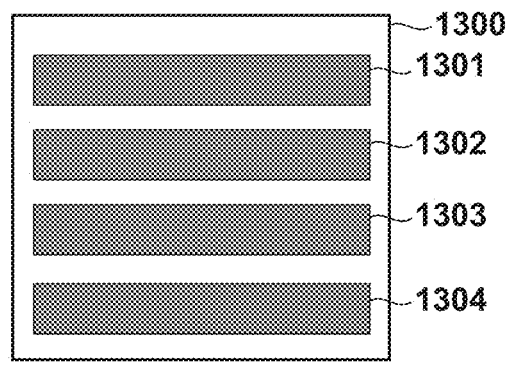
FIG. 13A is a view showing examples of output charts.

A chart 1300 shown in FIG. 13A is formed by even patches 1301 to 1304 of halftones (input value: 128) of the ink colors (CMYK). For example, the even patch 1301 is an even patch of C ink. At this time, in the third correction processing, regions corresponding to the even patches 1301 to 1304 are extracted from the scan image of the above-described chart 1300, converted into tristimulus values XYZ, and averaged in the conveyance direction (y-axis direction), thereby obtaining one-dimensional data. The obtained one-dimensional data and a reference characteristic are compared, and a correction value for each nozzle is decided based on the magnitudes. When the even patches are used, a nozzle characteristic more accurate than the nozzle characteristic obtained from a user image can be obtained.

Note that in the third correction processing, correction may be performed to make the patches 1301 to 1304 even in the plane without using the reference characteristic. In this case, the one-dimensional data obtained from each even patch is further averaged in the nozzle direction and for the tristimulus values XYZ, thereby obtaining one average value as a target value. The obtained average value and the average value of tristimulus values corresponding to each nozzle are compared, and a correction value for each nozzle is decided based on the magnitudes.

Figure 13B:
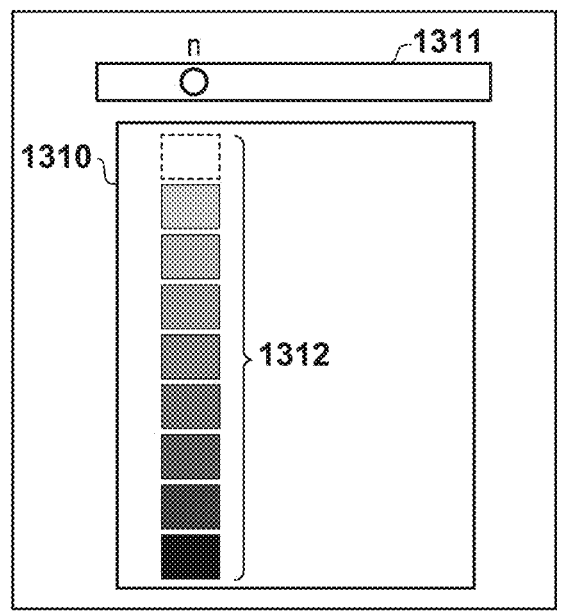
FIG. 13B is a view showing examples of output charts.

Alternatively, a value obtained by dividing the average value of tristimulus values corresponding to each nozzle by the target value may be set to the correction value, and the signal value of each nozzle may be multiplied by this. Also, even patches of a plurality of different tones may be included for each ink color if the even patches can be fitted in one sheet. Alternatively, the values may be changed every time the chart is output. For example, when correction is performed like the above-described dynamic correction until the correction target nozzle is decided by step S1001 to S1004, and a chart configured to preferentially output a portion that needs correction is generated and output, efficient correction can be performed even if only one chart is used. For example, FIG. 13B shows a chart 1310 that is generated when the nth nozzle of K is the correction target nozzle. Note that reference numeral 1311 in FIG. 13B schematically represents a nozzle array corresponding to K ink. At this time, the chart 1310 is formed by a patch group 1312 including even patches with different tones for lines corresponding to the (n−10)th to (n+10)th nozzles of K. At this time, the patch group 1312 is formed by the single K ink color.

Figure 13C:
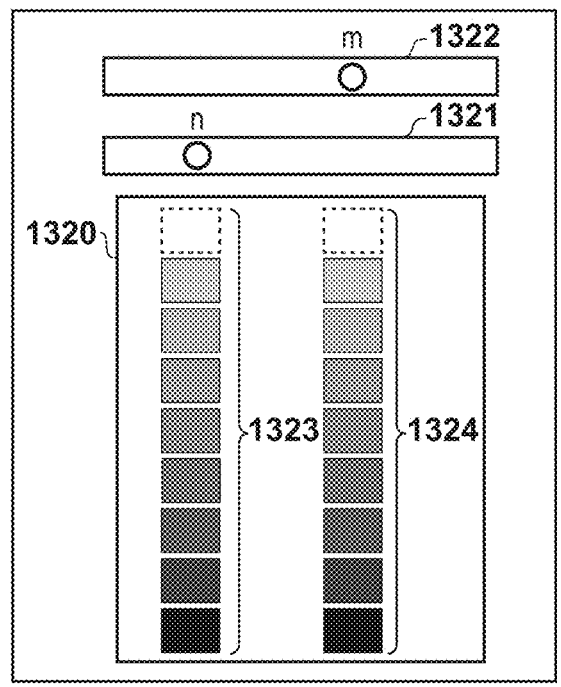
FIG. 13C is a view showing examples of output charts.

FIG. 13C shows a chart 1320 that is generated when the nth nozzle of K ink and the mth nozzle of C ink are the correction target nozzles. This is an example of a chart generated when n and m in the chart 1320 do not exist within 10 adjacent nozzles. Note that reference numerals 1321 and 1322 in FIG. 13C schematically represent nozzle arrays corresponding to the K ink and the C ink.

At this time, the chart 1320 is formed by a patch group 1323 including even patches with different tones for lines corresponding to the (n−10)th to (n+10)th nozzles of K, and a patch group 1324 including even patches with different tones for lines corresponding to the (m−10)th to (m+10)th nozzles of C. At this time, the patch group 1323 is formed by the single K ink color. In addition, the patch group 1324 is formed by the single C ink color. Note that at this time, each of the patch groups 1323 and 1324 may be formed by patches of different signal values, and, for example, the signal values are preferably decided based on the color development characteristics of the K ink and the C ink. Alternatively, signal values for which the difference or residual by correction is large may preferably be output.

A chart 1330 shown in FIG. 13D is an example of a chart that is generated when the nth nozzle of K ink and the m'th nozzle of C ink are the correction target nozzles, and n and m' exist within 10 adjacent nozzles. Note that reference numerals 1331 and 1332 in FIG. 13D schematically represent nozzle arrays corresponding to the K ink and the C ink. At this time, the chart 1330 is formed by even patches 1333 with different tones for lines corresponding to the (n−10)th to (n+10)th nozzles of K, and even patches 1334 with different tones for lines corresponding to the (m'−10)th to (m'+10)th nozzles of C. At this time, the patches 1333 are formed by the single K ink color. In addition, the patches 1334 are formed by the single C ink color. In FIG. 13D, a patch 1335 is a patch corresponding to a signal value of 0. In the example shown in FIG. 13D, since the patch can commonly be used for the nth nozzle of the K ink and the m'th nozzle of the C ink, the patch corresponding to a signal value of 0 is not included in the patch group 1334.

Note that the above-described third correction processing is performed when it is judged in step S602 of FIG. 6 that streaks have been aggravated. Also, the result of the third correction processing is evaluated, and if streaks have been aggravated, static correction is performed. Alternatively, static correction may be performed only at a break of jobs or at the time of shutdown. Alternatively, dynamic correction described above with reference to FIG. 10 is not performed, and the third correction processing may be performed as dynamic correction indicated by step S606 in FIG. 6.

Alternatively, the third correction means may change not the color signal image data 312 but the HS table 311. Alternatively, a configuration capable of changing both the image data 312 and the HS table 311 may be employed. If the number of nozzles to be corrected is smaller than a predetermined number of nozzles, the color signal image data may be changed, and if the number of nozzles to be corrected is larger, the HS table may be changed.

Note that in the third correction processing, a gradation chart 1340 shown in FIG. 13E may be used instead of using the chart 1300. The chart 1340 is formed by gradation patches 1341 to 1344 in the input value ranges (for example, 0 to 255) of the ink colors (CMYK). For example, the patch 1341 is a gradation patch of C ink. When using the gradation chart 1340, averaging in the conveyance direction (y direction) is not performed. Processing of converting scanner RGB into Lab is directly performed for a scan image, and associating with a nozzle position is performed. At this time, one-dimensional data in the y direction corresponding to each position x represents a nozzle characteristic for the nozzle position x. That is, the nozzle characteristic (the distance D from paper white with respect to a signal value) indicated by 902 in FIG. 9A can be acquired from each of the gradation patches 1341 to 1344. In this case, in the third correction processing, a correction amount for each nozzle is calculated based on the nozzle characteristic acquired from the gradation patch, and the color signal image data 312 is corrected.

Note that in the examples shown in FIGS. 13A to 13E, only single colors are shown. However, if density-unevenness occurs in a mixed color such as blue (C+M) or red (M+Y), patches of secondary colors may be output.

<Modifications in which Static Correction is Performed Stepwise>

Note that in the flowchart shown in FIG. 6, if step S602 ends with YES, static correction is performed in accordance with the flowchart shown in FIG. 7, as described above. However, static correction processing can also be performed stepwise. Instead of performing all table creations in steps S701 to S704, first, only steps S701 and S702 may be performed, and necessity of execution of steps S703 and S704 may be judged in accordance with the result.

Second Embodiment

In the above-described first embodiment, an example in which a reference characteristic is created immediately after static correction processing has been described. In addition, the necessity of correction is determined using a single reference characteristic independently of an output image, as described above. However, depending on the characteristic of an image sensor 108 or an image designated by the user, in some cases, a reference characteristic predicted from an input image and a nozzle characteristic predicted from the device value of a scan image do not match well. This is because charts used to acquire the latest nozzle characteristic and the reference characteristic are different. For example, for an image with most parts formed by blue (secondary colors of C and M), focus is placed on quality when printing blue. Alternatively, for an image with most parts formed by lines, like a text image or a design drawing, focus is placed on the quality of lines.

Figure 14:
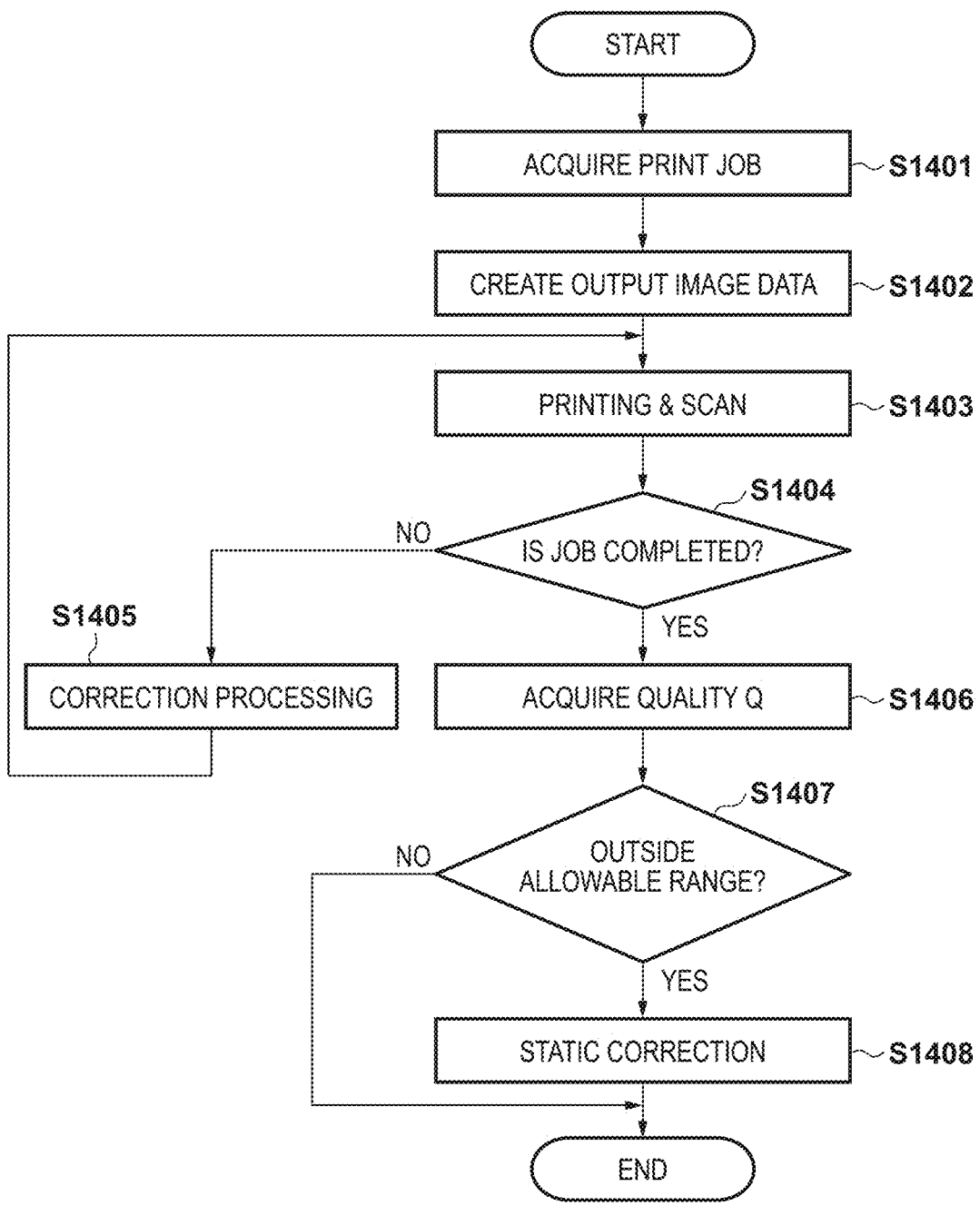
FIG. 14 is a flowchart showing the processing of an image processing unit.

In this embodiment to be described below, for each output image, a reference characteristic is acquired from the output image immediately after static correction processing, thereby making the latest nozzle characteristic match the reference characteristic. As a result, the necessity of more accuracy correction according to the output image can be determined. FIG. 14 is a flowchart showing the processing procedure of an image processing unit 106 according to this embodiment as an example. The procedure of processing according to the second embodiment will be described below with reference to FIG. 14.

First, in step S1401, the image processing unit 106 acquires a print job input by the user, as in step S505 described above. Next, in step S1402, the image processing unit 106 executes various kinds of image processing to obtain output image data, as in step S506 described above. Next, in step S1403, the image processing unit 106 instructs an image forming apparatus 12 to print one output image I on a recording medium in accordance with the print job stored in a RAM 101, and also instructs reading by the image sensor 108. After that, the number of sheets to be output in the print job stored in the RAM 101 is decremented by one. Alternatively, if the number of already output sheets is stored in the RAM 101 independently of the print job, the number is incremented by one.

Next, in step S1404, the image processing unit 106 refers to the number of sheets to be printed or the number of output sheets in the RAM 101 and judges whether the print job acquired in step S1401 is wholly completed. Upon determining that the job is incomplete, the image processing unit 106 advances the process to step S1405. In step S1405, the image processing unit 106 performs correction processing including judgment of the possibility of the correction processing. Details of step S1405 will be described later. On the other hand, upon judging in step S14404 that the job is completed, the image processing unit 106 advances the process to step S1406.

In step S1406, the image processing unit 106 acquires quality Q of an image formed by an image forming system 1. More specifically, a general evaluation value considering not only density-unevenness and streaks but also graininess, color change, sharpness, character reproducibility, and the like is used as the quality Q(t). At this time, each evaluation value is acquired using a known method. The evaluation values are, for example, weighted and added to calculate the quality Q.

Next, in step S1407, the image processing unit 106 compares the quality Q with a predetermined threshold Q0. More specifically, if the calculated current quality Q is equal to or less than the threshold Q0 (Q≤Q0), the image processing unit 106 judges that the current quality Q falls outside an allowable range. In this case, the image processing unit 106 advances the process to step S1408 to perform static correction processing. Note that the static correction processing can be performed as in step S502 or S603 described above, and a detailed description thereof will be omitted.

On the other hand, upon judging in step S1407 that Q>Q0 (the quality Q falls within the allowable range), or static correction processing in step S1408 is executed, the image processing unit 106 ends the processing and is set in a standby state until the next print job is input. Note that in the above-described procedure, steps S1406 and S1407 may not be included, and static correction may always be executed. Alternatively, in step S1406, execution of static correction may be judged based on not the quality Q but the elapsed time or the number of printed sheets after static correction.

<Correction Processing Procedure>

Figure 15:
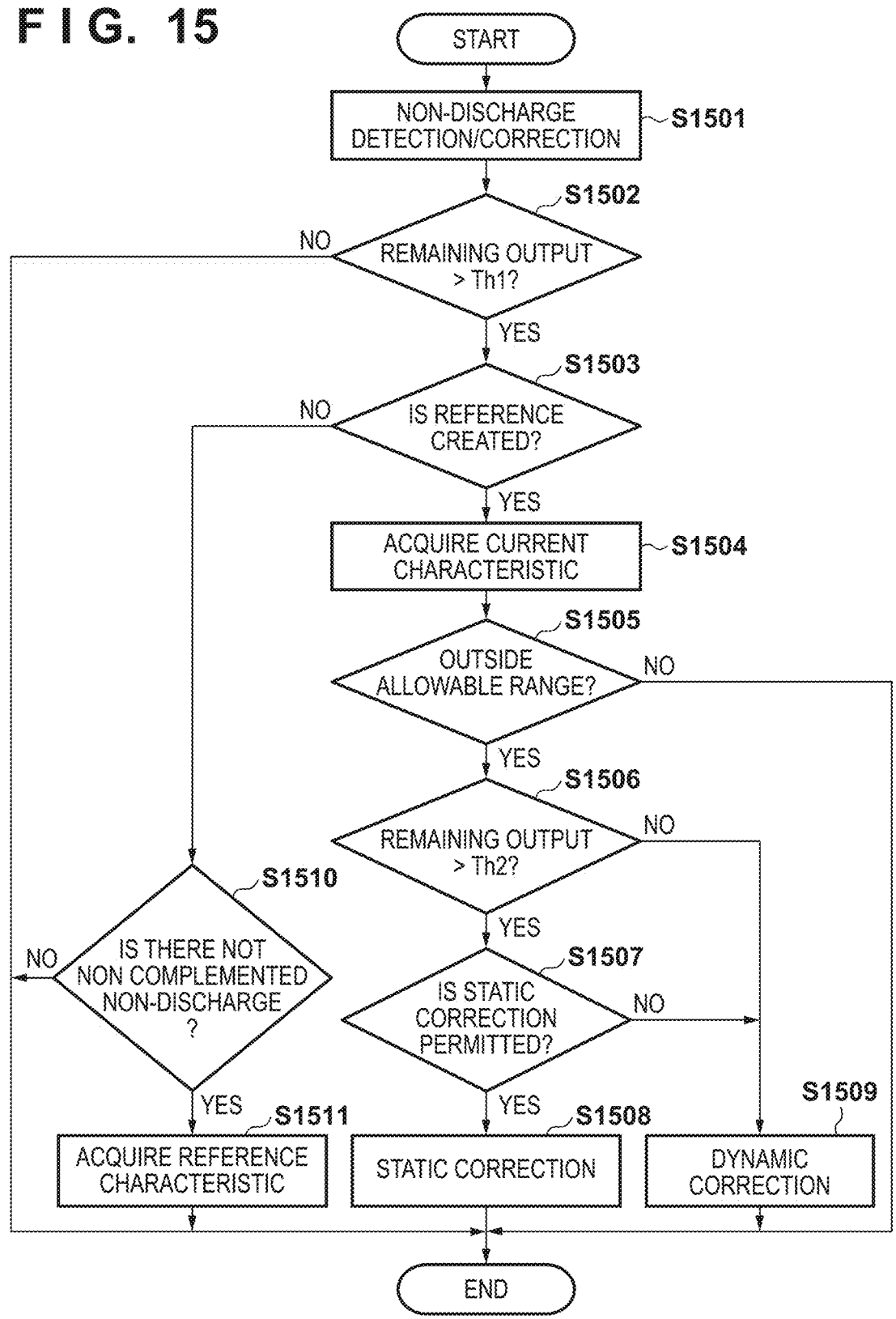
FIG. 15 is a flowchart showing correction processing.

FIG. 15 shows the processing procedure of correction processing (step S1405) according to the second embodiment. Processing of each step will be described below with reference to FIG. 15.

First, in step S1501, the image processing unit 106 performs non-discharge detection and correction by a non-discharge complement processing unit 304 based on the scan image. The processing of this step is performed as in step S512 described above, and a description thereof will be omitted here.

Next, in step S1502, the image processing unit 106 compares the number P of remaining sheets to be output with a predetermined threshold th1. If P>th1, the image processing unit 106 advances the process to step S1503. On the other hand, if P≤th1, the image processing unit 106 skips the remaining processes of steps S1503 to S1511 and ends the correction processing. At this time, the number P of remaining sheets to be output can be obtained by referring to the number of sheets to be output and the number P of output sheets in the print job stored in the RAM 101. Also, as the threshold th1, a time needed for dynamic density-unevenness correction or the number of sheets to be output to the image forming apparatus 12 until the correction is reflected after execution can be used. For example, if almost five sheets are output until dynamic correction is applied after scan of a formed image, th1=5 is set. If it is assumed, based on the number of remaining sheets to the printed, that the correction processing is not reflected on the current job, the downtime or calculation load can be suppressed by inhibiting execution of correction processing. Note that the threshold th1 may be set by causing the user to operate an operation unit 103.

In step S1503, the image processing unit 106 determines whether the reference characteristic for the image I is already created. If the reference characteristic is not created yet, the image processing unit 106 advances the process to step S1510. In step S1510, the image processing unit determines whether the image scanned in step S1403 includes non-complemented non-discharge. More specifically, the image processing unit 106 determines whether non-discharge detection processing and non-discharge complement processing are executed in step S1501.

If non-complemented non-discharge is included, that is, if non-discharge complement processing is executed in step S1501, the influence of non-discharge is included in the reference characteristic. Hence, the image processing unit 106 directly ends the correction processing without creating a reference characteristic from the current scan image. On the other hand, if non-complemented non-discharge is not included, the image processing unit 106 advances the process to step S1511 to create a reference characteristic.

Note that in this embodiment, Lab values of each pixel are used as the reference characteristic. More specifically, in step S1511, the image processing unit 106 performs, for the image obtained by scanning in step S1403, color conversion processing of converting the device values (RGB values) of the image sensor into Lab values on a pixel basis. The thus obtained two-dimensional Lab values are obtained as reference characteristics $L0(x, y)$, $a0(x, y)$, and $b0(x, y)$ for the image I. Here, x and y represent positions on the scan image. Also, in this embodiment, the scan resolution and the nozzle resolution match, and x equals a nozzle number.

After creation of the reference characteristics, it is judged in step S1503 of the procedure shown in FIG. 15 that the reference characteristic is created, and the process advances to S1504. In step S1504, the image processing unit 106 acquires nozzle characteristics for the current image I. The image processing unit 106 according to this embodiment acquires the current nozzle characteristic as two-dimensional Lab values. More specifically, as in step S1511, the latest scan image is color-converted to obtain current nozzle characteristics $L(x, y)$, $a(x, y)$, and $b(x, y)$.

Next, in step S1505, the image processing unit 106 determines whether the current nozzle characteristics $L(x, y)$, $a(x, y)$, and $b(x, y)$ fall outside the allowable range. More specifically, the image processing unit 106 calculates a color difference $\Delta E(x, y)$ of each pixel from the reference characteristics $L0(x, y)$, $a0(x, y)$, and $b0(x, y)$ and the current nozzle characteristics $L(x, y)$, $a(x, y)$, and $b(x, y)$. For example, if a pixel for which $\Delta E>3$ is included, it is determined that the nozzle characteristics fall outside the allowable range. Alternatively, the number of pixels for which $\Delta E>3$ may be counted on a nozzle basis, and if a nozzle in which the number of pixels is equal to or larger than a predetermined number of pixels exists, it may be determined that the nozzle characteristics fall outside the allowable range. Furthermore, using a value $\Delta Eave(x)$ obtained by averaging the color difference $\Delta E(x, y)$ in the y direction, if x for which $\Delta Eave(x)>3$ exists, it can be determined that the nozzle characteristics fall outside the allowable range.

Note that the determination may be performed after filtering is performed for the current reference and tristimulus values XYZ. For example, when comparison is performed after processing using a filter corresponding to the visual characteristic VTF, correction is performed only when streaks or density-unevenness of a frequency that can easily visually be recognized has occurred, and the possibility that the downtime for the user can be suppressed becomes high. In addition, as the color space to perform the determination, not the Lab values but XYZ values, an optical density, a black density, scanner RGB values, or the like can also be used.

Upon determining that the result of the determination falls within the allowable range, the image processing unit 106 judges that correction is unnecessary, and ends the correction processing. On the other hand, upon determining that the result of the determination falls outside the allowable range, the image processing unit 106 advances the process to step S1506.

In step S1506, the image processing unit 106 refers to the number P of remaining sheets to be output again and compares it with a predetermined threshold th2. Upon determining that P≤th2, the image processing unit 106 advances the process to step S1509 to perform dynamic correction processing. Details will be described later. On the other hand, upon determining that P>th2, the image processing unit 106 advances the process to step S1507. In step S1507, the image processing unit 106 determines whether static correction processing is permitted. Upon determining that static correction processing is permitted, the image processing unit 106 advances the process to step S1508 to perform static correction processing. On the other hand, upon determining that static correction processing is not permitted, the image processing unit 106 advances the process to step S1509 to perform dynamic correction processing.

Figure 20:
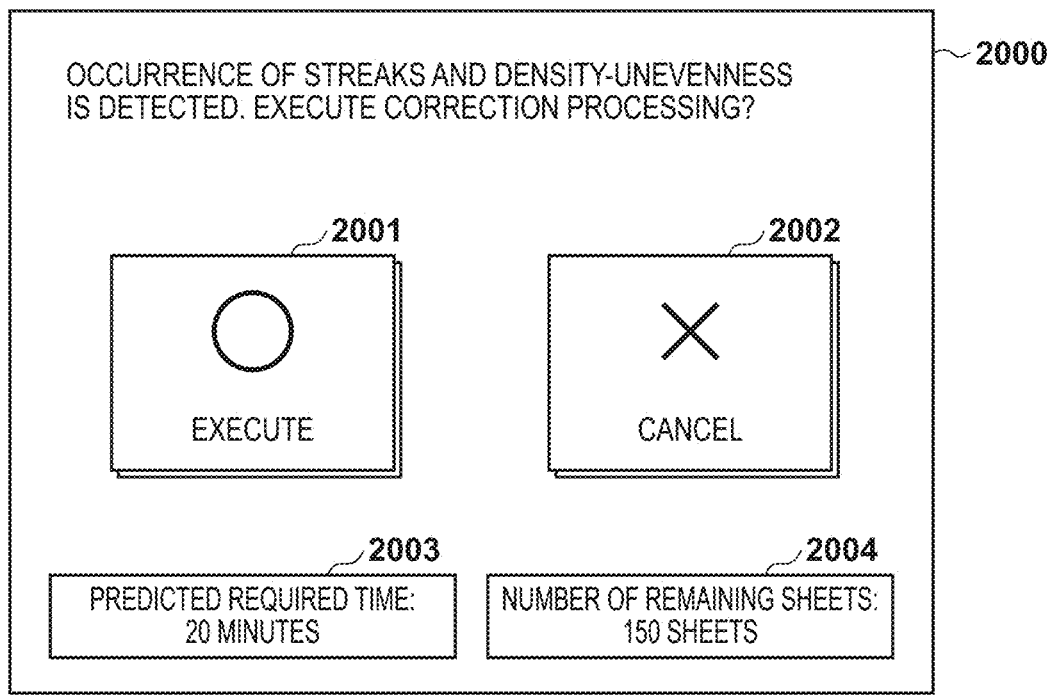
FIG. 20 is a view showing an example of a selection screen.

Permission/non-permission of static correction is, for example, included in the print job to be acquired in step S1401 and acquired. Alternatively, in step S1507, a user interface 2000 as shown in FIG. 20 may be displayed on a display unit 104, and the user may be caused to make selection via the operation unit 103. In the example shown in FIG. 20, the user can select permission (press an execution button 2001 in FIG. 20) or non-permission (press a cancel button 2002 in FIG. 20) of static correction via the operation unit 103. At this time, the number of remaining sheets to be printed (reference numeral 2004 in FIG. 20) and a predicted time necessary for correction (reference numeral 2003 in FIG. 20) as shown in FIG. 20 are preferably included in the selection screen 2000 and presented to the user. Alternatively, in place of the number 2004 of remaining sheets, the remaining print time may be displayed. If the user does not press a button within a predetermined time, permission or non-permission is preferably automatically set.

<Dynamic Correction Processing>

Dynamic correction processing in step S1509 described above can be performed in accordance with, for example, a procedure shown in FIG. 10. More specifically, in step S1509, a nozzle position x including a pixel outside the allowable range is set to a correction target nozzle position xt, the correction target ink color in step S1004 described above is selected, and a value corresponding to the nozzle is changed based on the magnitude of a characteristic. Alternatively, a correction value may be calculated from the current characteristic obtained in step S1504. That is, the CMYK values of each pixel on the image I and the Lab values of each pixel acquired in step S1504 are associated on a nozzle basis to form a reverse LUT. The reference characteristics L0, b0, and a0 of each pixel are converted into CMYK values using the reverse LUT of a corresponding nozzle to obtain ink values after dynamic correction, thereby creasing color signal image data after dynamic correction.

<Modifications>

In the description made above with reference to FIG. 15, calculation of the reference characteristic (step S1511) and acquisition of the current characteristic (step S1504) are performed from a user image. However, these can also be performed using a measurement chart. For example, in steps S1511 and S1504, a gradation chart 1340 shown in FIG. 13E is output at a predetermined interval (time or sheets), and the nozzle characteristic of each nozzle is calculated from patches 1341 to 1344 in the chart. In the calculation of the reference characteristic (step S1511), the nozzle characteristic immediately after static correction is stored as a reference characteristic in the RAM 101. In step S1503, the correction necessity and a correction amount are calculated based on the latest nozzle characteristic and the reference characteristic.

In this case, however, since wasted paper and a downtime for the user are generated by the output of the measurement chart, the determination in step S1502 is preferably performed at an appropriate interval. For example, step S1502 is performed only when the number P of remaining sheets to be output is 100 or more and it divisible by 100.

When the measurement chart is used, a reference characteristic based on a formed image cannot be created. However, robustness to a user image, the reading accuracy of the sensor, and a position deviation from a nozzle can be obtained, and in some cases, a characteristic can be acquired at a high accuracy depending on the performance of the sensor. Also, the determination in step S1506 is performed only based on the number of remaining sheets to be output (the number of unprinted sheets). However, the determination may be done based on the current nozzle characteristic or the color difference from the reference characteristic. For example, the determination may be done based on the number of pixels outside the allowable range. Alternatively, a different judgment criterion, for example, whether a pixel for which ΔE>5 is included may be used. Alternatively, the judgment may be performed based on whether the number of pixels outside the allowable range is increased by dynamic correction.

Third Embodiment

Figure 16A:
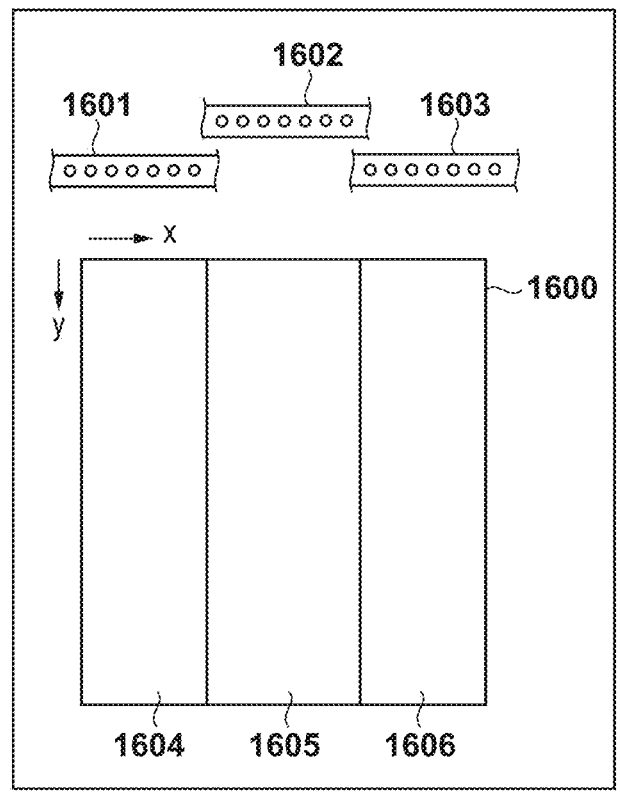
FIG. 16A is a view showing the outline of correction processing.

In the above description, the printhead is regarded as a single printhead in the nozzle array parallel direction (x direction), as shown in FIG. 2. However, a method of combining a plurality of printheads to cover whole print paper is often employed. For example, in an example shown in FIG. 16A, a recording medium 1600 is covered by combining three printheads (1601 to 1603). At this time, the recording medium 1600 is divided into regions 1604 to 1606 formed by the different printheads 1601 to 1603.

Depending on the physical configuration of the printhead, a density-unevenness pattern may be formed by a characteristic difference depending on a position. For example, density-unevenness may occur due to variations between the central portion and an end portion in a chip, between chips, or between heads, or due to a driven block when ahead is driven on a block basis. For example, when a head is divided into 32 blocks and driven, density-unevenness at a period of 32 nozzles may occur in the printhead. Between the printheads, the average output characteristic to the same signal may be changed by the difference of attachment accuracy or electrical characteristic. At this time, the difference between the heads shifts to the whole in many cases while maintaining the characteristic in each head.

Figure 16B:
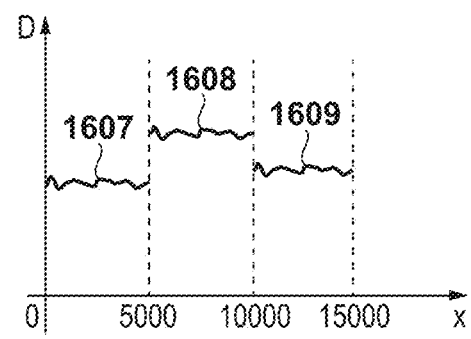
FIG. 16B is a view showing the outline of correction processing.

FIG. 16B shows the characteristic of each nozzle obtained in such a case. The horizontal axis in FIG. 16B represents a nozzle number x, and the vertical axis represents a distance D of an image formed on a sheet surface from paper white in a case in which the same signal value is given to the nozzles.

At this time, a characteristic 1607 in FIG. 16B corresponds to the region 1604. In the example shown in FIG. 16A, each head includes 5,000 nozzles, and nozzle number x=1 to 5000 (printhead 1601) corresponds to the region 1604. Similarly, a characteristic 1608 corresponds to the region 1605 (nozzles 5001 to 10000, that is, the printhead 1602), and a characteristic 1609 corresponds to the region 1606 (nozzles 10001 to 15001, that is, the printhead 1603).

At this time, as shown in FIG. 16B, the characteristics 1607 to 1609 can be separated into a deviation from an average value (density-unevenness between the heads) and similar density-unevenness in each region (density-unevenness in each head). Note that in particular, density-unevenness in each head is often decided by the nozzle arrangement on a plate on which the nozzles are formed, and the temporal change is relatively small in many cases. In addition, the frequency of density-unevenness is relatively high, and the residual of density-unevenness by the temporal change is unnoticeable.

On the other hand, density-unevenness between the heads is density-unevenness at a low frequency and is noticeable. Also, since the possibility that the environment such as the humidity or temperature changes or a temporal change occurs is high, the density-unevenness between the heads is preferably corrected at a frequency higher than the density-unevenness in each head. Hence, in static correction according to this embodiment, density-unevenness is separated into a deviation from an average value and similar density-unevenness in each region, and a correction amount for each of these is calculated and applied. On the other hand, in dynamic correction, only a deviation from an average value is corrected, thereby implementing maintaining predetermined quality under a lower load.

<Static Correction Processing>

Static correction processing according to the third embodiment will be described below with reference to FIG. 17. First, in step S1701, an image processing unit 106 outputs, by an image forming apparatus 12, a chart capable of acquiring a density-unevenness characteristic in each head and a density-unevenness characteristic between the heads, and acquires a scan image. In this embodiment, as the chart capable of acquiring both characteristics, a chart shown in FIG. 8B is output for each of ink colors (CMYK). At this time, a formed image is acquired by an image sensor 108 and stored as a scan image in a RAM 101. Note that here, it is preferable that anon-discharge nozzle is detected using a non-discharge detection pattern 812, and the chart is re-output until an output without non-discharge is obtained.

Next, in step S1702, the image processing unit 106 creates an intra-head correction table. FIG. 19B shows an example of the intra-head correction table obtained in this step. Details and creation of the table will be described later. Next, in step S1703, the image processing unit 106 acquires a characteristic as a target. In this embodiment as well, a line that connects a primary color Dp and paper white is obtained as a target characteristic. Note that an alternate long and short dashed line 1807 in FIG. 18C indicates an example of the target characteristic.

Next, in step S1704, the image processing unit 106 creates an inter-head correction table. FIG. 19C shows an example of the inter-head correction table obtained in this step. Details and creation of the table will be described later. Next, in step S1705, the image processing unit 106 creates output image data using the inter-head correction table and the intra-head correction table created above. More specifically, first, input color conversion processing and ink color conversion processing are performed for an input image I, thereby obtaining color signal image data. Also, an HS processing unit 303 applies the intra-head correction table shown in FIG. 19B and the inter-head correction table shown in FIG. 19C for each pixel of obtained color signal image data 312 after the ink color conversion in accordance with a nozzle that forms the pixel.

For example, if the signal value of a pixel corresponding to nozzle 0 is 20, a correction value "+1.70" is obtained by the intra-head correction table shown in FIG. 19B and an interpolation operation. At this time, the input signal value after intra-head correction can be calculated as 20+1.70=21.70. Also, if the head that forms the pixel is the left head, the signal value after correction can be calculated as 12.02 by the inter-head correction table shown in FIG. 19C and an interpolation operation. In this way, the two tables corresponding to the nozzle number are applied for each ink color of all pixels, thereby performing HS processing for the color signal image data.

Furthermore, non-discharge complement processing, dot size conversion processing, quantization processing, and dot size combination processing are performed for the color signal image data after the HS processing, thereby obtaining an output image corresponding to the input image I. Static processing is completed in accordance with steps S1701 to S1705 described above. Note that the color signal image data 312 after the HS correction is stored in the RAM and set to a target of dynamic correction to be described later.

<Creation of Intra-Head Correction Table>

As described above, in step S1705, the image processing unit 106 creates the intra-head correction table. As shown in FIG. 16B, in this embodiment, characteristics in the head regions (0 to 4999, 5000 to 9999, and 10000 to 14999) are almost similar characteristics. Hence, the intra-head correction table is created as a table common to the three heads to correct the similar characteristics in the heads. More specifically, first, the image processing unit 106 averages, in the scan image of a chart 810 obtained in step S1701, regions corresponding to patches 811 in the conveyance direction (y direction), thereby obtaining one-dimensional data. Furthermore, the image processing unit 106 divides the obtained one-dimensional data into sections corresponding to the regions 1604, 1605, and 1606 and calculates the average value of these.

Figure 18A:
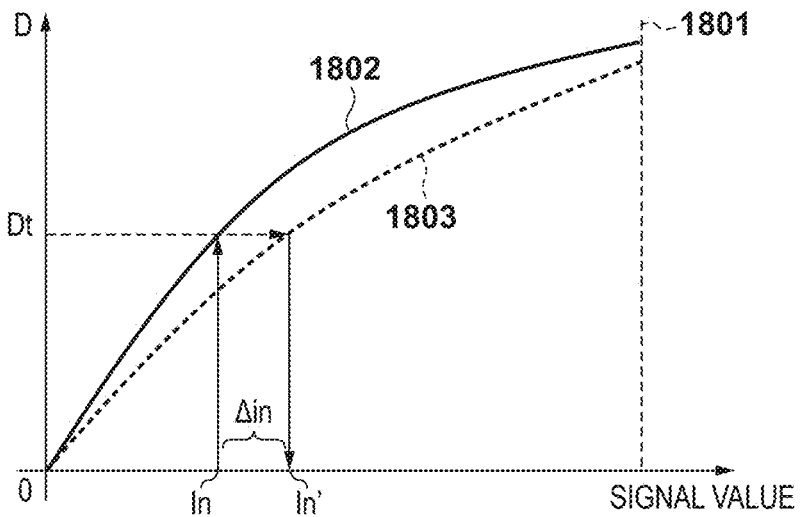
FIG. 18A is a view showing the outline of correction value calculation processing.

That is, for each of the patches 811, an average color development characteristic corresponding to each of the right head 1601, the center head 1602, and the left head 1603 is obtained. As a detailed example, the average color development characteristic of the center head 1602 is indicated by a curve 1802 in FIG. 18A. Note that the horizontal axis in FIG. 18A represents a signal value, and the vertical axis represents the distance D from paper white. In addition, reference numeral 1801 in FIG. 18A indicates an upper limit value of the horizontal axis, which is 255 when the input signal value is represented by 8 bits. Also, reference numeral 1803 in FIG. 18A represents a color development characteristic of a nozzle of nozzle number (relative number) 0 in the center head. In the head configuration shown in FIG. 16A, the relative nozzle number 0 of the center head corresponds to nozzle number (absolute number) 5000 throughout the three heads.

At this time, if the average color development characteristic 1802 is set to the target characteristic of the center head, a correction amount $\Delta in$ for an input value In of the relative nozzle number 0 of the center head can be calculated as shown in FIG. 18A. That is, a target value Dt corresponding to the input value In is calculated from the average color development characteristic 1802. Also, a signal value In' corresponding to the target value Dt is acquired from the nozzle characteristic 1803 of the relative number 0. The correction amount $\Delta in$ is then calculated by $\Delta in = In' - In$.

The above-described processing is performed using the average color development characteristics of the right head and the left head and the nozzle characteristic of the relative number 0 in each head, thereby obtaining the correction amounts $\Delta in$ for the relative number 0 as many as the number of heads. In this embodiment, three correction amounts $\Delta in$ are obtained, and the average value of these is set to the correction amount $\Delta in$ common to the three heads for the relative nozzle number 0. That is, when the processing is described using not relative numbers but absolute numbers, a correction value for a nozzle of a relative number n can be calculated as the average value of the correction amounts $\Delta in$ obtained by an absolute number (0+n), an absolute number (5000+n), and an absolute number (10000+n). Here, n is an integer that is 0 or more and is smaller than the number of nozzles in the head. In the above-described example, $0 \le n \le 4999$.

With the above-described processing, the correction value is calculated using the input value In=0 to 255, and a table that associates an input value with a correction value is created, thereby obtaining an intra-head correction table. Alternatively, only values corresponding to nine tones may be calculated and held as a table. In this case, when using the correction table, values other than the nine tones are calculated from the nine values by known interpolation processing. FIG. 19B shows an example of the intra-head correction table obtained in this way. In the example shown in FIG.

19B, a correction value from an average value is stored for each position in the head in correspondence with each of nine input signal values.

<Creation of Inter-Head Correction Table>

In step S1703 described above, the image processing unit 106 creates the inter-head correction table. More specifically, first, correction is performed for the one-dimensional data obtained in step S1703 using the intra-head correction table shown in FIG. 19B. Alternatively, the inter-head correction table is applied to color signal image data 312 of the tone chart 810 to output the image again, and one-dimensional data is acquired from the scan data of the output image again.

Figure 18B:
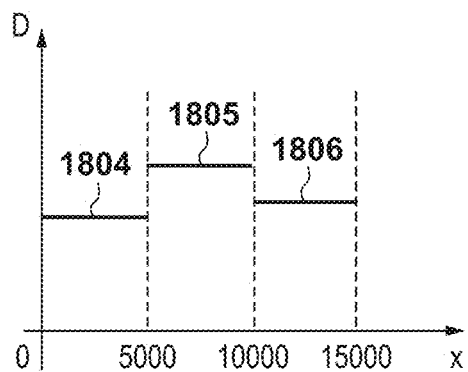
FIG. 18B is a view showing the outline of correction value calculation processing.

FIG. 18B shows one-dimensional data for each nozzle obtained in this way. Note that only a nozzle characteristic obtained from the patch of one tone is plotted in FIG. 18B for the sake of simplicity. Actually, the characteristics of the heads indicated by reference numerals 1804 to 1806 in FIG. 18B are obtained as many as the number of patches. As shown in FIG. 18B, by the intra-head correction table, nozzle characteristics 1804 to 1806 of the heads are corrected to average values in the heads. However, since the average values of the heads are different, images formed by the heads have different densities.

That is, images formed by the same tone patch have different densities in the regions 1604 to 1606.

In this embodiment, an inter-head correction table used to correct the characteristic of each head is created and applied, thereby correcting the density difference between the heads. More specifically, the image processing unit 106 first averages, in the scan image of the chart 810 obtained in step S1701, regions corresponding to the patches 811 in the conveyance direction (y direction), thereby obtaining one-dimensional data. Furthermore, the image processing unit 106 divides the obtained one-dimensional data into sections corresponding to the regions 1604, 1605, and 1606 and calculates the average value of these. That is, for each of the patches 811, a color development characteristic corresponding to each of the right head 1601, the center head 1602, and the left head 1603 is obtained.

As a detailed example, the color development characteristics of the heads are indicated by curves 1808 to 1810 in FIG. 18C. For example, the curve 1808 represents a color development characteristic D corresponding to the center head 1602. Similarly, the curve 1809 represents the color development characteristic D of the left head 1603, and the curve 1810 represents the color development characteristic D of the right head 1603. At this time, input values In' (corresponding to the left head), In" (corresponding to the center head), and In'" (right head) after correction of the heads for the input value In are obtained as shown in FIG. 18C. That is, first, the target value Dt corresponding to the input value In is calculated from the target characteristic 1807. Also, the signal values In'. In", and In'" corresponding to the target value Dt are acquired as correction values from the nozzle characteristics 1808 to 1810. When the correction values are calculated for all values of 0 to 255 as the input value In, an inter-head correction table in which different correction values are associated on a head basis is obtained.

Alternatively, only values corresponding to nine tones may be calculated and held as a table. In this case, when using the correction table, values other than the nine tones are calculated from the nine values by known interpolation processing. FIG. 19C shows an example of the inter-head correction table obtained in this way. In the example shown in FIG. 19C, the correction value In' of the left head, the correction value In" of the center head, and the correction value In'" of the right head are stored in association with each of nine input signal values In.

<Dynamic Correction Processing>

In dynamic correction according to this embodiment, only the density difference between the heads is recorrected. More specifically, steps S1704 and S1705 in the above-described static correction processing are executed again as dynamic correction. If dynamic correction is a part of static correction, processes can be shared, and as a result, the circuit scale and use of a program memory can be suppressed.

Note that as the target characteristic in creation of the inter-head correction table (step S1704), the target characteristic in the latest static correction is diverted, or the characteristic of the center head is set to the target characteristic. Also, in creation of the inter-head correction table (step S1704), when the chart shown in FIG. 8B is output for each ink color, four charts are output. To suppress wasted paper and the downtime, the number of tone patches of the inks (CMYK) may be limited to put the charts into one sheet.

More specifically, a chart formed by paper white+ink colors (CMYK)×3 tones (input values: 85, 170, 255)=a total of 13 patches may be output. Alternatively, since density-unevenness of yellow is less perceivable than density-unevenness of other inks, paper white+ink colors (CMK)× four tones (input values: 64, 128, 192, 255)=a total of 13 patches may be output.

Alternatively, instead of using even patches, a head characteristic may be acquired from the gradation chart shown in FIG. 13E to calculate the correction values.

In dynamic correction, only K ink may be corrected. In this case, the chart shown in FIG. 8B is output only in the K ink.

Alternatively, a color deviated from a user image may be estimated, and a tone chart shown in FIG. 8B may be output for the deviated color to perform correction.

The color development characteristic of a head may be acquired not from a chart but from a user image. That is, a region where almost the same input signal is obtained for each head is determined in advance as a characteristic acquisition region. A difference is acquired for the region of a scan image, and correction may be applied on a head basis based on the magnitude. For example, when the center head is set to a reference, and the D values of the left and right heads are low, pixel values in the heads are evenly increased to 1.01 times.

Note that the target of dynamic correction according to this embodiment is the image 312 that has undergone inter-head correction. That is, the density difference between the heads is calculated based on the image that has undergone inter-head correction, thereby further correcting the image that has undergone inter-head correction. At this time, not the image but the inter-head correction table 1704 may be modified to correct the image using the modified table.

If not a user image but a chart is used, a chart image before inter-head correction, that is, a chart image after only density-unevenness in each head is corrected in step S1702 may be output, and the color signal image data 312 may recreated after the correction table is replaced.

<Modifications>

Figure 16C:
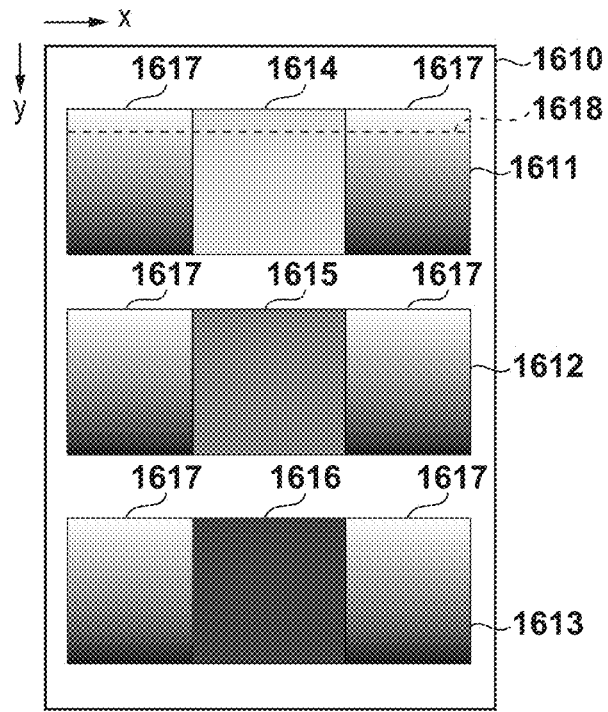
FIG. 16C is a view showing the outline of correction processing.

Note that in step S1704, the image processing unit 106 may output a chart 1610 for inter-head correction table calculation as shown in FIG. 16C for each of the ink colors (CMYK) and calculate correction values from the scan image of the chart. The chart 1610 shown in FIG. 16C is a chart used to calculate signal values after correction, which make density-unevenness minimum at the joint portion between adjacent heads in a case in which the characteristic of the center head is used as a reference. More specifically, the chart 1610 is formed by three blocks 1611 to 1613.

At this time, the blocks 1611 to 1613 have different signal values in regions (1614 to 1616) corresponding to the center head, and the signal values are, for example, 64, 128, and 255. Also, in all blocks, regions corresponding to the left and right heads are identical patches 1617. More specifically, each patch 1617 shown in FIG. 16C is a gradation patch with signal values from 0 to 255.

The correction values for the left and right heads are calculated by analyzing the blocks from the scan image of the chart 1610. More specifically, the patch 1617 is searched in the gradation change direction (y direction), thereby detecting a position y at which the density difference from the regions (1614 to 1616) corresponding to the center head in the blocks is smallest. A corresponding signal value is calculated from the position y and used as the signal value after correction. Note that this search is performed independently for each of the left and right heads. When the above-described processing is performed for each of the blocks (1611 to 1613), three sets each including the input signal value in and the signal value in' after correction are obtained for the left and right heads. The combination is obtained as a dynamic inter-head correction LUT, and interpolation operation processing is further combined, thereby correcting the density difference between the heads.

More specifically, the chart 1610 to which the intra-head correction LUT and the inter-head correction LUT created by static correction processing are applied is output, and the dynamic inter-head correction LUT is created from the scan image. The dynamic inter-head correction LUT is further applied to the color signal image data 312 to which the intra-head correction LUT and the inter-head correction LUT are applied in the static correction processing, thereby obtaining the color signal image data 312 that has undergone the dynamic correction. The above-described search of the position y will be described in more detail with reference to FIG. 16D.

Figure 16D:
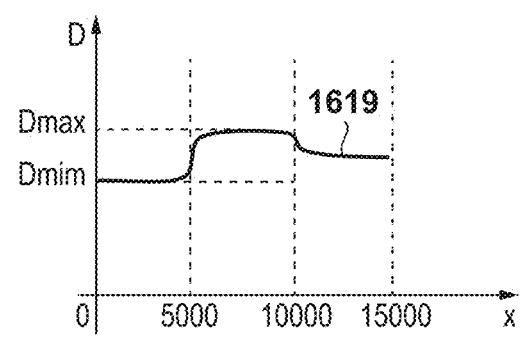
FIG. 16D is a view showing the outline of correction processing.

The horizontal axis in FIG. 16D represents a nozzle position. In the example shown in FIG. 16D, the head to record switches from the left head to the center head at nozzle number 5000. The vertical axis in FIG. 16D represents the distance D from paper white. At this time, a curve 1619 in FIG. 16D indicates a color development characteristic at a position y indicated by a dotted line 1618 in FIG. 16C from the scan image of the chart 1610. Note that the color development characteristic 1619 can be calculated using a color conversion LUT for converting scanner RGB into Lab and equation (1).

At this time, based on a maximum value Dmax and a minimum value Dmin of D in the region ($0 \leq x < 10000$) corresponding to the left head and the center head, a density difference $\Delta D$ between the heads can be calculated by $\Delta D = Dmax - Dmin$. Also, $\Delta D$ is calculated for all positions y in the block, and the position y at which $\Delta D$ is smallest is detected. A signal value corresponding to the position y is obtained as the signal value In' after correction.

When detection of the position y and calculation of In' are performed for the region ($5000 \leq x < 15000$) corresponding to the right head and the center head as well, the signal value In' after correction for the two heads can be calculated.

Note that when averaging processing is performed for the region of the same signal value in the x direction in each block of the scan image, a quantization error caused by a threshold matrix, an error of a sensor reading position, an error caused by noise or sensitivity, variations of nozzle characteristics, and the like can be reduced. Hence, before the search of the position y, averaging processing is preferably performed for the region that can be regarded as the same signal value. Also, the width to average in the x direction is preferably a multiple of the matrix size (for example, 256 pixels or 512 pixels).

Note that in the search of the position y, the position y may be searched not in the whole adjacent heads but only from the joint portion between the heads and the peripheral regions. For example, the maximum value Dmax and the minimum value Dmin may be calculated in the region of $4900 \leq x < 5100$.

In addition, correction processing by dynamic correction may be performed only for the joint portion between the heads and the peripheral regions. In this case, a value obtained by weighing and averaging a signal value before and after application of the dynamic inter-head correction LUT is preferably set to the signal value In' after correction.

More specifically, it is preferable to perform weighting averaging such that the weight before correction becomes large as the distance from the joint portion increases, thereby smoothly changing a portion where correction processing is performed and a portion where correction processing is not performed.

Note that in the above-described chart 1610, the number of blocks is not limited to three, and for example, nine or 17 blocks may be arranged. Since the interval of interpolation becomes short as the number of blocks increases, errors caused by the interpolation operation can be reduced.

On the other hand, if the number of blocks is increased, the height per block decreases. Hence, the influence of a quantization error caused by the characteristic of a matrix and the like readily increases.

For this reason, the number of blocks is preferably decided in consideration of reduction of errors in the interpolation operation, which can be implemented by increasing the number of blocks, and the increase of errors caused by the decrease of the block height.

Note that when using the above-described chart 1610, a correction value may be calculated from a position visually confirmed by the user, instead of analyzing a scan image captured by the image sensor.

For example, a chart 1610' (not shown) formed by adding a scale to the chart 1610 is prepared and periodically output. For example, every time a user image is printed on 100 sheets, the chart 1610' is output. The user visually confirms the output product of the chart and inputs, via an operation unit 103, a scale position where the density difference between the heads is minimum. At this time, the scale position is preferably input for each of the left and right heads. After that, the image processing unit 106 calculates the input values after correction in the left and right heads based on the input scale positions, forms LUTs, and applies these to regions corresponding to the heads in the color signal image data 312. This allows an image forming system 1 that does not include a sensor to dynamically correct density-unevenness between the heads.

Note that in addition to dynamic correction according to this embodiment and the modifications described above, dynamic correction processing described in the first and second embodiments may separately be performed for the intra-head table.

Fourth Embodiment (Hardware Configuration of Image Forming System)

Figure 21:
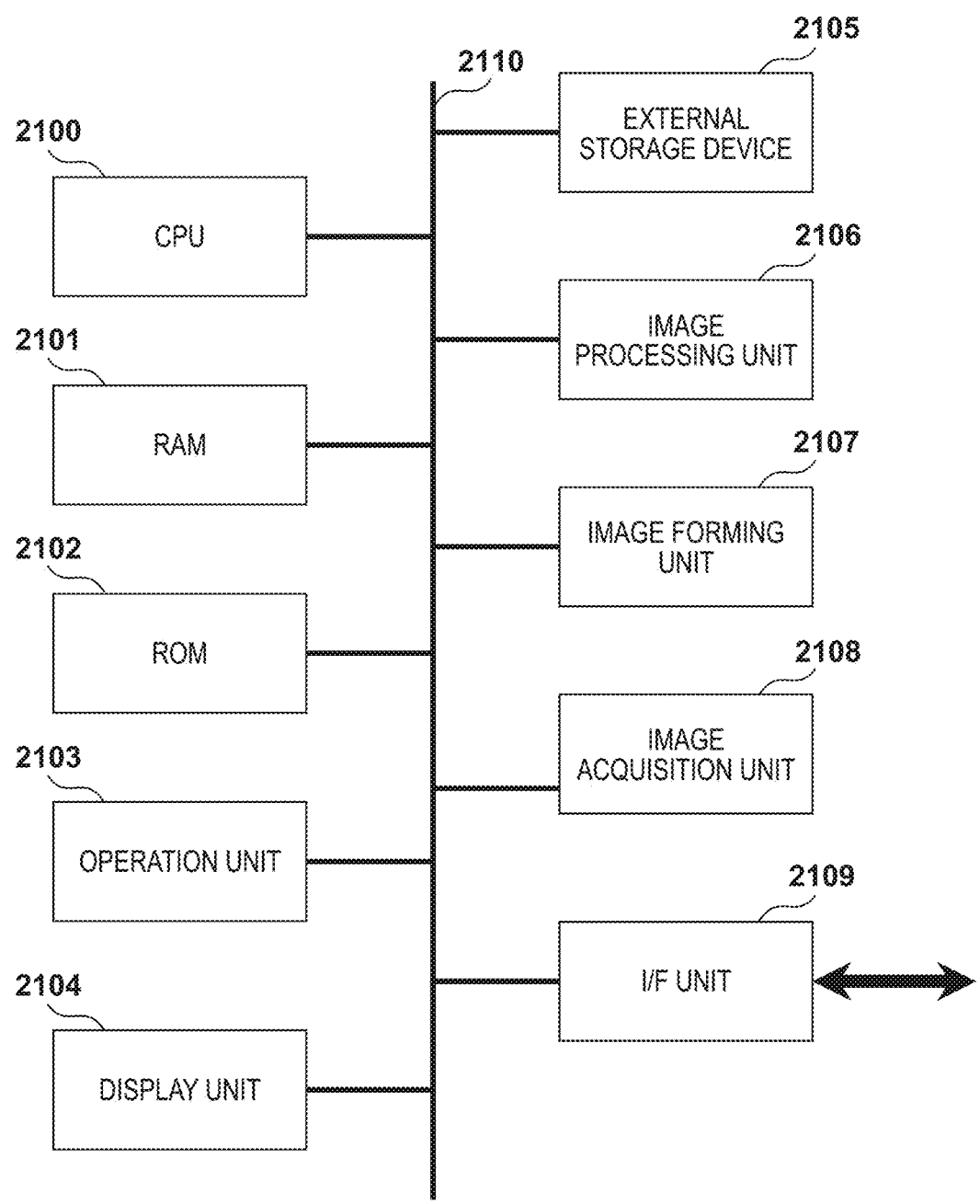
FIG. 21 is a view showing a hardware configuration according to the fourth embodiment.

FIG. 21 is a view showing the hardware configuration of an image forming system according to an embodiment of the present invention. The image forming system according to this embodiment includes a CPU 2100, a RAM 2101, a ROM 2102, an operation unit 2103, a display unit 2104, an external storage device 2105, an image processing unit 2106, an image forming unit 2107, an image acquisition unit 2108, an I/F (interface) unit 2109, and a bus 2110.

The central processing unit (CPU) 2100 controls the operation of the entire image forming system using input data and computer programs stored in the RAM and the ROM to be described later. Note that although a case in which the CPU 2100 controls the entire image forming system will be described here as an example, the entire image forming system may be controlled by causing a plurality of pieces of hardware to share processing.

The random access memory (RAM) 2101 includes a storage area configured to temporarily store computer programs and data read out from the external storage device 2105 and data received from the outside via the I/F unit 2109. Also, the RAM 2101 is used as a storage area used by the CPU 2100 to execute various kinds of processing, or a storage area used by the image processing unit 2106 to execute image processing.

The read only memory (ROM) 2102 includes a storage area configured to store setting parameters for setting the units in the image forming system, a boot program, and the like.

The operation unit 2103 is an input device such as a keyboard or a mouse and accepts an operation (instruction) by an operator. That is, the operator can thus input various kinds of instructions to the CPU 2100.

The display unit 2104 is a display device such as a cathode ray tube (CRT) or a liquid crystal screen, and can display the processing result of the CPU 2100 as an image, characters, or the like. Note that if the display unit 2104 is a touch panel capable of detecting a touch operation, the display unit 2104 may function as a part of the operation unit 2103.

The external storage device 2105 is a mass information storage device represented by a hard disk drive. The external storage device 2105 stores computer programs, data, and the like configured to cause the operating system (OS) or the CPU 2100 to execute various kinds of processing. The external storage device 2105 also holds temporary data (for example, image data to be input/output, a threshold matrix used by the image processing unit 2106, and the like) generated by processing of the units. The computer programs and data stored in the external storage device 2105 are appropriately read out under the control of the CPU 2100 and stored in the RAM 2101 as a target to be processed by the CPU 2100.

The image processing unit 2106 is implemented as a processor capable of executing a computer program or a dedicated image processing circuit, and executes various kinds of image processing for converting image data input as a print target into image data that can be output by an image forming apparatus to be described later. Note that instead of preparing a dedicated processor as the image processing unit 2106, the CPU 2100 may perform various kinds of image processing as the image processing unit 2106.

The image forming unit 2107 forms an image on a recording medium using a recording material based on image data received from the image processing unit 2106 directly or via the RAM or the external storage device.

The image acquisition unit 2108 is an image sensor (a line sensor or an area sensor) configured to capture the recorded image formed on the recording medium by the image forming unit 2107.

The I/F unit 2109 functions as an interface configured to connect the image forming system and an external device. The I/F unit 2109 also functions as an interface configured to exchange data with a communication apparatus using infrared communication, a wireless LAN (local area network), or the like, or an interface configured to connect the Internet. This enables transmission/reception of data, for example, an input image to/from an external device.

All the above-described units are connected to the bus 2110 and can transmit/receive data via the bus 2110. However, the image forming system may have a configuration in which each unit (for example, the image forming unit 2107) described above is connected via the I/F unit 2109.

[Hardware Configuration of Image Forming Unit and Image Acquisition Unit]

FIGS. 22A to 22D are views schematically showing the image forming unit 2107 according to an embodiment of the present invention. Note that the image forming unit 2107 according to this embodiment is an IJ printer that forms an image by discharging inks from nozzles onto a recording medium.

Figure 22A:
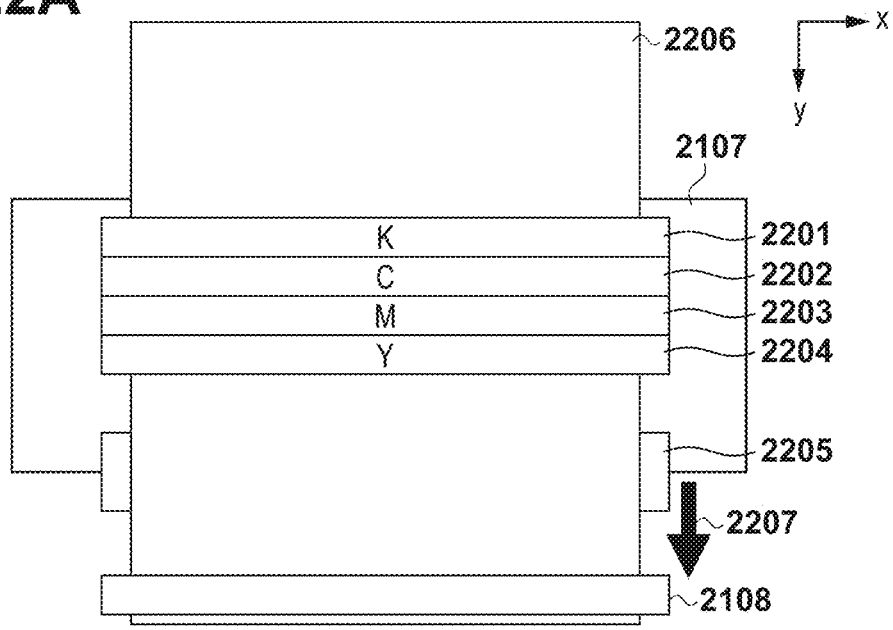
FIG. 22A is a view schematically showing an image forming unit according to the fourth embodiment.

As shown in FIG. 22A, the image forming unit 2107 includes a plurality of printheads 2201 to 2204 corresponding to black (K), cyan (C), magenta (M), and yellow (Y), respectively. Also, the printheads 2201 to 2204 are of so-called full-line type in which a plurality of nozzles configured to discharge ink are arrayed along a predetermined direction within a range corresponding to the width of recording paper 2206.

Figure 22B:
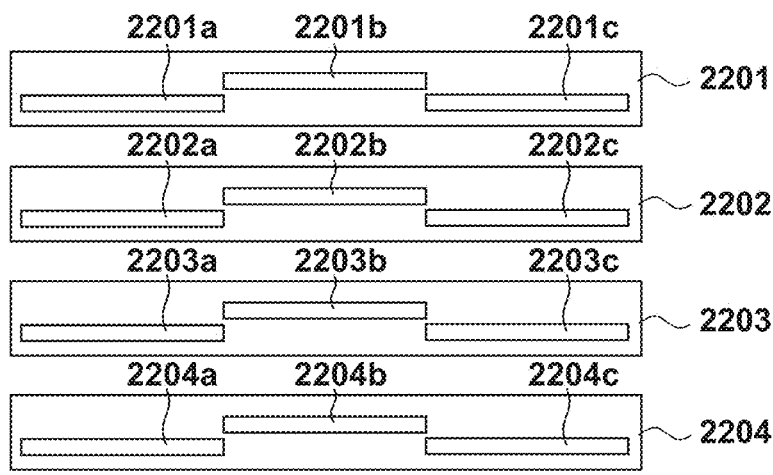
FIG. 22B is a view schematically showing the image forming unit according to the fourth embodiment.

At this time, the printheads 2201 to 2204 are each formed by combining a plurality of head modules, as shown in FIG. 22B. Head modules 2201*a*, 2201*b*, and 2201*c* that form the printhead 2201 are alternately arranged with respect to the paper conveyance direction.

Figure 22C:
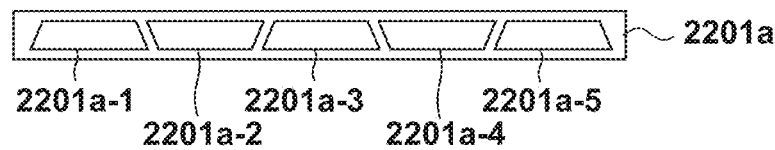
FIG. 22C is a view schematically showing the image forming unit according to the fourth embodiment.

Furthermore, as shown in FIG. 22C, the head module 2201*a* is formed by a plurality of chip modules 2201*a-1* to 2201*a-5*. At this time, the chip modules are connected to independent boards.

Figure 22D:
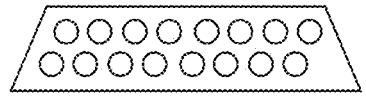
FIG. 22D is a view schematically showing the image forming unit according to the fourth embodiment.

FIG. 22D is a view showing one of the chip modules viewed from the sheet surface side, and shows that the chip module includes a plurality of nozzles. In the example shown in FIG. 22D, the chip module includes 16 nozzles. At this time, the resolution of the nozzle arrangement of the nozzle array of each ink color is, for example, 1,200 dpi.

The recording paper 2206 serving as a recording medium is conveyed in a direction indicated by an arrow 2207 in FIG. 22A when a conveyance roller 2205 (and other rollers (not shown)) is rotated by the driving force of a motor (not shown). During the conveyance of the recording paper 2206, inks are discharged from the plurality of nozzles of each of the printheads 2201 to 2204 in accordance with record data, thereby sequentially forming an image of one raster corresponding to the nozzle array of each printhead. As described above, the ink discharge operation from the printheads to the conveyed recording paper is repeated, thereby recording, for example, an image of one page.

Also, as shown in FIG. 22A, the image acquisition unit 2108 is a line sensor that is installed on the downstream side of the printheads 2201 to 2204 and covers the whole surface of the recording paper. That is, after an image is formed by the printheads 2201 to 2204, the recording paper 2206 is conveyed to the image acquisition unit 2108. The image acquisition unit 2108 sequentially captures the conveyed recording paper, acquires, for example, RGB information and brightness information, and stores the data as two-dimensional image data in the external storage device 2105.

Note that if the resolution of the sensor output value (RGB) acquired by the image acquisition unit 2108 and the resolution of the input image (CMYK) are different, resolution conversion is preferably performed for the output value of the sensor to make these match. The resolution conversion is preferably performed using a known nearest neighbor method, bilinear interpolation, bicubic interpolation, or the like.

If the skew of paper, the aberration of a spectroscopic sensor, or the like is large, geometric correction is preferably performed for the sensor output value. The geometric correction is preferably performed using known affine transformation or projective transformation.

The resolution conversion processing or geometric correction processing is performed by, for example, the image processing unit 2106. Alternatively, when acquiring a raster image, the image acquisition unit 2108 may perform the processing for each predetermined number of lines and transmit the sensor output value to a color conversion processing unit. At this time, the image forming unit 2107 may form an image while adding a marker to facilitate the conversion.

[Functional Configuration of Image Processing Unit]

The configuration of the image processing unit 2106 will be described below with reference to FIG. 23.

As shown in FIG. 23, the image processing unit 2106 is formed by an input color conversion processing unit 21061, a correction processing unit 21062, a HT (halftone) processing unit 21063, a header image adding unit 21064, a correction table creating unit 21065, and a correction table 21066.

The input color conversion processing unit 21061 converts input image data from the external storage device 2105 into image data corresponding to the color reproduction region of the printer. The input image data is, for example, data representing color coordinates (R, G, B) in color space coordinates such as sRGB that are the expression colors of a monitor.

The input color conversion processing unit 21061 performs processing of converting the data into color signals corresponding to a plurality of inks used in the image forming unit 2107. For example, if the image forming unit 2107 uses black (K), cyan (C), magenta (M), and yellow (Y) inks, the image data of the RGB signals are converted into image data formed by K, C, M, and Y color signals each formed by 8 bits.

The CMYK data output from the input color conversion processing unit 21061 represent the use amounts (applying amounts) of recording materials that the image forming unit 2107 discharges to the sheet surface to express an image. For this conversion, a known method, for example, matrix calculation processing or processing using a three-dimensional look-up table (LUT) can be used.

Note that the input data is not limited to data representing RGB and may be data directly indicating CMYK. Even in this case, to limit the total ink amount or perform color management, the input color conversion processing unit 21061 preferably performs processing using a four-dimensional LUT that converts input CMYK data into data C'M'Y'K' different from that.

The correction processing unit 21062 performs correction processing for stabilizing colors. For example, the correction table 21066 corresponding to each of the printheads 2201 to 2204 is looked up, and the image data of CMYK are changed in a direction for canceling density-unevenness and streaks that occur for each printhead.

FIG. 24 is a view showing the correction table according to this embodiment as an example.

In the correction table shown in FIG. 24, color signal values after correction, which correspond to input color signals (0, 16, 32, . . . , 240, 255), are stored for each of the printheads 2201 to 2204. For example, if, of the color signal image data of K, the input color signal value of a pixel corresponding to the printhead 2201a is 32, the correction processing unit 21062 changes the pixel value of the pixel to 28.

In this way, for the color signals of CMYK, if the color signal values are corrected by looking up a conversion table corresponding to each printhead, a density change that occurs on a printhead basis can be canceled.

Note that the correction processing may be performed not for each printhead but for each head module, each chip module, or each nozzle. Also, the correction processing may be performed for each nozzle block formed by a predetermined number of nozzles, for example, every eight nozzles.

At this time, for example, to perform the correction processing on a nozzle basis, the correction table 21066 includes columns as many as the nozzles. Alternatively, correction tables as many as the nozzles are held in advance as the correction tables 21066.

Note that in the correction table shown in FIG. 24, for an input color signal value that does not exist in the correction table, the color signal is calculated using interpolation processing from neighboring signal values stored in the table. Instead of using interpolation processing, color signal values after conversion may be stored in correspondence with all color signal values, as a matter of course. Alternatively, correction processing may be performed not using a correction table but by function conversion or matrix conversion.

Referring back to FIG. 23, the HT (halftone) processing unit 21063 performs HT processing for the image data after correction processing from the correction processing unit 21062, thereby generating image data that the image forming unit 2107 can express. For example, image data with 8 bits per pixel is converted into binary HT image data that has a value of 0 or 1 for each pixel. For the HT processing, dither processing that is a known method can be used. Another method such as error diffusion can also be applied.

The header image adding unit 21064 adds a header image to the image data after the above-described HT processing.

Figure 25A:
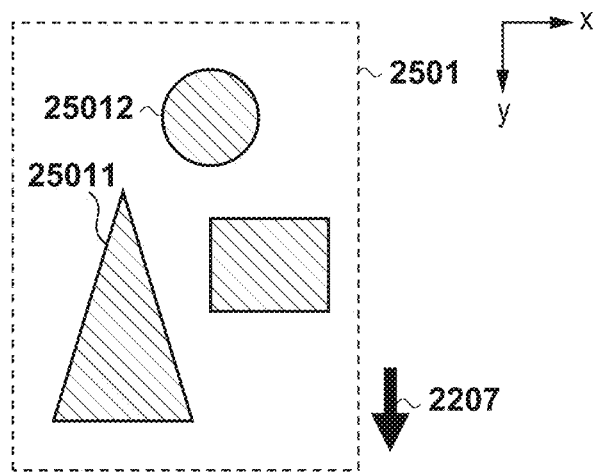
FIG. 25A is a view for explaining processing of a header image adding unit according to the fourth embodiment.

This will be described below in more detail with reference to FIGS. 25A to 25D. Reference numeral 2501 in FIG. 25A schematically represents image data after HT processing. Also, an arrow 2207 indicates the print direction of image data, which corresponds to the arrow 2207 in FIG. 22A. That is, a triangular FIG. 25011 in the image data 2501 is printed by the image forming unit 2107 and read by the image acquisition unit 2108 before a circular FIG. 25012.

The header image adding unit 21064 acquires the image data 2501 after HT processing, adds an image region 2502 to be printed earlier, and adds a header image 2503 to the region.

Figure 25B:
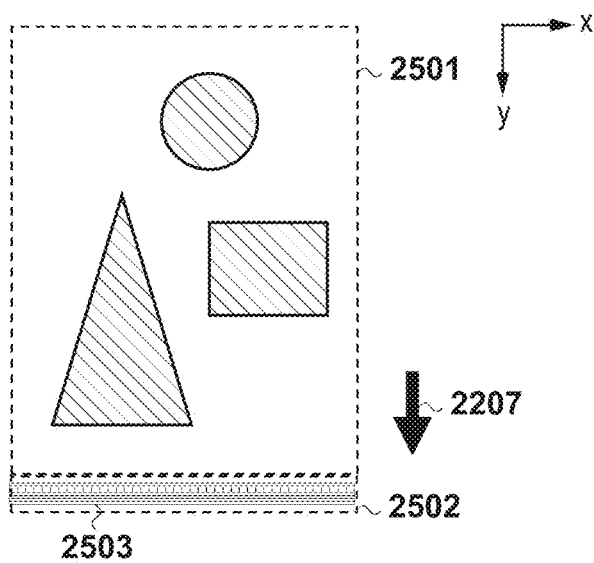
FIG. 25B is a view for explaining processing of the header image adding unit according to the fourth embodiment.

FIG. 25B schematically shows the image data after addition of the header image 2503. Also, FIG. 25D shows an enlarged view of the header image 2503 added in this embodiment.

Figure 25C:
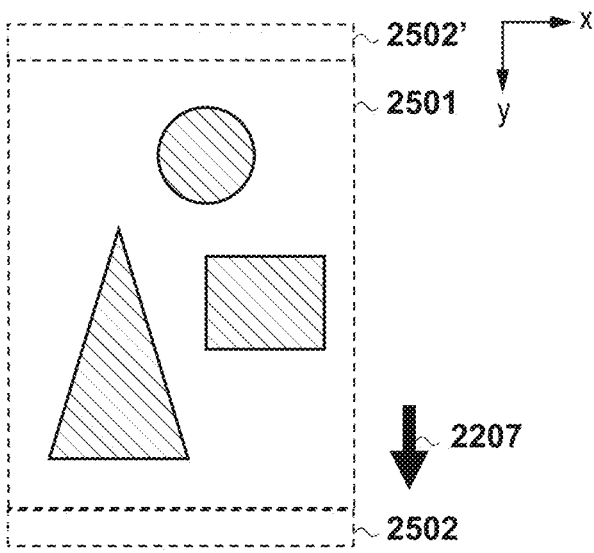
FIG. 25C is a view for explaining processing of the header image adding unit according to the fourth embodiment.
Figure 25D:
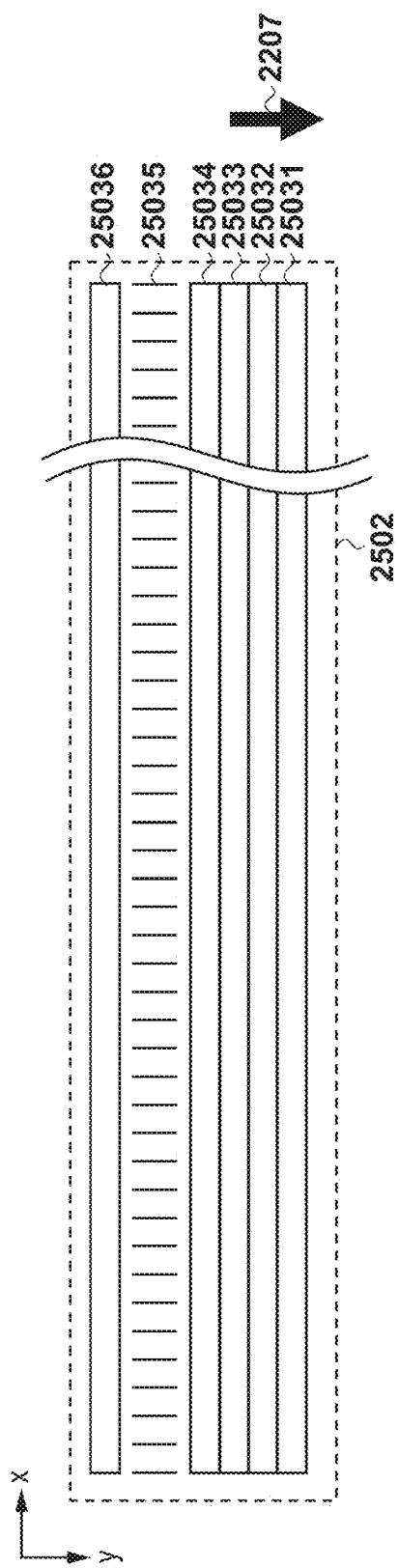
FIG. 25D is a view for explaining processing of the header image adding unit according to the fourth embodiment.

The header image shown in FIG. 25D is formed by preliminary discharge regions 25031 to 25034, a line pattern region 25035, and a tone data acquisition region 25036.

The preliminary discharge regions 25031 to 25034 correspond to the inks used by the image forming unit 2107. For example, the preliminary discharge region 25031 is a rectangular region formed by cyan (C) ink. At this time, the signal value of C ink is 1 (ON) for all pixels on binary image data corresponding to the preliminary discharge region 25031, and a so-called solid image of C ink is formed in the region.

That is, if the resolution is 1,200 dpi in the nozzle direction (x direction) and the conveyance direction (y direction) of the image forming unit, 1200×1200=1,440,000 C ink droplets per square inch are discharged to the preliminary discharge region 25031. At this time, for example, if the height of the preliminary discharge region 25031 in the conveyance direction is 0.1 [inch](2.54 [mm]), 120 C ink droplets are discharged to the region for all nozzles.

Similarly, the preliminary discharge region 25032 is for magenta (M) ink, the preliminary discharge region 25033 is for yellow (Y) ink, and the preliminary discharge region 25034 is for black (K), and the solid images of the inks are formed.

As shown in FIG. 25B, if the preliminary discharge regions 25031 to 25034 are provided as positions to be printed before the image data 2501, ink that is condensed in nozzles of low discharge frequency can be discharged before printing of the image data. It is therefore possible to suppress occurrence of density variations caused by the condensation of ink or a defect such as a blur or non-discharge in the image data 2501.

In particular, if an image is continuously formed using full-line type printheads as indicated by reference numerals 2201 to 2204 in FIG. 22A, it is difficult to discharge condensed ink out of the conveyance route of the recording paper 2206. Hence, to suppress defects caused by ink condensation without lowering the speed of image formation, it is preferable to add the preliminary discharge regions to image data, as described above, and discharge a predetermined amount of ink to the regions.

Note that the number of preliminary discharge regions included in the header image 2503 depends on the number of inks held by the image forming unit 2107 or the number of printheads. For example, if R (red), O (orange), W (white), and the like are held in addition to CMYK, preliminary discharge regions therefor are preferably provided. For example, if a total of six types of inks (CMYKRW) and printheads corresponding to these are held, the header image 2503 preferably includes a total of six preliminary discharge regions.

Referring back to FIG. 25D, the tone data acquisition region 25036 is a rectangular region formed by only one of the inks used by the image forming unit 2107. In this embodiment, the tone data acquisition region 25036 is formed by an HT image corresponding to a color signal value. The height and width of the rectangle are substantially the same as those of the preliminary discharge region. However, the height need not be the same as that of the preliminary discharge region.

More specifically, the same dither processing as that used by the HT processing unit 21063 is performed for an even rectangular region of each color signal value, and the result is held as an HT pattern in advance. At this time, one of the plurality of patterns is selected, and added as the tone data acquisition region 25036. Note that details of the pattern selection method will be described later.

The line pattern region 25035 is a region including a line pattern formed by the same ink color as the ink that forms the tone data acquisition region 25036.

Note that the line pattern region 25035 is not an essential component. In particular, when acquiring a nozzle characteristic on a nozzle basis, a nozzle position and a position on an acquired image can easily be aligned by referring to the line pattern. Hence, it is preferable to form the line pattern region 25035 in the image region 2502.

Also, as shown in FIG. 25B, the tone data acquisition region 25036 is preferably formed at substantially the same timing as the preliminary discharge regions 25031 to 25034.

For example, assume that the preliminary discharge regions 25031 to 25034 are added in the image region 2502 shown in FIG. 25C. At this time, it is not preferable that the tone data acquisition region 25036 is added not in the image region 2502 but in an image region 2502' to be printed after the image data. This is because when forming the image data 2501, condensation of ink occurs depending on the use frequency, and it may be impossible to appropriately acquire tone data in the tone data acquisition region 25036.

Referring to FIG. 23, the correction table creating unit 21065 receives read data corresponding to the tone data acquisition region 25036 from the image acquisition unit 2108 and creates the correction table used by the correction processing unit 21062. Details of the creation processing will be described later.

[User Image Printing Procedure]

Based on the components of the above-described image processing unit 2106, the procedure of user image printing and correction processing based on a formed image according to this embodiment will be described below with reference to a flowchart shown in FIG. 26.

First, the user submits a print job to the image forming system via the operation unit 2103. More specifically, an input image file name in the external storage device 2105 and the number of copies are designated.

When the print job is submitted, based on the designated input image file name, the image processing unit 2106 acquires input image data stored in the external storage device 2105 (step S2601). Assume that the acquired input image data is image data of the RGB 8-bit format.

Next, in step S2602, the input color conversion processing unit 21061 performs input color conversion for the input image data. By this processing, the input image data is converted into image data formed by color signal values representing the applying amounts of recording materials (CMYK).

Next, in step S2603, the header image adding unit 21064 initializes a sheet counter (to be simply referred to as a counter hereinafter) cnt to 0.

Furthermore, in step S2604, the correction processing unit 21062 performs correction processing based on the correction table 21066 for the image data after conversion in step S2602.

Next, in step S2605, the HT processing unit 21063 performs HT processing for the image data after the correction processing.

Next, in step S2606, the header image adding unit 21064 adds a header image based on the counter cnt to the image data after the HT processing.

More specifically, the ink color and the color signal value, which form the tone data acquisition region 25036, are changed based on the counter cnt.

For example, a case in which the ink color is changed to four types including CMYK, and the color signal value is changed to five types including 0, 64, 128, 192, and 255 will be described as an example. At this time, for counter cnt=0, an HT pattern corresponding to a color signal value of 0 of C ink is acquired and added as the tone data acquisition region 25036. If counter cnt=1, an HT pattern corresponding to a color signal value of 64 of C ink is added as the tone data acquisition region 25036.

Here, the HT pattern corresponding to a color signal value of 64 of C ink in this embodiment is image data obtained by performing HT processing for an even rectangular region with a color signal value of 64. At this time, if dither processing is used in the HT processing (step S2605) of the input image data, the same dither processing is preferably used when generating the HT pattern in the tone data acquisition region 25036. That is, if the tone data acquisition region 25036 is formed by C ink, the HT pattern to be added to the tone data acquisition region 25036 is preferably generated using a dither matrix used for image data of C ink in the HT processing (step S2605).

Note that at this time, the size of the rectangular region equals the size of the tone data acquisition region 25036, and the obtained image data is, for example, binary image data.

Similarly, for counter cnt=2, 3, and 4. HT patterns corresponding to color signal values of 128, 192, and 255 of C ink are acquired and added.

Also, for counter cnt=5 to 9, HT patterns corresponding to color signal values of 0, 64, 128, 192, and 255 of M ink are acquired and added. For counter cnt=10 to 14, HT patterns corresponding to color signal values of 0, 64, 128, 192, and 255 of Y ink are acquired and added, and for counter cnt=15 to 19, HT patterns corresponding to color signal values of 0, 64, 128, 192, and 255 of K ink are acquired and added.

Note that in the HT pattern corresponding to a color signal value of 0, all pixels are 0 (OFF). If this pattern is selected, no ink is discharged to the tone data acquisition region 25036.

On the other hand, in the HT pattern corresponding to a color signal value of 255, all pixels are 1 (ON). If this pattern is selected, a so-called solid image is formed in the tone data acquisition region 25036.

If the ink color and the color signal value are changed based on the counter cnt in this way, even in a case in which only tone data corresponding to a single color signal value of a single ink is acquired from each tone data acquisition region 25036, tone data corresponding to the color signal value of each ink can be acquired by combining the data of the plurality of tone data acquisition regions.

Note that the ink color need not always be changed to all ink colors dischargeable by the image forming unit 2107. For example, the ink to form may be fixed to K ink with a high degree of contribution to the density, and only the signal value may be changed. In this case, correction processing to be described later is performed only for the K ink.

Alternatively, the ink may not be changed to yellow (Y) ink whose variation is more difficult to perceive, and may be changed to only three types of inks including CMK.

The tone values are not limited to the above-described five types (0, 64, 128, 192, 255). For example, 33 values (0, 8, 16, . . . , 232, 240, 248, 255) obtained by evenly dividing values of 0 to 255 may be used. A value of 0 or 255 need not always be included, and the intervals of tone values may be uneven.

Note that instead of adding the HT pattern generated in advance as step S2606, color signal data may be added before the HT processing (step S2605), and then subjected to the HT processing (step S2605) together with the input image data.

Referring back to FIG. 26, next, in step S2607, the image forming unit 2107 forms an image on paper based on an HT image to which the header image is added. Thus, a formed image 2400 is created.

Next, in step S2608, the image acquisition unit 2108 performs image capturing for the formed image 2400 and acquires two-dimensional captured image data.

Next, in step S2609, the correction table creating unit 21065 refers to the counter cnt, and judges whether one set of data necessary for correction is acquired.

For example, if tone data acquisition regions are newly formed and captured for all combinations of ink colors and color signal values, it is judged that one set of necessary data is acquired.

More specifically, in the above-described example in which the ink color is changed to four types, and the color signal value is changed to five types, if counter cnt=19, it is judged that one set of data is acquired. If counter cnt<19, it is judged that one set of data is not acquired.

Upon judging in step S2609 that one set of data is acquired, the process advances to step S2610 to perform creation and updating of a correction table based on the tone data acquired by the correction table creating unit 21065. Details of processing of step S2610 will be described later.

On the other hand, upon judging in step S2609 that one set of data is not acquired, the process advances to step S2611.

In step S2611, the image processing unit 2106 determines whether the submitted print job is completed. Typically, if sheets as many as the number of sheets designated by the user in step S2601 are printed, the print job is completed. Also, if a print stop instruction is separately input by the user, printing is completed. If it is judged that the print job is completed, the procedure is ended.

On the other hand, if it is judged that the print job is not completed, the process advances to step S2612, and the header image adding unit increments the counter cnt by one. After that, the process returns to step S2606 to continue printing.

In step S2613, the image processing unit 2106 determines whether the print job is completed, as in step S2611. If it is judged that the print job is completed, the procedure is ended.

On the other hand, if it is judged that the print job is not completed, the process returns to step S2603 to initialize the counter to 0 again (step S2603). Furthermore, correction processing (step S2604) based on the updated correction table and HT processing (step S2605) for the corrected image data are performed, and the process then returns to step S2606 to continue printing.

The image designated by the user can be printed on sheets as many as the designated number of sheets in accordance with step S2601 to S2613 described above. In addition, when a header image is added in the printing, and correction processing for suppressing density-unevenness and streaks is performed based on the read result of the image, the quality of the printed image can be held against a temporal change.

Note that in the above description of step S2609, if formation and image capturing are performed for all combinations of ink colors and color signal values, one set of data is acquired. At this time, if data are acquired not once but, for example, five times for each of the combinations, it may be judged that one set of data is acquired. In this case, correction processing is performed in step S2610 based on an average read value obtained by averaging five read values for each combination. If correction is performed based on the average read value, the frequency of correction becomes low. On the other hand, it is possible to suppress lowering of correction accuracy due to the influence of an error included in the read value, for example, a read error of a sensor or a flaw or dirt on a sheet surface.

Alternatively, if formation and image capturing for a predetermined color signal value are completed for an ink color, it may be judged that one set of data is acquired. In the above-described example, when counter cnt=4, formation and image capturing for five tones (0, 64, 128, 192, and 255) are completed for the C ink. At this time, judging that one set of data is acquired for the C ink, correction processing may be executed only for the C ink.

Figure 26:
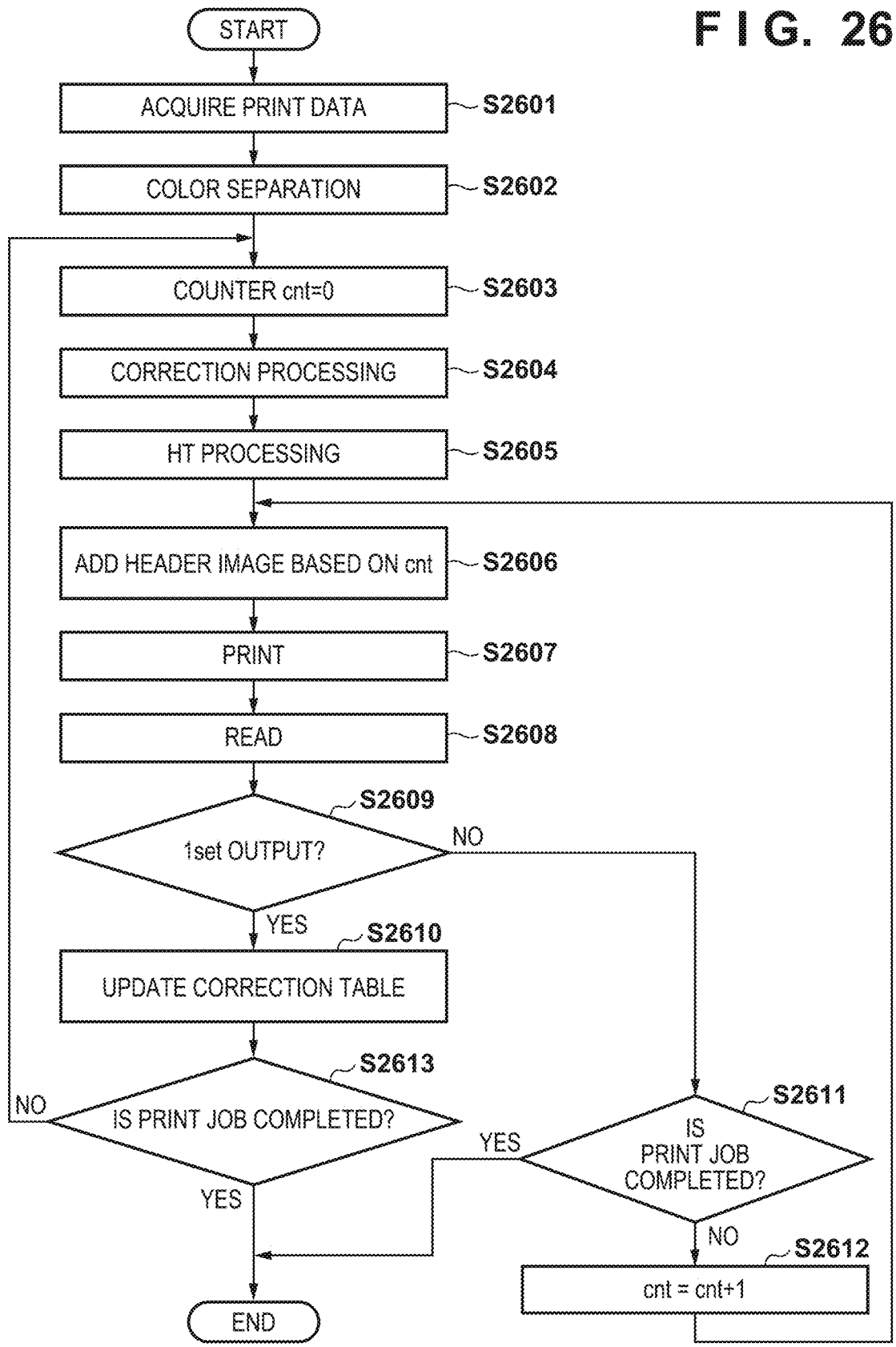
FIG. 26 is a flowchart showing correction processing according to the fourth embodiment.

Note that in accordance with the above-described procedure shown in FIG. 26, the header image 2503 is added to all pages to be printed. However, if preliminary discharge is performed for each page, the frequency may be excessive. In this case, header image addition may be performed intermittently. For example, the header image 2503 may be added at a rate of one page per 10 pages.

In addition, depending on the degree of the temporal change of the printhead or module, if tone data is acquired for each page, the frequency may be excessive. In this case, a header image including only preliminary discharge regions may be added at a rate of one page per 10 pages, and a header image additionally including a line chart and a tone data acquisition region may be added further at a rate of one page per 10 pages, that is, at a rate of one page per 100 pages.

[Updating of Correction Table]

Figure 27:
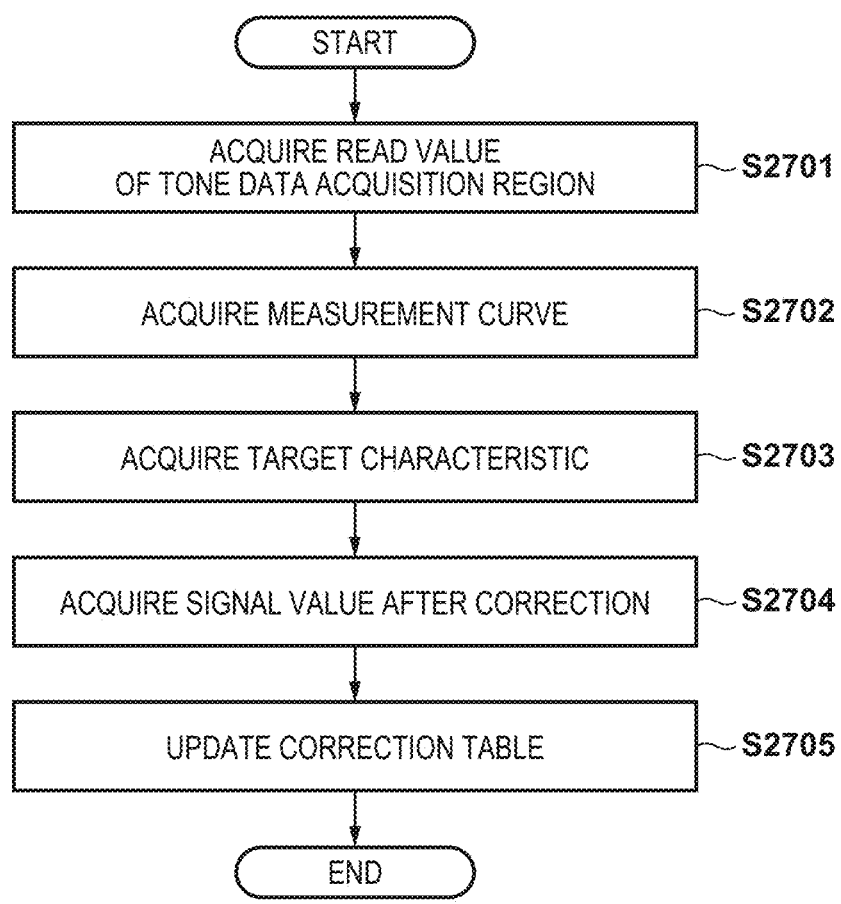
FIG. 27 is a flowchart showing correction table creation processing according to the fourth embodiment.

FIG. 27 is a flowchart showing a correction table creation procedure according to this embodiment. The correction table creation processing will be described below with reference to the procedure shown in FIG. 27.

First, in step S2701, the correction table creating unit 21065 refers to the image read in step S2608 described above, and acquires a read value corresponding to the tone data acquisition region 25036.

For example, the image data of the printed product 2400 that is captured with three channels of RGB by the image reading unit 2108 is converted using a color conversion table prepared in advance in accordance with the color characteristic of the optical sensor, thereby obtaining a read value of one channel.

More specifically, a color conversion table for converting a value into a 16-bit value that is linear with respect to Y of the CIEXYZ color space is held in advance. Values obtained by converting the RGB values of each pixel using the color conversion table can be used as the read values of each pixel.

Alternatively, a value that is linear to L* of CIE Lab* or the density can be used as the read value. If the measurement image is recorded by color inks of C, M, Y, and the like, not a value corresponding to brightness but a value corresponding to chroma can be used. Alternatively, as a value corresponding to the complementary color of each of C, M, and Y, the output value of each of the R, G, and B channels may directly be used as the read value.

In addition, the correction table creating unit 21065 calculates a read value corresponding to each correction unit of the correction table from the read value of each pixel. For example, if the correction unit is the nozzle unit, read values are averaged for pixels formed for each nozzle.

More specifically, the read values of the pixels corresponding to the tone data acquisition region 25036 are averaged in the sheet conveyance direction, thereby obtaining a read value corresponding to each nozzle position as one-dimensional data in the nozzle array direction. More specifically, assume that the resolution in the conveyance direction (y direction) is 1,200 dpi, and the height of the preliminary discharge region 25031 in the conveyance direction is 0.1 [inch] (=2.54 [mm]). In this case, for an x position corresponding to each nozzle, the read values of 120 pixels are averaged in the y direction, thereby calculating the read value corresponding to each nozzle.

Alternatively, if the correction unit is the head module unit, the read values are averaged in a rectangular region formed by each head module, thereby calculating the read value for each head module.

At this time, if the header image 2503 includes a line pattern, as shown in FIG. 25D, the correspondence between an x position on the read image and each nozzle can accurately be estimated based on the pattern.

Note that there may be a case in which the meandering of a sheet is large, and a deviation of one or more pixels occurs on the read image even within the image height of the header image 2503 (the height in the y direction). In this case, instead of arranging a line pattern only on one side of the tone data acquisition region 25036, two line patterns are preferably arranged on both sides to sandwich the tone data acquisition region in the conveyance direction. If a plurality of line patterns are arranged in this way, the meandering amount can be estimated, and the correspondence between each nozzle and an x position on the image can more accurately be estimated.

Referring back to FIG. 27, next, in step S2702, the correction table creating unit 21065 calculates a measurement curve corresponding to each correction unit based on the read values of a plurality of tone data acquisition regions 25036 formed by the same color. Here, the measurement curve is a curve representing the relationship between the above-described read value and a color signal value that forms the tone data acquisition region 25036.

Figure 28A:
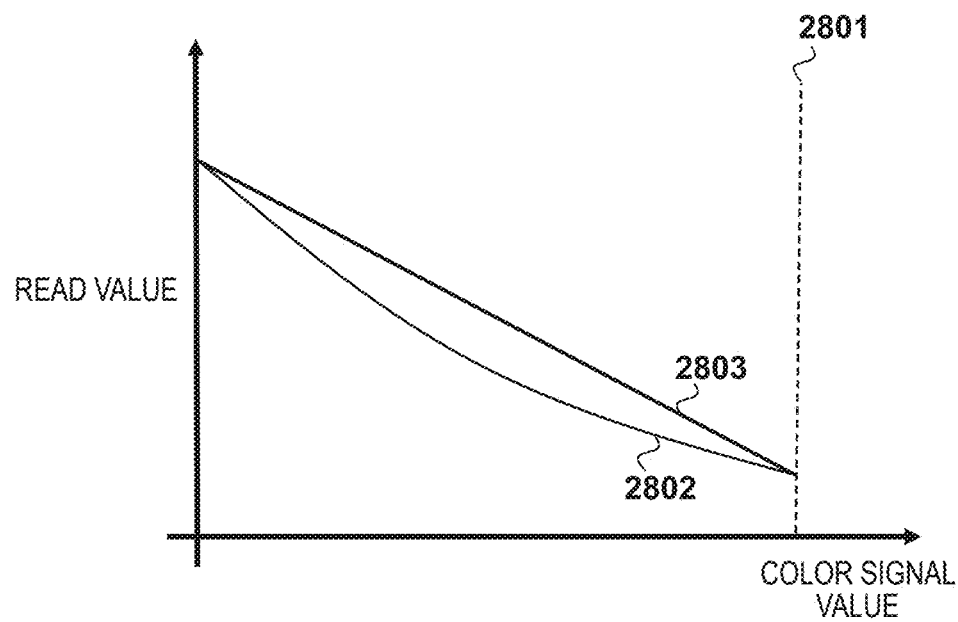
FIG. 28A is a view for explaining the processing contents of a correction table creating unit according to the fourth embodiment.

FIG. 28A shows an example of the calculated measurement curve. The horizontal axis of FIG. 28A represents the color signal value of the tone data acquisition region 25036, and the vertical axis represents the read value of each correction unit obtained from the tone data acquisition region.

Reference numeral 2801 in FIG. 28A denotes an upper limit value on the horizontal axis. For example, if the input signal value includes 8 bits, the value is 255. Reference numeral 2802 denotes a measurement curve obtained by an interpolation operation from one or more color signal values corresponding to the same correction unit, for example, same nozzle and read values corresponding to these. At this time, for example, piecewise linear interpolation can be used as the interpolation method. Alternatively, a spline curve, a bicubic interpolation method, or the like can be used.

Note that as for the measurement curve 2802, different measurement curves are obtained in accordance with the characteristics of the nozzles or head modules. However, to avoid complexity of the drawing, FIG. 28A shows only one of them.

Referring back to the flowchart of FIG. 27, in step S2703, the correction table creating unit 21065 acquires a target characteristic 2803. Here, the target characteristic is a curve or a line showing, as the target, the relationship between each color signal value and a read value that should be formed after application of the correction table. For example, as shown in FIG. 28A, a line that linearly changes with respect to the tone can be obtained as the target characteristic.

The target characteristic is not limited to this, and a module or a nozzle may be set as a reference, and the measurement curve of the module or the nozzle may be obtained as the target characteristic 2803. Alternatively, a curve obtained by averaging two or more measurement curves may be obtained as the target characteristic 2803

The target characteristic 2803 may be determined based on another value. For example, a curve that causes a color signal value and a distance D from the recording medium color (paper white) on the CIE Lab space to have a linear relationship may be held as the target characteristic in advance. Here, the distance D from paper white can be calculated by the equation (1).

Referring back to the flowchart of FIG. 27, next, in step S2704, the correction table creating unit 21065 acquires a color signal value after correction corresponding to each color signal value, thereby creating the correction table shown in FIG. 24.

Acquisition of a color signal value after correction will be described in detail with reference to FIG. 28B.

First, a number x of a nozzle or a module for which the color signal value after correction is to be calculated and a color signal value 2804 are decided. At this time, a target value 2805 corresponding to the color signal value 2804 can be calculated from the target characteristic 2803. Also, a color signal value 2806 after correction corresponding to the target value 2805 can be acquired from the measurement curve 2803 corresponding to the nozzle or module x.

At this time, the correction table creating unit 21065 associates the acquired color signal value 2806 after correction with the input color signal value 2804 and stores these as the correction table 21066 of the nozzle or module number x.

At this time, correction values may be calculated for all values of 0 to 255 as the input color signal value 2804 and held as the table of the nozzle of interest.

Alternatively, as shown in FIG. 24, a total of 17 signal values of 0, 16, 32, . . . , 240, and 255 may be determined in advance, and values corresponding to the signal values may be calculated and held as a table. In this case, when using the correction table, a color signal value that is not held is calculated from, for example, adjacent values by known interpolation processing.

The above-described processing is repeated for all ink colors (CMYK) and nozzles or modules, thereby creating a correction table.

After the correction table is created, in step S2705, the correction table creating unit 21065 updates the newly created correction table as the correction table 21066 on the memory 2101 or the external storage device 2105.

A correction table as shown in FIG. 24 can newly be created and updated in accordance with the procedure shown as steps S2701 to S2705. By updating the correction table in this way, even if the characteristic of each nozzle or head module has changed from the preceding creation time, the values in the correction table can be changed in accordance with the change, and as a result, occurrence of density-unevenness and streaks caused by a temporal change can be suppressed.

Note that in the above description, the correction processing unit 21062 performs correction processing for input image data (CMYK). However, the same effect as described above can be obtained by performing correction processing for a threshold matrix for each image data used in the HT processing unit 21063.

[Detection of Non-Discharge Nozzles]

If a line pattern region is included in an image, non-discharge nozzles may be detected from there. When performing detection, the phase of the line pattern is preferably changed in accordance with the counter cnt such that all nozzles can be detected. At this time, the number of phase changes, that is, the interval of lines is preferably matched with the change tones of the tone data acquisition region 25036 because these can be managed by one counter cnt.

For example, assume that four tones (64, 128, 192, and 255) are acquired for each ink color. At this time, the line pattern is formed at an interval of four nozzles, as shown in FIGS. 29A to 29D.

Note that FIGS. 29A to 29D are views schematically showing HT patterns. More specifically, grids in FIGS. 29A to 29D schematically show positions where the image forming unit 2107 can arrange droplets. For example, if the printing resolution in the array direction x of nozzles and the conveyance direction y of recording paper is 1,200 dpi, the height and width of each grid are 25.4/1200 [mm]. Also, a black circle in a grid indicates that a dot is arranged at that position (ON).

In the example shown in FIGS. 29A to 29D, the held nozzles are given nozzle numbers 1, 2, 3, 4, . . . from left, and a line is formed by each nozzle for which a remainder obtained by dividing the nozzle number by 4 equals the counter cnt. For example, if counter cnt=1, lines are formed by nozzles whose nozzle numbers of C ink correspond to 1, 5, 9, 13 . . . , as shown in FIG. 29A, and non-discharge of nozzles corresponding to these numbers is detected from the read image.

Similarly, for counter cnt=2, 3, and 4, as shown in FIGS. 29B, 29C, and 29D, line patterns with different phases of nozzles to discharge are formed.

Also, if counter cnt=5 to 9, line patterns as shown in FIGS. 29A to 29D are formed by M ink, and non-discharge is detected. If counter cnt=10 to 14, line patterns as shown in FIGS. 29A to 29D are formed by Y ink, and if counter cnt=15 to 19, line patterns as shown in FIGS. 29A to 29D are formed by K ink, and non-discharge is detected.

When the nozzle position and the ink color to form a non-discharge line are changed in accordance with the counter cnt, non-discharge detection can be performed for all nozzles.

[HT Processing]

As described above concerning FIGS. 29A to 29D, in this embodiment, two HT images, that is, the input image (reference numeral 2501 in FIGS. 25A to 25C) and the tone data acquisition region (reference numeral 25036 in FIG. 25D) are printed.

Note that in the above description of header image addition processing (step S2606), the same dither processing is preferably used even in generation of the HT pattern in the tone data acquisition region 25036.

However, the HT pattern to be added to the tone data acquisition region 25036 may be generated using HT processing different from HT processing for input image data. For example, if HT processing for input image data is dither processing, the HT pattern may be generated by error diffusion. Alternatively, a periodical pattern such as a so-called checker pattern may be used as the HT pattern to be added.

In some cases, the characteristic of a printhead, a module, or a nozzle depends on the discharge state of a peripheral nozzle. For example, there is a case in which a power supply or ink is shared by peripheral nozzles or modules. In this case, the amount, speed, or angle of a discharged ink droplet may be different between a case in which sharing nozzles on the periphery simultaneously discharge ink and a case in which each nozzle solely discharges ink. Alternatively, after a droplet lands, if a droplet that has already landed but not completely permeated exists on the periphery, the droplets may be attracted or connected to each other.

In this case, if the tone data acquisition region 25036 is formed using HT processing different from HT processing for input image data, a deviation may occur between a correction amount obtained from acquired tone data and density-unevenness or streaks that occur on the input image data. For this reason, if such a deviation is expected, the same processing is preferably used as the HT processing.

For example, in a case of dither processing, the same dither mask is preferably used. Alternatively, in error diffusion processing, the same diffusion coefficient, threshold, or initial error is preferably used.

Furthermore, in this embodiment, for an even input signal value, HT processing for making the number of dots even in the conveyance direction is preferably performed. That is, the arrangement of dots is preferably decided such that the use rates of the nozzles become substantially equal for an even input signal value.

More specifically, if the dither method is used as HT processing, a pixel for which the threshold of the dither matrix is small changes to dot ON at a high probability, and a pixel for which the threshold is large changes to dot OFF at a high probability. Hence, if the small thresholds of pixels that readily change to dot ON are biased to a specific nozzle array, nozzles that frequently discharge ink and nozzles that do not frequently discharge ink are generated. As a result, in a nozzle of a low discharge frequency, the possibility that a defect due to condensation of ink occurs becomes high.

Also, if the dot positions of the HT pattern to be added as the tone data acquisition region 25036 are biased to a specific nozzle, the number of ink discharges changes between the nozzles. As a result, read values for the same input signal value may not match between the nozzles of substantially the same characteristic.

For example, a read value corresponding to a nozzle to which many dots are assigned on the HT pattern and a read value corresponding to a nozzle to which less dots are assigned may deviate because of the number of assigned dots.

It is difficult to acquire the discharge characteristic of each nozzle from the read value that does not substantially match due to not the nozzle characteristic but the number of assigned dots, and as a result, the effect of correction processing may decrease. Also, if the number of output dots for the same color signal value changes between nozzle positions, even if a density variation derived from the discharge characteristic of each nozzle can correctly be corrected, how the correction works (the number of output dots) may change between the nozzles, and the density-unevenness correction effect may decrease.

Considering the above, in this embodiment, it is effective to use a dither matrix in which the arrangement of thresholds is adjusted such that the generation frequency of dots formed by each nozzle for the same color signal value becomes even.

At this time, the difference of the total number of dots between the nozzles is preferably 1 dot or less. Also, if the size of the dither matrix is 256 px×256 px, the total number of dots of each nozzle is preferably 1 dot or less for a height of 256 px.

For example, if the height of the tone data acquisition region 25036 is 130 px, the total number of dots of each nozzle is preferably substantially the same even in a limited region formed by dividing the matrix by the height of 130 px.

[Number of Dots Discharged in Preliminary Discharge Region]

In the above description, the preliminary discharge regions 25031 to 25034 are so-called solid images. At this time, as shown in FIG. 25D, each nozzle corresponding to the ink preliminarily discharges ink droplets substantially as many as the droplets of other inks before the tone data acquisition region 25036 is formed. For this reason, the possibility that a defect caused by ink condensation occurs in the tone data acquisition region 25036 is low.

On the other hand, the number of dots be discharged in the preliminary discharge region is related to the running cost of the image forming system. It is therefore preferable to discharge, in the preliminary discharge region, droplets whose amount is sufficient for discharging condensed ink and whose number is as small as possible.

If a line pattern is output between the preliminary discharge region and the tone data acquisition region, as shown in FIG. 25D, ink is discharged by the output of the line pattern, too. That is, in these nozzles, equivalent preliminary discharge can be performed even if the number of dots in the preliminary discharge region is decreased by the number of dots in the line pattern.

At this time, the amount sufficient for discharging condensed ink means, for example, the number of dots discharged by the other inks in the preliminary discharge regions 25031 to 25034.

More specifically, assume that a line pattern shown in FIG. 30A is formed by nozzle number x=1 to 8. FIG. 30A shows a so-called solid pattern in which all pixels form dots (ON).

At this time, if, in place of the solid pattern shown in FIG. 30A, a pattern in which the dots are turned off as many as the number of dots of the line pattern, as shown in FIG. 30B, is used as the HT pattern in the preliminary discharge region, the ink amount can be reduced.

More specifically, in the example shown in FIG. 30B, four dots are turned off in each of nozzles corresponding to nozzle numbers 1, 5, 9, . . . . At this time, arbitrary dots are turned off, and, for example, a pattern as shown in FIG. 30C can also be used.

Figure 31:
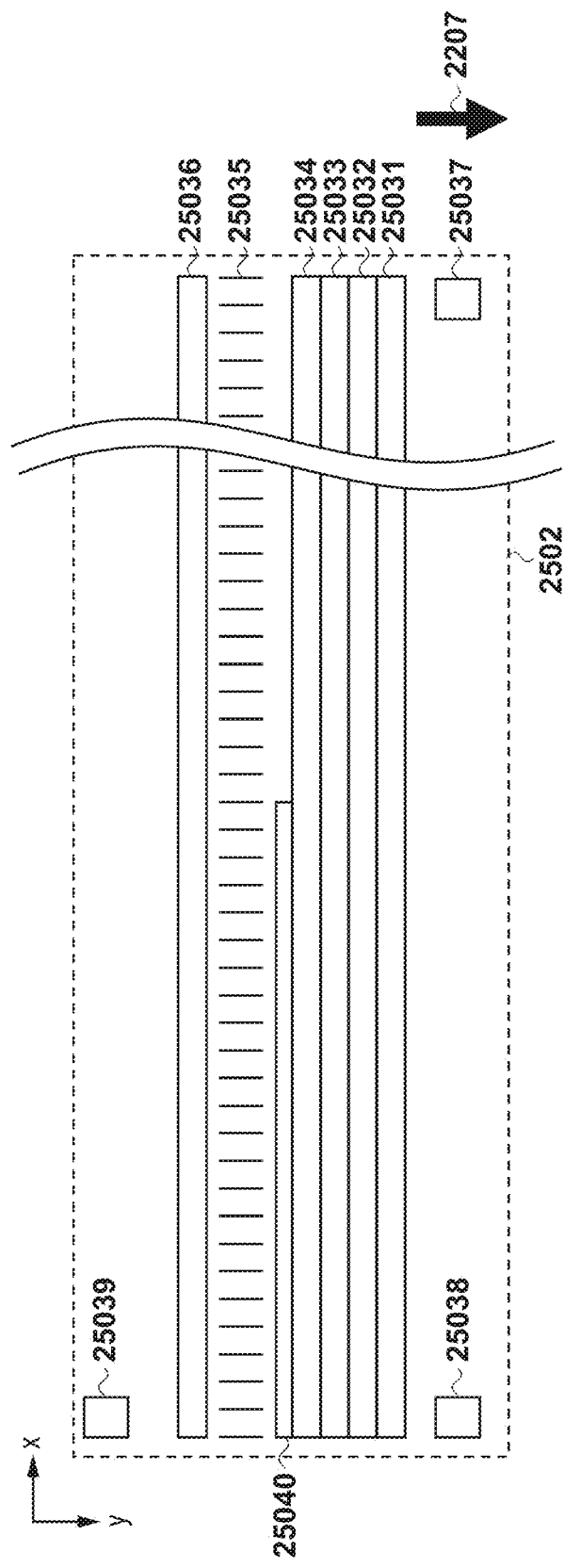
FIG. 31 is a view for explaining processing of the header image adding unit according to the fourth embodiment.

Note that the header image 2503 shown in FIG. 25D can separately hold a pattern to be used for alignment or the like. For example, as shown in FIG. 31, position detection patterns 25037 to 25039 and a module transition pattern 25040 may additionally be held.

The position detection patterns 25037 to 25039 are rectangular regions formed only by K ink. At this time, each region is, for example, a square region with a size of 2.54 mm×2.54 mm, and the signal value is set to 1 (ON) for all pixels. Note that not a rectangular region but a circular region may be used, or a predetermined pattern determined in advance may be used.

When the position detection patterns 25037 to 25039 are provided, the read value corresponding to the tone data acquisition region 25036 can more easily be acquired in step S2701 described above. That is, when the position detection patterns are searched in the read image, and the position, the size, and the angle of a rectangular region including these are corrected, two-dimensional data corresponding to the header image 2503 can easily be acquired.

Also, the module transition pattern 25040 is a so-called solid pattern formed by the same ink color as the ink that forms the tone data acquisition region 25036. At this time, the module transition pattern 25040 is formed by only one of the head modules, and the module switching position on the read image can be estimated by referring to an edge of the pattern in the nozzle array direction (x direction).

For example, if a configuration for covering the sheet surface width by combining a plurality of head modules is used, like the printhead denoted by reference numeral 2201 in FIG. 22C, the dot interval in the nozzle direction may be larger or smaller than the nozzle resolution at the joint between the modules due to the attachment error of the head modules. In this case, the head modules may be arranged in zigzag, as indicated by reference numeral 2201 in FIG. 22C, and the end portions of the modules may be made to overlap. At this time, if the overlap portion is distributed to both head modules, the above-described joint can be made less visually recognizable.

In this case, in the overlap portion in the line pattern region 25035 or the tone data acquisition region 25036, it is difficult to estimate, on a read image, which head is used to form the pattern.

At this time, if the module transition pattern 25040 is included in the header image 2503, the joint between the head modules can easily be estimated on a read image.

As described above, it is preferable to discharge, in the preliminary discharge region, droplets whose amount is sufficient for discharging condensed ink and whose number is as small as possible.

Hence, if the header image 2503 separately holds a pattern to be used for alignment or the like, the number of dots in the preliminary discharge region is preferably adjusted such that a sufficient number of dots are discharged, including the number of dots discharged to form the pattern.

More specifically, assume that a solid image of C ink is formed in the preliminary discharge region 25031. Similarly, assume that the preliminary discharge region 25034, the line pattern 25035, the position detection patterns 25037 to 25039, the module transition pattern 25040, and the tone data acquisition region 25036 are formed by K ink.

At this time, the numbers of dots discharged to the preliminary discharge region 25034, the position detection patterns 25037 and 25038, and the module transition pattern 25040, which are formed before the tone data acquisition region 25036, are totaled. The number of dots of each nozzle is preferably equal to or larger than the number of dots of each nozzle, which are discharged in the preliminary discharge region 25031 of C ink.

That is, in the above-described example, each nozzle preferably distributively discharges 120 droplets of K ink to the preliminary discharge region 25034, the position detection patterns 25037 and 25038, and the module transition pattern 25040.

Fifth Embodiment

In the above-described fourth embodiment, correction processing is performed after one set of predetermined signal values is acquired.

However, as soon as a read value for each signal value is obtained, the correction table may be changed, and correction processing may be executed.

If correction is immediately performed without waiting for acquisition of one set of data, it is possible to cope with a case in which the characteristic of a nozzle abruptly changes. Alternatively, it is possible to similarly cope with a case in which a header image intermittently holds HT patterns.

Figure 32:
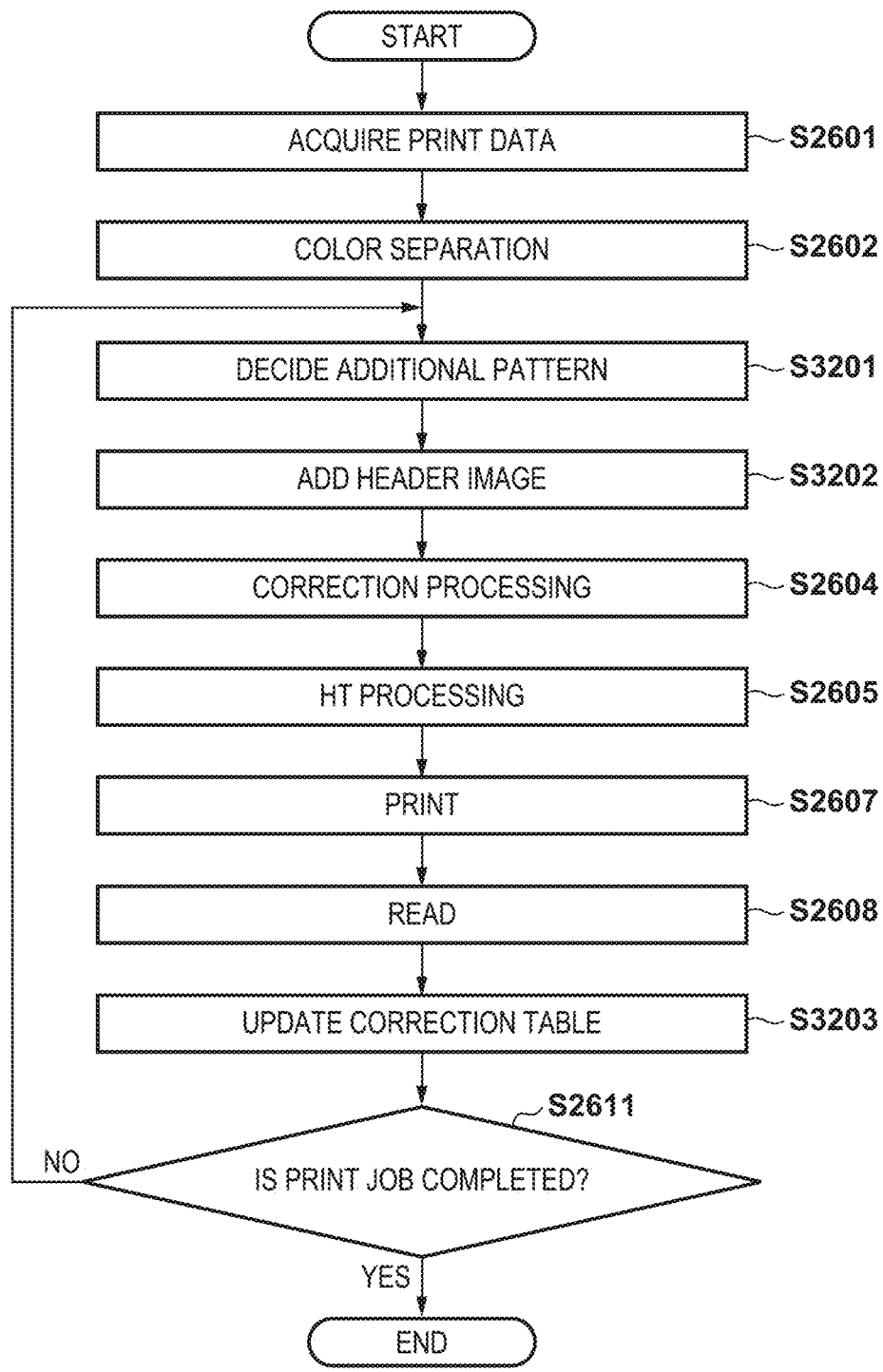
FIG. 32 is a flowchart showing print processing according to the fifth embodiment.

The procedure of user image printing and correction processing based on a formed image according to this embodiment will be described below with reference to a flowchart shown in FIG. 32. Note that the same reference numerals as in the first embodiment denote the same components and processes, and a description thereof will be omitted or simplified.

First, an image processing unit 2106 acquires input image data stored in an external storage device 2105 (step S2601), and an input color conversion processing unit 21061 performs input color conversion for the acquired data (step S2602).

Next, in step S3201, a header image adding unit 21064 decides an ink color and a color signal value, which form a tone data acquisition region 25036. For example, an HT pattern of a different ink color and color signal value is selected in a predetermined order based on a counter cnt, as in the above-described first embodiment. Alternatively, an HT pattern may be selected at random from all combinations of ink colors and color signals. When an HT pattern is selected at random, the counter cnt need not be held and managed. In addition, the order need not be decided and held in advance.

At this time, one of the combinations of all ink colors and color signals can be selected at random every time. Alternatively, the selection count of each combination may be held on a RAM 2101, and one of the combinations of small selection counts may be selected at random. As for the color signals, an HT pattern may be selected at random from only predetermined HT patterns corresponding to one of, for example, five color signal values (0, 64, 128, 192, and 255). If an HT pattern is selected while limiting the color signal values, the frequency of selecting HT pattern again becomes high. As a result, the frequency of acquiring a characteristic for each signal value becomes high. For this reason, if the color signal values are limited, even if the nozzle characteristic abruptly changes, the change can immediately be acquired. Alternatively, the values may be selected at random from all values that the color signal values can take, for example, values of 0 to 255 in a case of an 8-bit color signal value. If the color signal value is selected from all values it can take, even if a variation occurs only in a specific color signal value, the change can be acquired and corrected.

Next, in step S3202, the header image adding unit 21064 adds a header image 2503 to the image data after the HT processing. Note that the header image 2503 added in this embodiment includes the HT pattern selected in step S3201 as the tone data acquisition region 25036.

Next, in step S2604, a correction processing unit 21062 performs correction processing based on a correction table 21066 for the image data after the color conversion. Also, in step S2605, an HT processing unit 21063 performs HT processing for the image data after the correction processing.

Next, in step S2607, an image forming unit 2107 forms an image on a sheet surface based on an HT image to which the header image is added. Thus, a formed image 2400 is created.

Next, in step S2608, an image acquisition unit 2108 performs image capturing for the formed image 2400 and acquires two-dimensional captured image data.

Next, in step S3203, a correction table creating unit 21065 creates and updates a correction table based on acquired tone data. Details of the processing will be described later.

Next, in step S2611, the image processing unit 2106 determines whether the submitted print job is completed. If it is judged that the print job is completed, the procedure is ended. On the other hand, if it is judged that the print job is not completed, the process returns to step S2604 to perform correction processing using the updated correction table and continue printing.

[Updating of Correction Table]

The above-described correction table updating processing of step S3203 will be described below.

In this embodiment, correction processing (step S2604) and HT processing (step S2605) are performed including the header image added in step S3202. Hence, the read value obtained in step S2608 includes a result of performing correction using the current correction table. For this reason, a color signal value in a dark region on the read value is made small, and a color signal value in a light region on the read value is made large.

More specifically, one-dimensional line data in the nozzle array direction is obtained, and for a nozzle with a color signal value larger than the average value, the signal value corresponding to the color signal value is decremented by one. On the other hand, for a nozzle with a small color signal value, the signal value is incremented by one.

At this time, each read value includes a measurement error caused by a dark current in a sensor or dust or a flaw on the formed image. To suppress correction for such an error, a threshold for correction may be provided. That is, if a value is larger than the average value by the threshold or more, the signal value may be made small. Similarly, if a value is smaller than the average value by the threshold or more, the signal value may be made large.

Also, the larger the difference from the average value is, the larger the change amount of the color signal may be made.

Figure 28B:
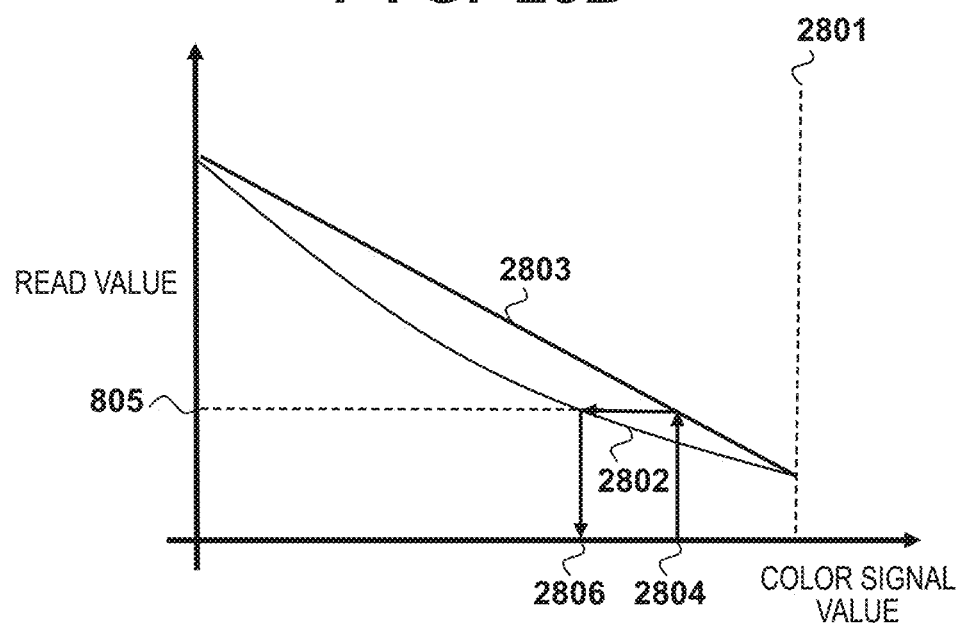
FIG. 28B is a view for explaining the processing contents of the correction table creating unit according to the fourth embodiment.

Alternatively, a measurement curve indicated by a curve 2802 in FIGS. 28A and 28B can be estimated by a known interpolation method from, for example, five latest read values in addition the currently acquired read value, and the color signal value after correction can be calculated based on the measurement curve, as in the above-described fourth embodiment.

Sixth Embodiment

If a header image is added in accordance with the above-described embodiments, it is possible to discharge condensed ink by preliminary discharge, acquire the characteristic of each of nozzles, heads, and modules from read values, and update a correction table.

At this time, if the amount of ink discharged in the preliminary discharge region is small, condensed ink remains in the nozzles, and a defect such as non-discharge, density-unevenness, or streaks may occur in a tone data acquisition region or an image data formation region.

On the other hand, if a large amount of ink is discharged in the preliminary discharge region, the running cost and productivity may deteriorate due to consumption of ink or an increase of replenishment frequency.

Considering the above, it is preferable to discharge, in the preliminary discharge region, ink whose amount is sufficient for discharging condensed ink and whose number of droplets is as small as possible.

However, the sufficient preliminary discharge amount also depends on input image data. For example, in formation of image data, if all nozzles discharge a sufficient number of ink droplets, preliminary discharge may be unnecessary. On the other hand, the smaller the number of discharged droplets in image data is, the larger the number of dots to be discharged in the preliminary discharge region needs to be.

The sufficient preliminary discharge amount also depends on a printing environment such as a humidity or temperature. Hence, a header image set under a predetermined condition may be excessive or insufficient in different image data or printing environment.

At this time, if the preliminary discharge amount is too small and, particularly, the above-described defect occurs in the input image data region, the value of an obtained printed product may greatly be damaged. For this reason, sufficient discharge needs to be performed until input image data is generated.

On the other hand, if a defect is included in the tone data acquisition region, but the number of dots reaches a number sufficient for preliminary discharge in the region, the input image data region may not include a defect.

In this case, tone data acquisition is impossible, but the possibility that the value of the printed product is greatly damaged is low. However, if a correction table is created using data including a defect, for example, a color signal may be corrected to cancel streaks that should have been eliminated by preliminary discharge, and inverted streaks may occur, resulting in damage to the value of the printed product.

In this embodiment, considering the above, an embodiment for holding a defect determining unit configured to determine a defect caused by condensed ink will be described.

Note that the same reference numerals as in the fourth and fifth embodiments denote the same components and processes, and a description thereof will be omitted or simplified.

[Functional Configuration of Image Processing Unit]

Figure 33:
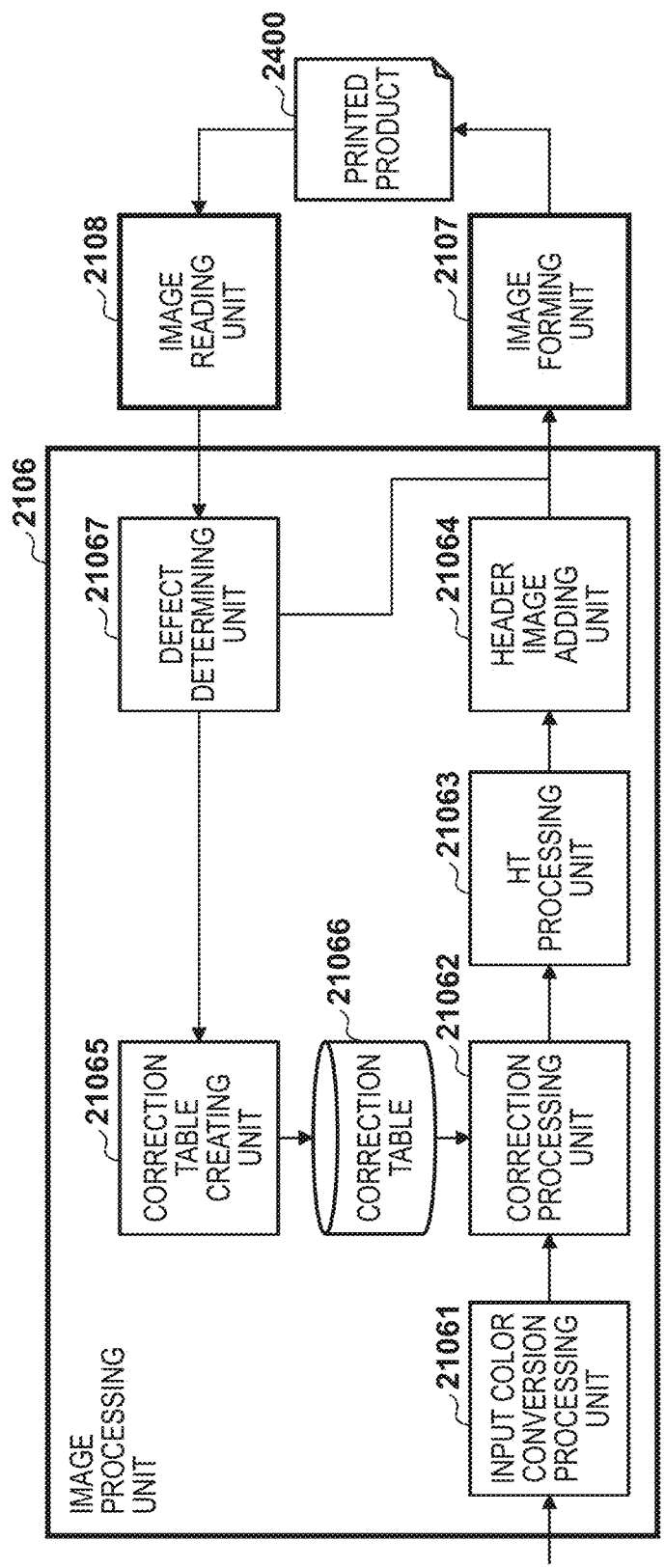
FIG. 33 is a view showing the functional configuration of an image processing unit according to the sixth embodiment.

FIG. 33 shows an example of the configuration of an image processing unit 2106 according to this embodiment. As shown in FIG. 33, the image processing unit 2106 according to this embodiment includes a defect determining unit 21067 in addition to the configuration according to the fourth and fifth embodiments shown in FIG. 3 described above.

The defect determining unit 21067 receives two-dimensional image data as read data from an image reading unit 2108, and determines whether a defect caused by condensed ink is included in each region. Alternatively, the defect determining unit 21067 determines whether a sufficient number of dots for discharging condensed ink are discharged before image formation in each region, and the nozzles are already refreshed.

The above-described determination can be done by, for example, focusing on read values at different positions in the y direction in a region, and determining whether the read values have a significant difference. That is, if read values have a significant variation in accordance with the formation time between regions formed by substantially the same color signal value, it can be considered that condensed ink is discharged, and refresh is not completed. Alternatively, it can be considered that a defect such as a density variation caused by condensed ink is included.

[Determination Processing by Defect Determining Unit 21067]

Figure 34:
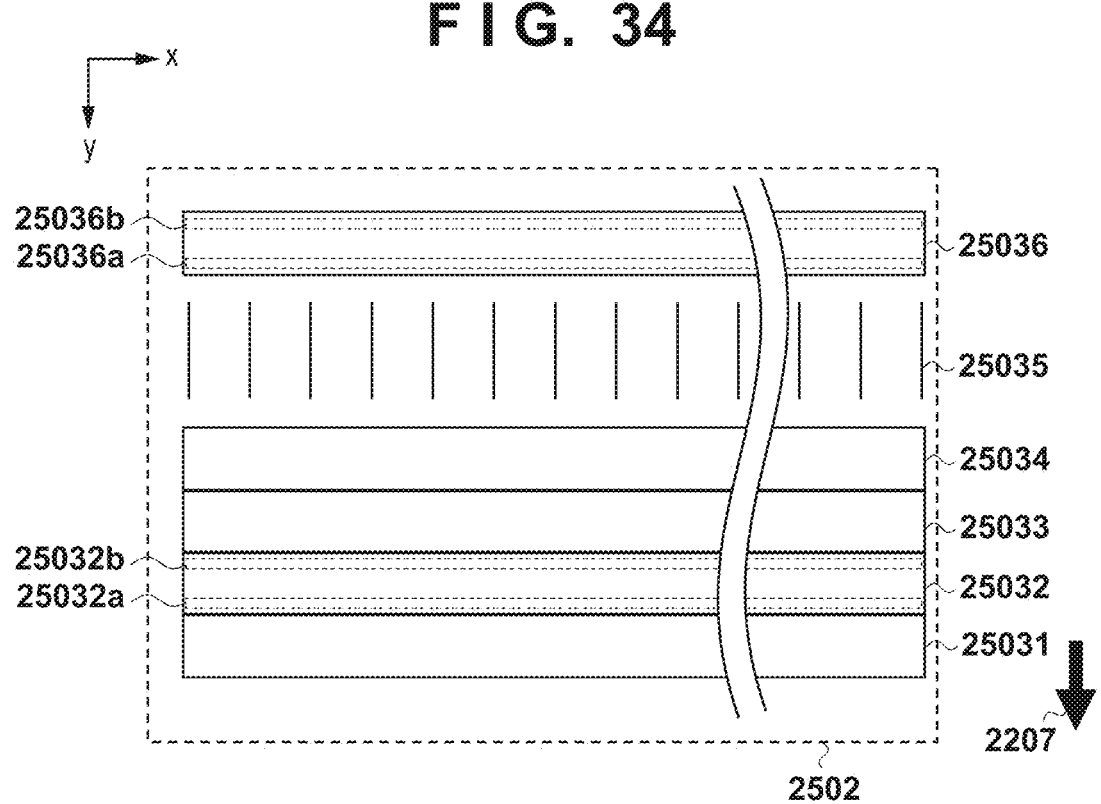
FIG. 34 is a view showing an example of a header image according to the sixth embodiment.

FIG. 34 is an enlarged view showing a part of the schematic view of the header image shown in FIG. 25D. The above-described determination processing will be explained below in more detail with reference to FIG. 34. Note that in the following explanation, processing of determining whether a defect is included in a preliminary discharge region 25032 shown in FIG. 34 will be described.

First, the defect determining unit 21067 refers to a region corresponding to the preliminary discharge region 25032 in read data obtained from the image reading unit and acquires read values corresponding to two portions 25032a and 25032b at different formation times. Note that in this embodiment, a 16-bit value that is linear to Y of the CIEXYZ color space is acquired as a read value.

The defect determining unit 21067 averages the obtained read values corresponding to the two portions in the conveyance direction (y direction), thereby obtaining one-dimensional profiles.

Figure 35:
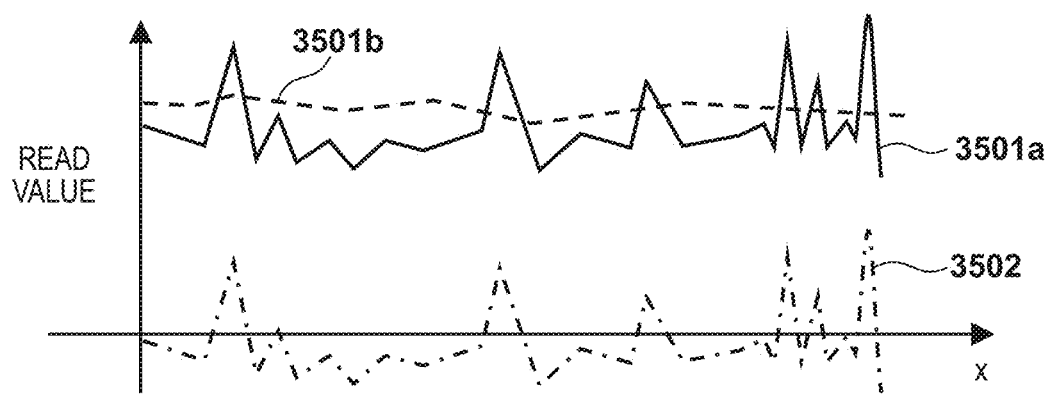
FIG. 35 is a view showing an example of a line profile according to the sixth embodiment.

FIG. 35 shows an example of line profiles obtained by the above-described averaging processing. A solid line 3501a in FIG. 35 shows an example of a line profile obtained from the portion 25032a. A dotted line 3501b shows an example of a line profile obtained from the portion 25032b.

Furthermore, the defect determining unit 21067 compares the two line profiles and calculates a difference for each pixel, thereby obtaining a difference profile. A chain line 3502 in FIG. 35 shows an example of the difference profile. Focusing on the maximum value of the difference profile, if the maximum value is equal to or larger than a predetermined threshold, the defect determining unit 21067 judges that a defect is included in the region.

At this time, not a predetermined value but a value dynamically generated from each line profile may be used as the threshold. For example, a variance a of the line profile dotted line 3501b corresponding to the portion formed at the later time is calculated, and a three times larger value, that is, $3a$ can be used as the threshold.

Note that instead of making judgement based on the difference between the line profiles obtained from the two portions at different formation times, as described above, the determination may be performed by comparing a line profile acquired in advance with the line profile of a determination portion.

For example, after preliminary discharge is sufficiently performed in advance, an even region for each color signal value is formed, and a one-dimensional line profile is calculated from read data and held. In the determination, a corresponding line profile is acquired based on the color signal value of the determination portion, and the maximum value of the difference and a threshold are compared.

At this time, the possibility that the line profile acquired after preliminary discharge is sufficiently performed includes a defect caused by condensed ink is low. That is, if the difference between the line profile and the line profile of the determination portion is small, it can be judged that the possibility that a defect is included in that portion is low. In this case, it can be determined that preliminary discharge is completed before the difference determination portion.

In this way, if the determination is performed based on the line profile acquired in advance, it can be determined whether preliminary discharge is completed before the determination portion.

For example, assume that when a portion 25036b located at the end of write in a tone data acquisition region 25036 shown in FIG. 34 is compared with a line profile acquired in advance, the maximum value of the difference is equal to or smaller than a threshold.

At this time, it can be judged that preliminary discharge is completed before the portion 25036b, and the possibility that a defect caused by condensed ink is included in the image region formed after the portion.

Note that instead of using the line profile acquired in advance, as described above, the determination may be performed based on, for example, the difference from a substantially constant line profile independently of the x position. For example, at the time of determination, the average value of the line profile of the determination portion is calculated. A constant profile is determined based on the calculated average value independently of the x position, and the determination can be performed based on the maximum value of the difference from the profile and a threshold.

[User Image Printing Procedure]

The procedure of user image printing and correction processing based on a formed image according to this embodiment will be described below with reference to a flowchart shown in FIG. 36.

First, the image processing unit 2106 acquires input image data stored in an external storage device 2105 (step S3601). An input color conversion processing unit 21061 performs input color conversion processing for the acquired data (step S3602).

Next, in step S3603, a correction processing unit 21062 performs correction processing based on a correction table 21066 for the image data after the color conversion.

Also, in step S3604, an HT processing unit 21063 performs HT processing for the image data after the correction processing.

Next, in step S3605, a header image adding unit 21064 decides an ink color and an HT pattern, which form the tone data acquisition region 25036. In this step as well, the ink color and the color signal value are decided as in step S2201 described above. Based on the decided ink color and the color signal value, an HT pattern held in advance is acquired or decided.

Next, in step S3606, the header image adding unit 21064 adds a header image 2503 to the image data after the HT processing. Note that the header image 2503 added in this embodiment includes the HT pattern selected in step S3604 as the tone data acquisition region 25036.

Furthermore, in this embodiment, in a region of the preliminary discharge regions 25031 to 25034, which corresponds to the same ink color as the ink color that forms the tone data acquisition region 25036, not a solid pattern but an HT pattern is formed.

At this time, the header image adding unit 21064 adds, to the corresponding preliminary discharge region, an inverted HT pattern obtained by inverting the HT pattern added to the tone data acquisition region.

Figure 37A:
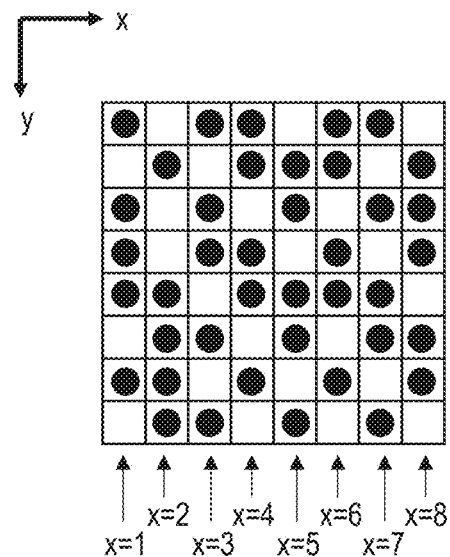
FIG. 37A is a view showing an example of an HT pattern according to the sixth embodiment.
Figure 37B:
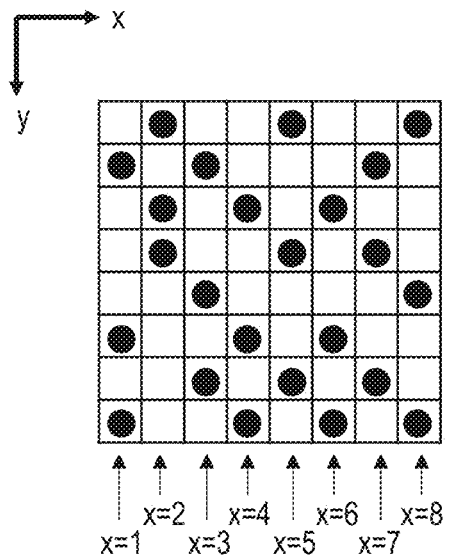
FIG. 37B is a view showing an example of an HT pattern according to the sixth embodiment.

More specifically, if an HT pattern shown in FIG. 37A is added to the tone data acquisition region and formed by C ink, an inverted HT pattern shown in FIG. 37B is used in the preliminary discharge region 25031 corresponding to the C ink.

On the other hand, for the remaining preliminary discharge regions, a solid image is formed in this embodiment as well. That is, if an HT pattern is formed in the preliminary discharge region 25031, a solid pattern is formed in each of the remaining preliminary discharge regions 25032 to 25034.

Note that the inverted HT pattern in this embodiment is a pattern in which ON/OFF of each pixel is inverted. That is, at a pixel position where a black circle exists (ON) in the pattern shown in FIG. 37A, no black circle exists (OFF) in the inverted pattern shown in FIG. 37B. Similarly, at a pixel position where no black circle exists (OFF) in the pattern shown in FIG. 37A, a black circle exists (ON) in the inverted pattern shown in FIG. 37B.

Figure 36:
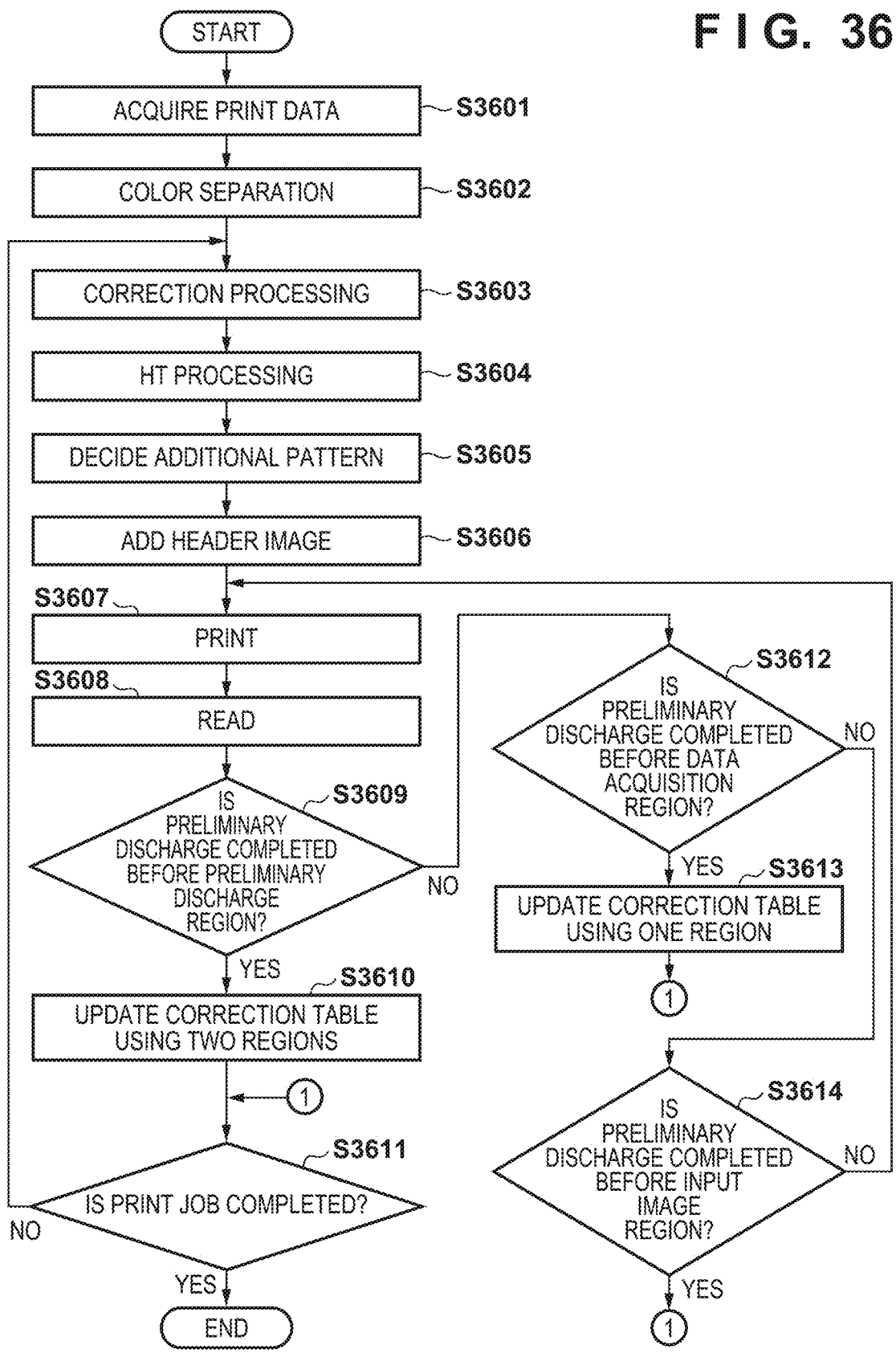
FIG. 36 is a flowchart showing correction processing according to the sixth embodiment.

Referring back to the flowchart shown in FIG. 36, next, in step S3607, an image forming unit 2107 forms an image on a sheet surface based on an HT image to which the header image is added. Thus, a formed image 2400 is created.

Next, in step S3608, an image acquisition unit 2108 performs image capturing for the formed image 2400 and acquires two-dimensional captured image data.

Next, in step S3609, the defect determining unit 21067 judges whether a defect caused by condensed ink is included in the region using the HT pattern in the preliminary discharge regions. That is, it is judged whether preliminary discharge is completed before the preliminary discharge region.

For example, assume that the header image shown in FIG. 34 is added in step S3606 described above, and an HT pattern is used in the region 25032 of the four preliminary discharge regions. At this time, the judgment is done based on the difference between line profiles obtained from the two different portions 25032a and 25032b in the region 25032 shown in FIG. 34.

More specifically, the read values of the portions are averaged in the conveyance direction, thereby obtaining two line profiles. Also, for example, at the time of shipment from the factory, a threshold h determined based on the variation specifications of each nozzle or module is acquired.

At this time, if all the differences at x positions between the two line profiles are equal to or smaller than the threshold h, it can be judged that preliminary discharge is completed before the region 25032 is formed. At this time, the possibility that a defect is included in the region is low.

On the other hand, if a difference is larger than the threshold, it can be judged that preliminary discharge is not completed before the region 25032 is formed. At this time, a defect may be included in the region.

Note that the judgment may be done based on not the line profile of each portion but an average read value of each portion obtained by averaging, for each portion, the read values in the portion. That is, if the difference between average read values is larger than a threshold, it may be judged that preliminary discharge is not completed.

As the result of the judgment in step S3609 described above, if it is judged that preliminary discharge is already completed, the process advances to step S3610.

In step S3610, a correction table creating unit 21065 updates the correction table based on the read values in the preliminary discharge region using the HT pattern and the tone data acquisition region. Note that details of the processing of step S3610 will be described later. After updating of the correction table, the process advances to step S3611.

In step S3611, the image processing unit 2106 determines whether the submitted print job is completed. If it is determined that the print job is completed, the procedure is ended. On the other hand, if it is determined that the print job is not completed, the process returns to step S3603 to perform correction processing using the updated correction table and continue printing.

As the result of the judgment in step S3609 described above, if it is judged that preliminary discharge is not completed before the preliminary discharge region, the process advances to step S3612.

In step S3612, the defect determining unit 21067 judges whether a defect caused by condensed ink is included in the tone data acquisition region 25036. That is, it is judged whether preliminary discharge is completed before the tone data region.

For example, the judgement is performed based on the difference between the two different portions 25036a and 25036b in the tone data acquisition region shown in FIG. 34.

Alternatively, the judgment can also be performed based on the preliminary discharge region formed by the same ink color and HT pattern as in the tone data acquisition region 25036.

More specifically, assume that the preliminary discharge region 25032 in FIG. 34 is formed by an HT pattern. At this time, the defect determining unit 21067 acquires the line profile of the portion 25032b located at the end of write in the region.

Then, the difference between the line profile obtained from the portion 25032b and a line profile formed by the same ink color and the same color signal value after preliminary discharge is sufficiently performed is calculated for each pixel.

At this time, if the maximum value of the difference is smaller than, for example, a predetermined threshold, it is judged that preliminary discharge is completed before the tone data acquisition region 25036 is formed.

That is, the judgment is performed depending on whether the line profile of the portion 25032b formed immediately before the tone data acquisition region 25036 is formed, substantially matches the line profile after preliminary discharge region is sufficiently performed.

Note that if preliminary discharge is completed in the portion 25032b, the possibility that condensed ink remains in the nozzles at the start of write of the tone data acquisition region 25036, and a defect caused by the condensed ink is included in the region is low.

As the result of the judgment in step S3612 described above, if it is judged that preliminary discharge is completed before the tone data acquisition region is formed, the process advances to step S3613.

In step S3613, the correction table creating unit 21065 updates the correction table based on read values acquired from the tone data acquisition region. Note that details of the processing of step S3613 will be described later.

After the correction table is updated in step S3613, the process advances to step S3611 to judge whether the print job is completed.

On the other hand, as the result of the judgment in step S3612 described above, if it is judged that preliminary discharge is not completed in advance, the process advances to step S3614.

In step S3614, the defect determining unit 21067 judges whether a defect caused by condensed ink is included in the region where input image data is formed. That is, it is judged whether preliminary discharge is completed before the input image data formation region.

More specifically, if the header image 2503 shown in FIG. 34, is used, the judgment is performed based on the difference between the line profile of the portion 25036b located at the end of write in the preliminary discharge region 25032 and a line profile acquired in advance.

That is, if the line profile of the portion 25036b located at the end of write of the header image 2503 substantially matches the line profile after preliminary discharge is sufficiently performed, it is judged that preliminary discharge is completed.

As the result of the judgment in step S3614, if it is judged that preliminary discharge is completed before the input image data formation region, the process advances to step S3611 to judge whether the print job is completed.

On the other hand, if it is judged that preliminary discharge is not completed, reprint processing is instructed. More specifically, preliminary discharge in the header image of the image data formed latest in step S3607 is switched to a solid pattern. After that, the process returns to step S3607 to print the image data in which the pattern is switched to the solid pattern again.

User image printing and correction processing based on a formed image can be performed in accordance with the procedure shown in FIG. 36 described above.

In this embodiment, the preliminary discharge region and the tone data acquisition region are formed by an HT pattern. By forming the HT pattern even in the preliminary discharge region, tone data can be obtained from the preliminary discharge region as well. It is therefore possible to increase tone data that can be acquired while suppressing an increase in ink discharged in the header image. For this reason, even if the nozzle characteristic more abruptly changes, density-unevenness and streaks associated with the change can be suppressed while suppressing an increase of the ink amount.

At this time, the HT pattern is preferably decided such that the total number of dots discharged to the preliminary discharge region and the tone data acquisition region equals the number of dots discharged to the preliminary discharge regions of the other ink colors.

For example, as shown in FIGS. 37A and 37B, when an HT pattern that is inverted between the tone data acquisition region and the preliminary discharge region is formed, the number of dots of nozzles in both regions matches the number of dots discharged in the preliminary discharge regions of the other inks. Hence, even if the thresholds of the HT matrix are biased, the number of discharged droplets in the header image can be guaranteed.

At this time, the possibility that preliminary discharge is completed in the tone data acquisition region printed later, and tone data that does not include any defect can be acquired is high. For this reason, in the tone data acquisition region, not an inverted pattern but a pattern obtained by the same processing as the HT processing in step S3604 is preferably formed.

Note that instead of using the inverted pattern, color signal values may be distributed to the regions such that the sum of the color signal values becomes 255 or 256. In this case, the processing of solid image decision (step S3605) and addition (step S3606) is performed before correction processing (step S3603) and HT processing (step S3604).

At this time, in the HT processing, the HT processing unit 21063 performs HT processing for the tone data acquisition region and the preliminary discharge region, like the input image data.

Thus, if not the HT pattern but the color signal values are distributed, in some cases, the same HT pattern as that of HT processing used in step S3604 can be formed in the preliminary discharge region as well, and correction can be performed at a higher accuracy.

In particular, in a case in which the ink discharge frequency is high with respect to ink condensation, and it is often judged in step S3609 that preliminary discharge is completed before the preliminary discharge region, it is often effective to distribute not the HT pattern but the color signal values.

Also, as described above, in this embodiment, completion or incompletion of preliminary discharge can be determined by the defect determining unit 21067, as shown in FIG. 33.

For example, if a defect exists in the data acquisition region (n in step S3612), the correction table is not updated, and it is possible to suppress updating of the correction table based on an error derived from condensed ink.

Also, if the possibility that a defect is included in the preliminary discharge region is low (y in step S3609), in updating of the correction table, the read value of the region can be referred to.

Alternatively, if preliminary discharge may not be completed before the input image region (n in step S3614), reprinting can be performed. Also, at this time, the amount of preliminary discharge can be increased.

Note that in this embodiment, the judgment in step S3609 or S3614 is not essential processing. That is, after reading in step S3608, the defect determining unit 21067 may judge, as step S3612, only whether preliminary discharge is completed in the data acquisition region. In this case, a configuration for only judging whether to advance to step S3613 to update the correction table using the read value of the region or advance to step S3611 without updating is also possible.

At this time, in addition to the above, it may be judged whether a defect is included in the preliminary discharge region. Alternatively, whether a defect is included in the preliminary discharge region may not be judged, and it may additionally be judged whether preliminary discharge is completed before the input image region.

[Correction Table Updating Processing]

Correction table updating processing in steps S3610 and S3613 will be described below.

In this embodiment as well, the correction table can be updated, as in step S2610 or S3203 described above.

That is, as described above with reference to FIGS. 28A and 28B, a correction curve 2802 is calculated for each printhead, each module, or each nozzle, and a color signal value 2806 after correction can be decided such that a target characteristic 2803 is reproduced.

At this time, in this embodiment, in step S3608, the correction curve 2802 is estimated from, for example, five latest read values in addition the newly obtained read value. In this way, the correction curve is changed based on the read value obtained in each printing. Furthermore, if the correction table is overwritten by obtained new color signal values, even if the characteristic of a printhead, a module, or a nozzle changes over time, occurrence of density-unevenness and streaks can be suppressed by updating the correction table.

At this time, in step S3612, the correction curve is changed based on the read value obtained from the tone data acquisition region 25036.

On the other hand, in step S3610, the correction curve is changed using the read value obtained from the preliminary discharge region in addition to the tone data acquisition region 25036. It is therefore possible to obtain a correction curve more quickly in response to the temporal change of the characteristic.

Note that in the above-described updating of the correction table, only values corresponding to some input color signal values may be updated. For example, focusing only on "16" as an input color signal value 2804, only the color signal value 2806 after correction corresponding to the color signal value "16" may be calculated in step S3610 or S3613.

At this time, the color signal value to be updated is decided based on the color signal value corresponding to the above-described HT pattern formed in the tone data acquisition region 25036 or the preliminary discharge region.

More specifically, configuration may be such that it is possible to update the color signal value after correction only for the color signal value corresponding to the HT pattern.

For example, assume that the tone data acquisition region 25036 is formed by an HT pattern corresponding to a color signal value "16" and K ink. Also assume that the table shown in FIG. 24 is used as the correction table.

In this case, in step S3613, first, a correction curve corresponding to a head module 2201a is calculated based on the read value obtained from the tone data acquisition region 25036.

Furthermore, the color signal value 2806 after correction is calculated using the obtained correction curve and "16" as the color signal value 2804. Then, the color signal "14" after correction, which is stored in the row of the input color signal "16" and the column of 2201a, is overwritten by the obtained color signal value 2806.

Similarly, for head modules 2201b and 2201c as well, the color signal values after correction for the input color signal "16" are calculated and overwritten.

Note that in step S3610, in addition to the above, the color signal value corresponding to the HT pattern in the preliminary discharge region is preferably updated.

Not only the color signal value corresponding to the HT pattern but also all color signal values affected by this may be updated. For example, if piecewise linear interpolation is used to estimate the correction curve, color signal values in a section including the newly added color signal value are updated.

[Variations of Defect Determination Processing]

The solid line 3501a in FIG. 35 shows a large variation of the read value for each pixel position x, and has peaks at some pixel positions, as compared to the dotted line 3501b in FIG. 35. In addition, the read value is generally small.

It is considered that the variation for each position and the rise and fall of the average of read values are caused by condensed ink in the nozzles. For example, if the use frequency changes between the nozzles in the latest image formation, the degrees of condensation that occur in the nozzles are different. If an even pattern is formed in such a case, the degrees of condensation appear as the difference in the density on the image. On the line profile of the read value, these are acquired as the variation of the read value for each pixel position x.

The more ink condenses, the higher the ratio of a pigment or resin contained in the ink becomes, and as a result, the higher the viscosity of the ink sometimes becomes. In this case, in response to a discharge signal for a nozzle, no droplet may be discharged, and idle discharge may occur. If such idle discharge occurs, the number of dots discharged at the position x corresponding to the nozzle of idle discharge may be small, and highlight saturation may occur on an image. At this time, the highlight saturation on the image is acquired as a peak generated in the read value on the line profile of the read value.

Furthermore, even if the use frequencies of the nozzles are substantially the same, if the frequency is low, the ratio of the pigment contained per unit number of droplets may become high, and as a result, the density of a formed image may become high. On the line pattern of the read value, such a density variation is acquired as the variation of the average value of the line profile.

As shown in FIG. 34, the portion 25032a is a portion which is located at the start of write of the preliminary discharge region 25032, and for which the possibility that the portion is affected by condensed ink in the nozzles is highest. On the other hand, the portion 25032b is located at the end of write of the preliminary discharge region 25032, and the possibility that the portion is not affected by ink condensation is high if the preliminary discharge region 25032 has a sufficient height.

Hence, for example, if a line profile corresponding to the portion 25032a indicated by the dotted line 3501a in FIG. 35 is referred to, and the above-described read value variation for each pixel position x, the peak, or the average value variation has predetermined value or more, it can be judged that the influence of a defect caused by ink condensation is included in the region.

On the other hand, if a line profile for the portion 25032b indicated by the dotted line 3501b in FIG. 35 is referred to, and the above-described read value variation for each pixel position x, the peak, or the average value variation does not exist, it can be judged that refresh is completed in the region.

At this time, whether the variation for each position has a predetermined value or more can be judged by determining, for example, whether the variance a obtained from each line profile is larger than a predetermined threshold. As for the peak on the read value, a difference profile is generated by subtracting the average value from each line profile, and judgement is done based on the maximum value on the difference profile. That is, it is judged whether a peak exists by determining whether the maximum value obtained from the difference profile is larger than, for example, a predetermined threshold. Also, as for the above-described variation of the average value, judgement is performed by determining whether the average value obtained from each line profile falls within a predetermined range.

Note that when judging the peak, the determination may be performed based on the maximum read value of the high-frequency profile obtained by applying a high-pass filter to the line profile, instead of using the difference profile to the average value. Also, not a predetermined value but a value dynamically generated from each line profile may be used as the threshold. For example, the variance of each line profile is calculated. The smallest value is defined as σ, and a three times larger value can be used as the threshold.

Note that the determination by the defect determining unit 21067 may be performed based on not the read value but the number of discharged droplets. That is, in addition to the additional region 2502, the number of discharged droplets in the image data 2501 is counted and held for each nozzle. If the count within a predetermined time reaches a predetermined number of discharged droplets in all nozzles, it may be determined that refresh is completed.

Also, in the determination by the defect determining unit 21067, the judgement may be done focusing only one of the viewpoints described above, or the determination may generally be performed based on the results of several determinations.

OTHER EMBODIMENTS

The resolution of the two-dimensional read image data acquired by the above-described image reading unit 2108 in the conveyance direction (y direction) depends on the read frequency of the sensor and the conveyance speed of paper. Also, the obtained image is affected by the blur of the lens or the Bayer pattern of the sensor. For this reason, particularly, if the conveyance speed of paper is high, it may be impossible to correctly acquire the read value not because of the density variation caused by condensed ink but by the influence of these.

If the correction table is updated from the read value of the HT pattern included in the header image in such a case, density-unevenness or streaks may occur.

At this time, the image processing unit 2106 may not include the correction table creating unit 21065 and may include a temporal change determining unit configured to determine a temporal change.

In this case, for each preliminary discharge region in the header image 2503, a solid pattern is preferably used such that preliminary discharge is completed until the tone data acquisition region 25036 as much as possible.

The temporal change determining unit compares a line profile acquired from the tone data acquisition region 25036 with a line profile before a temporal change occurs, and if the difference is large, determines that a temporal change has occurred.

At this time, the differentiation may be performed on a pixel basis or may be performed based on an average read value obtained by averaging the line profile.

At this time, the line profile before the temporal change occurs may be acquired in advance, or may be acquired when the image forming apparatus is powered on. Alternatively, a line profile that is constant independently of the position x may be used.

Note that the temporal change determining unit always monitors the header image in each printed product 2400, and upon determining that a temporal change occurs, warns the user of it via the display unit 2104.

Alternatively, printing may be stopped, or a calibration chart having a sufficient height against the influence of the sensor, the lens, or the conveyance speed may be acquired not with the header image but independently, and the correction table may be updated based on the read value of the chart.

Note that in the above-described embodiments, as the recording paper 2206, a so-called cut sheet that is already cut based on dimensional specifications, for example, A3 paper defined in the international standards can be used. Alternatively, a so-called roll sheet wound around a support without being cut in the conveyance direction can be used.

Figure 38:
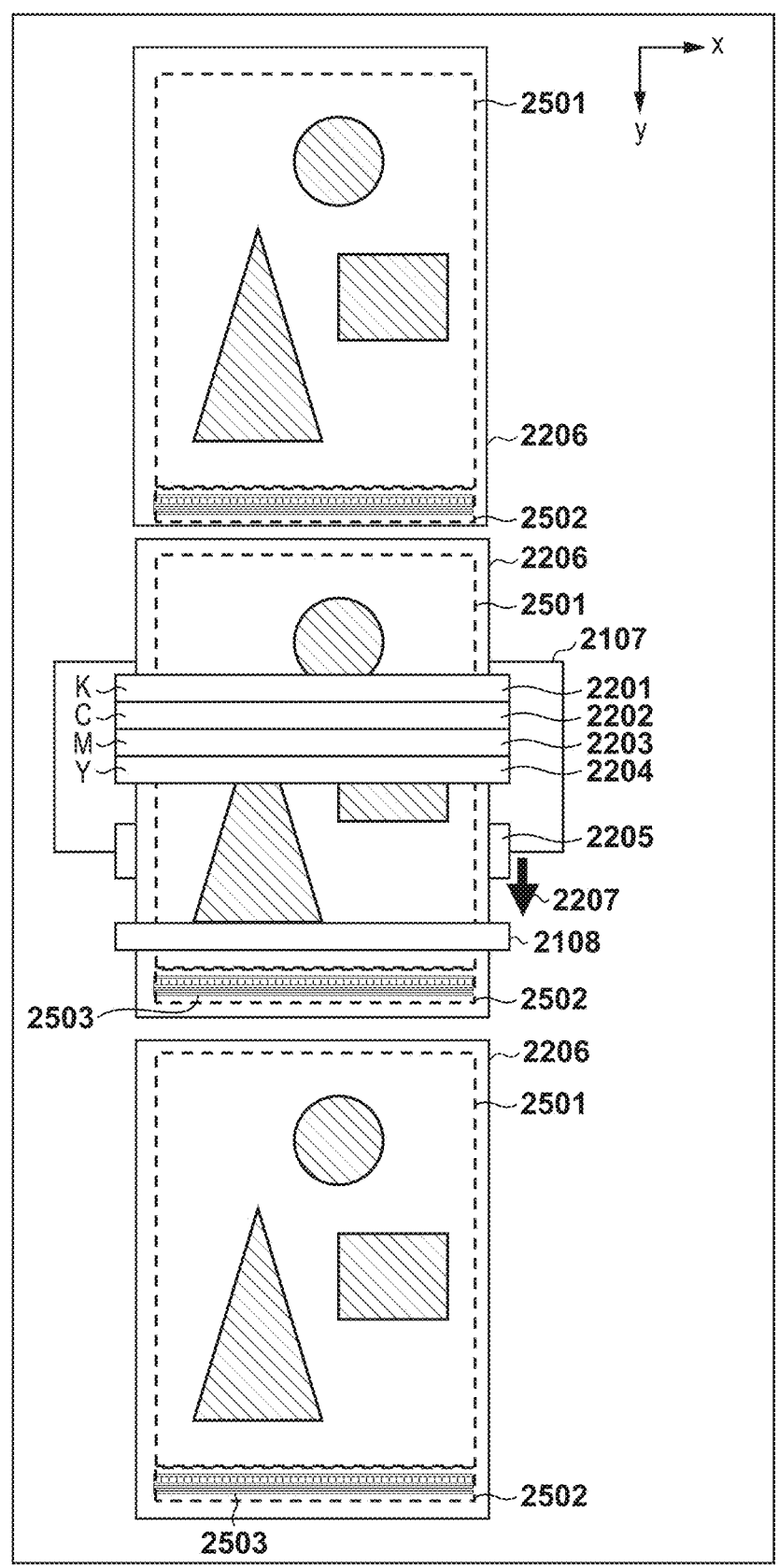
FIG. 38 is a view showing an example of conveyance of recording paper.

FIG. 38 shows an example of conveyance in a case in which a cut sheet is used as the recording paper 2206. As shown in FIG. 38, the header image 2503 is formed in the position 2502 printed before the input image 2501 on the single print medium 2206.

Figure 39:
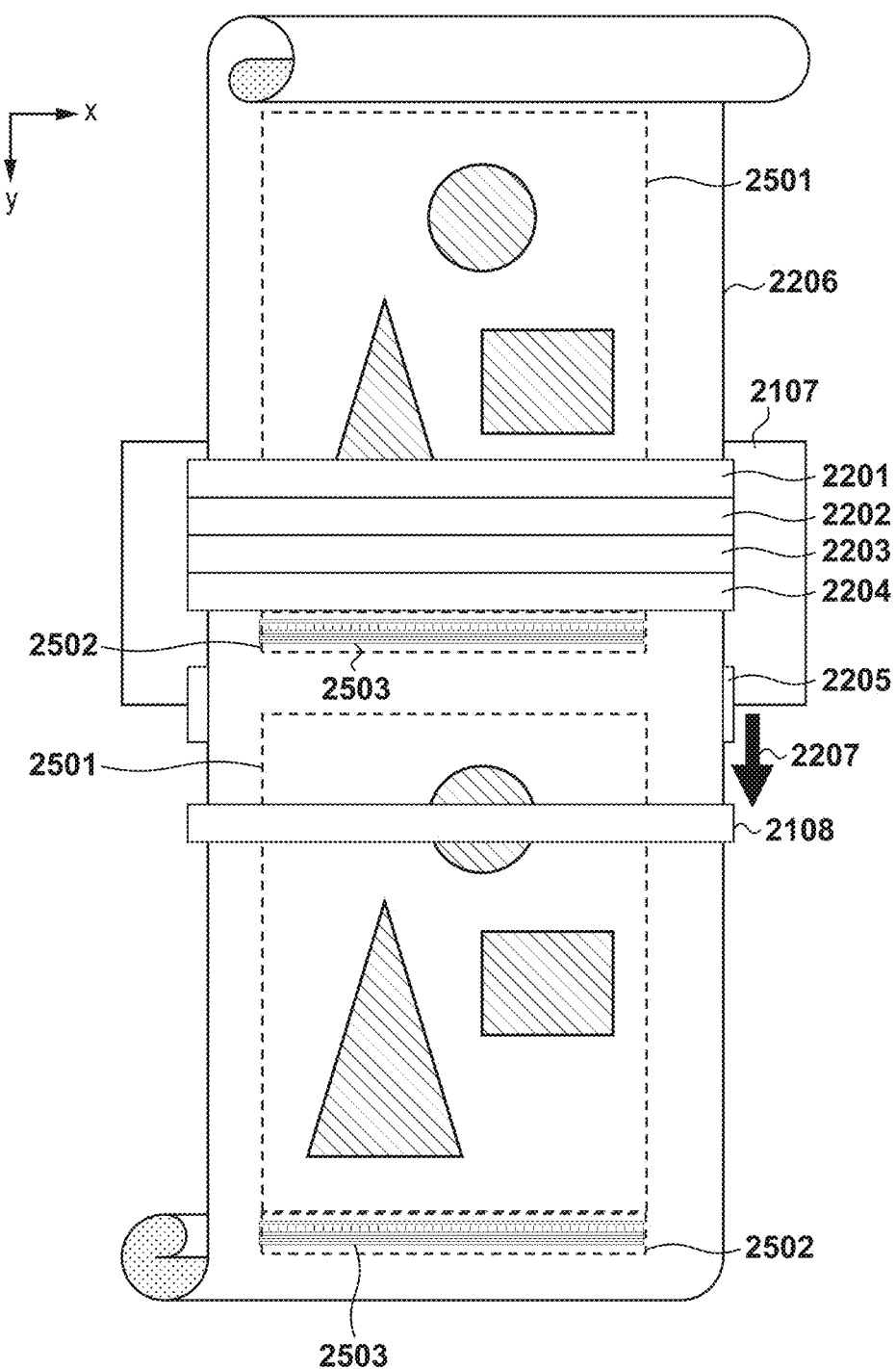
FIG. 39 is a view showing an example of conveyance of roll paper.

On the other hand, FIG. 39 shows an example of conveyance in a case in which a roll sheet is used as the recording paper. As shown in FIG. 39, the header image 2503 is formed on the same recording medium as the input image 2501 and added to the position 2502 printed before the input image 2501.

Figure 40:
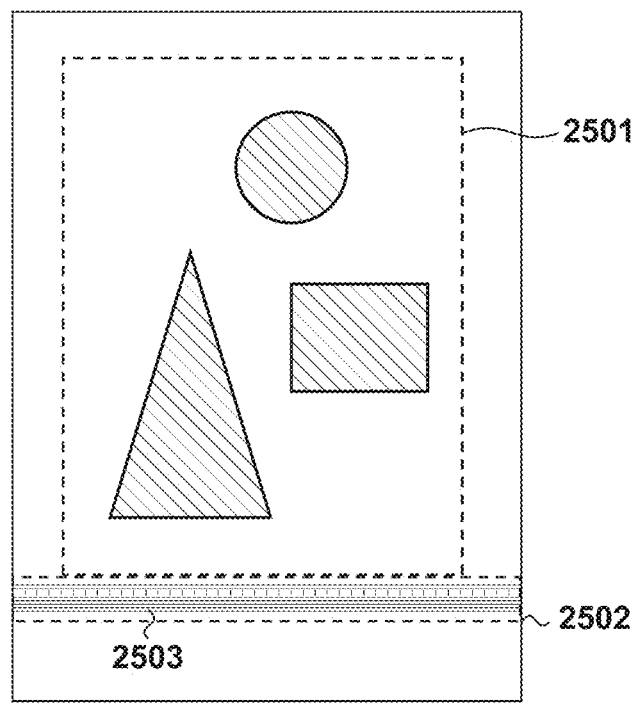
FIG. 40 is a view showing an example of printing of a header image.

Note that the width of the header image 2503 need not match the input image 2501. For example, as shown in FIG. 40, the header image 2503 whose width equals the paper width independently of the width of the input image 2501 may always be added.

Also, the positional relationship between the preliminary discharge regions 25031 to 25034, the line pattern region 25035, and the tone data acquisition region 25036 is not limited to the position shown in FIGS. 25D and 31.

Figure 41A:
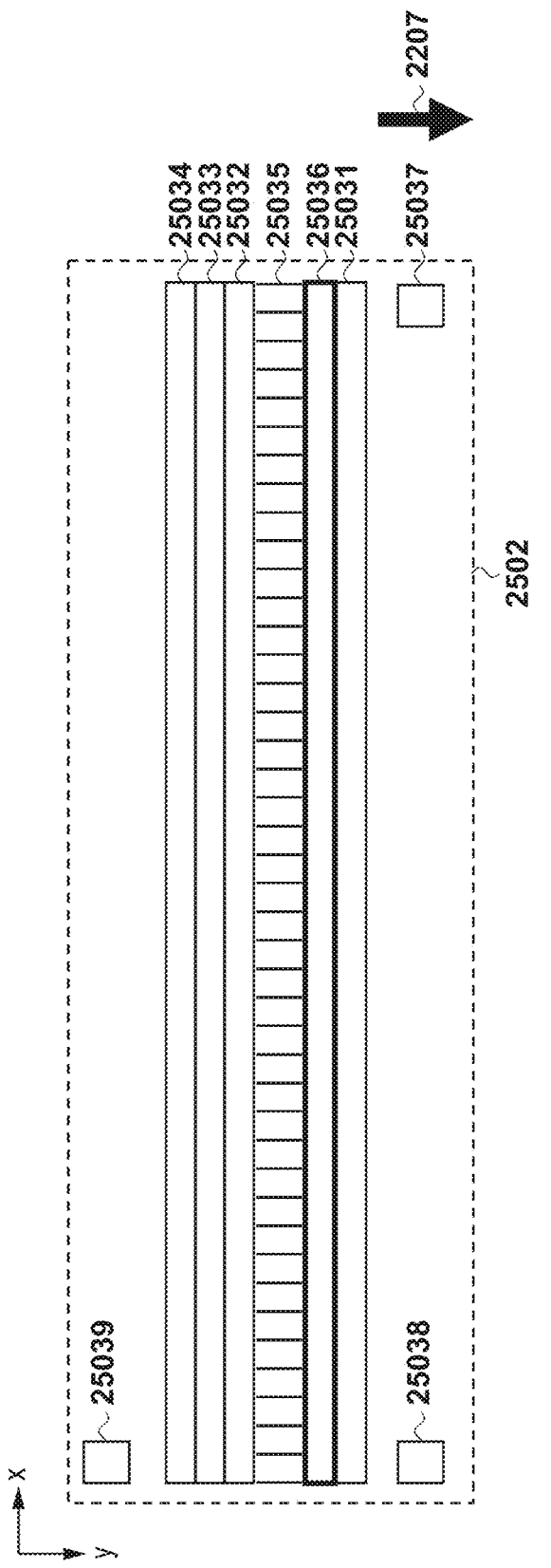
FIG. 41A is a view showing an example of a header image.
Figure 41B:
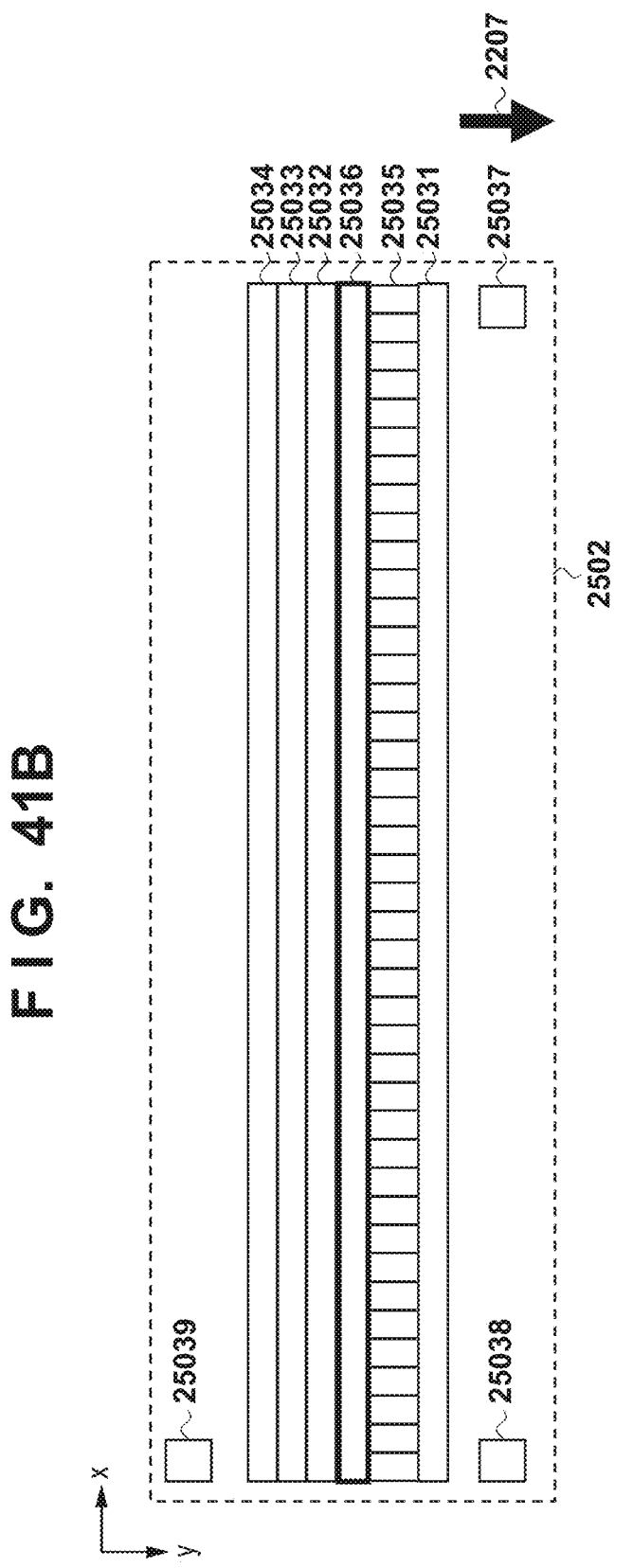
FIG. 41B is a view showing an example of a header image.
Figure 41C:
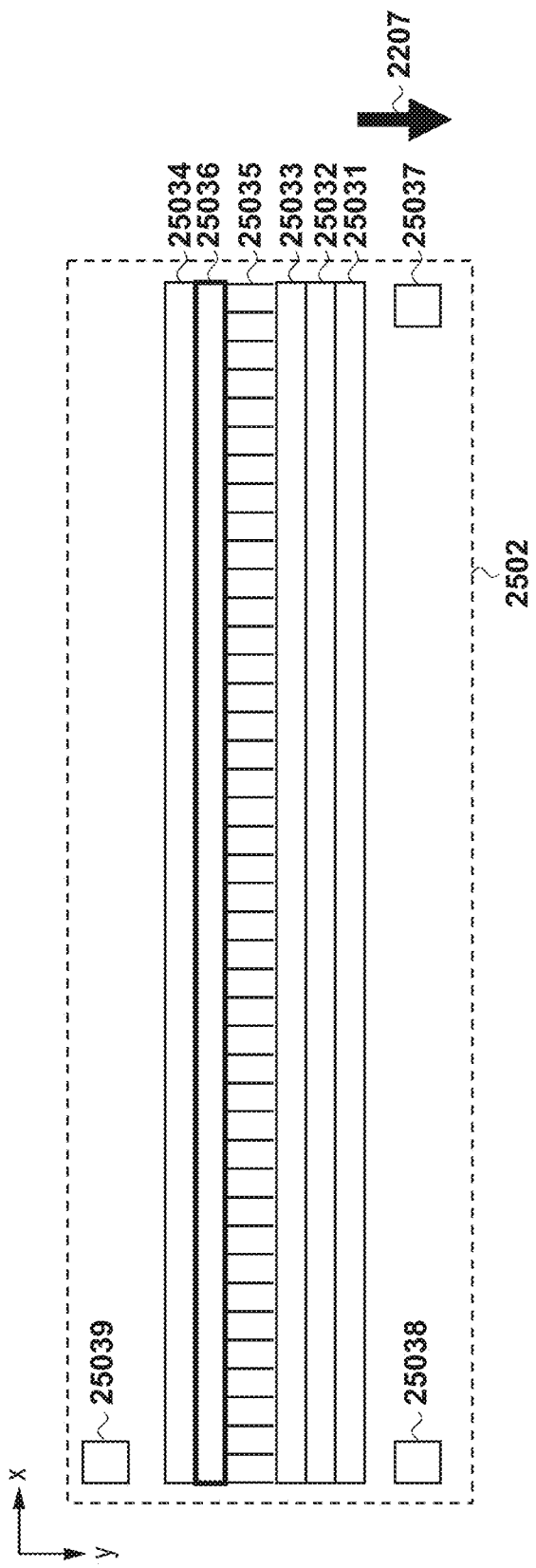
FIG. 41C is a view showing an example of a header image.
Figure 41D:
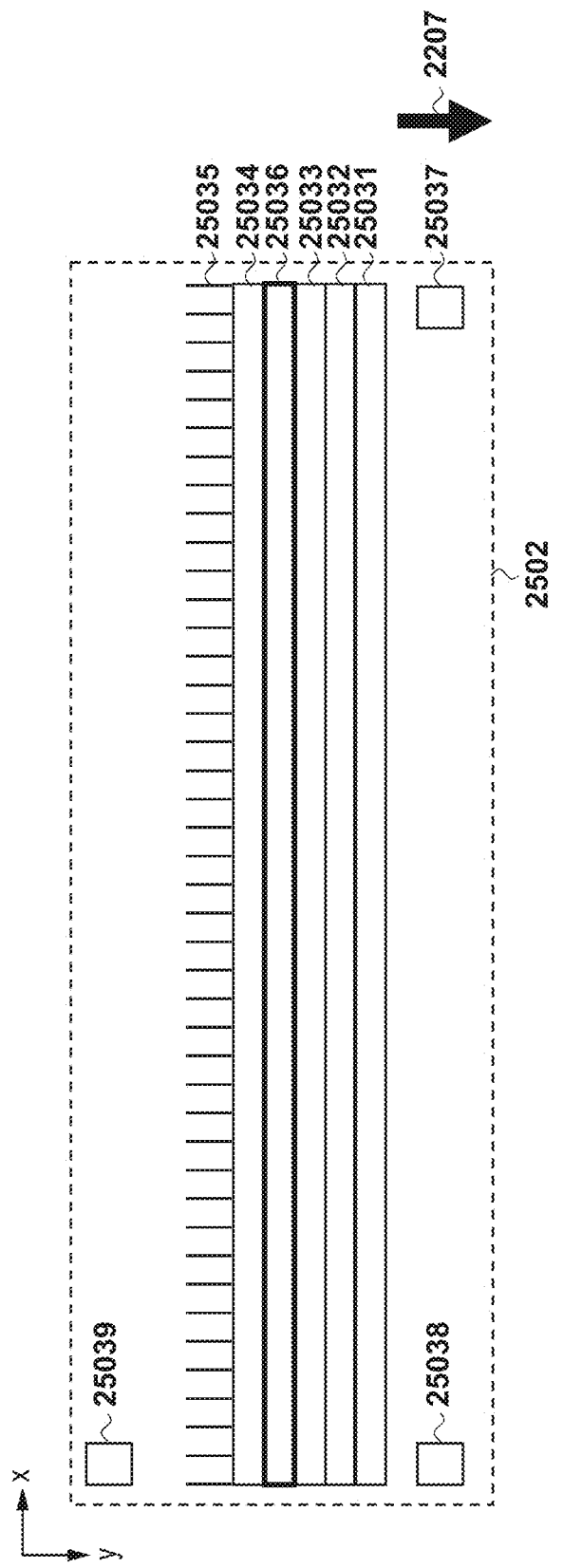
FIG. 41D is a view showing an example of a header image.

For example, as shown in FIGS. 41A to 41C, the line pattern region 25035 and the tone data acquisition region 25036 may be formed at positions to cut into the preliminary discharge regions 25031 to 25034. Alternatively, as shown in FIG. 41D, only the tone data acquisition region 25036 may be formed to cut into the preliminary discharge regions.

In any case, to suppress the influence of condensed ink, the line pattern region and the tone data acquisition region are preferably arranged such that these are formed after the preliminary discharge region of the ink color that forms the two regions.

For example, if the line pattern region 25035 and the tone data acquisition region 25036 are formed by the same color as the preliminary discharge region 25031, tone data after preliminary discharge can be acquired even using any one of the header images shown in FIGS. 41A to 41D.

Alternatively, tone data can be acquired even by using the header image shown in FIGS. 25D and 31.

On the other hand, for example, if the regions are formed by the same color as the preliminary discharge region 25033, the header image shown in FIG. 41C or FIGS. 25D and 31 is preferably used.

As described above, if the header images shown in FIGS. 41A to 41D are used, the tone data acquisition region is formed immediately after preliminary discharge. Hence, the influence of more condensed ink can be eliminated. On the other hand, in the header image shown in FIGS. 25D and 31, the arrangement of the header image need not be changed for each ink to be formed, and particularly, processing of acquiring characteristic data from a read image is facilitated.

In the examples shown in FIGS. 25D and 31 and FIGS. 41A to 41C, the line pattern region 25035 and the tone data acquisition region 25036 are adjacent. This is preferable because, particularly, if the conveyance error of paper is large, the correspondence between a read position and a nozzle position can accurately be estimated. At this time, the preliminary discharge regions 25031 to 25034, the line pattern region 25035, and the tone data acquisition region 25036 are preferably set to substantially the same width and height on the sheet surface because processing of extracting each region from the read image can be made common.

According to the present invention, it is possible to perform necessary correction processing for a temporal change of density-unevenness, thereby suppressing lowering of image quality and productivity.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus for generating image data for recording in an image forming apparatus including an image forming unit including a plurality of nozzles configured to discharge ink, comprising:
a converting unit configured to convert, based on characteristic information according to a characteristic of each nozzle included in the image forming unit, image data corresponding to an input print job into image data to be used for recording by the image forming unit; and
a control unit configured to execute a plurality of correction processes selectively based on image data obtained by reading an image recorded by the image forming unit,
wherein the plurality of correction processes include first correction processing that is performed after the recording of the image according to the print job is stopped, and second correction processing that is performed without stopping the recording of the image according to the print job.

2. The image processing apparatus according to claim 1, wherein
the first correction processing is correction processing including updating of the characteristic information, and
the second correction processing is correction processing that does not include updating of the characteristic information.

3. The image processing apparatus according to claim 1, wherein
the first correction processing is correction processing including updating of a target characteristic of a nozzle, which is used by the converting unit, and
the second correction processing is correction processing that does not include updating of the target characteristic.

4. The image processing apparatus according to claim 1, further comprising:
a holding unit for holding the characteristic information according to a characteristic of each nozzle included in the image forming unit;
wherein the first correction processing includes recording processing of a preset chart for correction by the image forming unit, and processing of generating new characteristic information from image data obtained by reading, by a reading unit, an image of the chart recorded by the recording and updating, by the new characteristic information, the characteristic information held by the holding unit, and
the second correction processing includes recording processing of the image data of the print job by the image forming unit, processing of specifying a nozzle position at which a color difference between a target color obtained by the image data before the recording and a color obtained by the image data after the recording, which is obtained by recording the image by a reading unit exceeds a threshold and obtaining a correction coefficient, and processing of updating a part of the characteristic information held by the holding unit in accordance with the position of the nozzle and the correction coefficient.

5. An image processing method for generating image data for recording in an image forming apparatus including an image forming unit including a plurality of nozzles configured to discharge ink, comprising:
a converting step of converting, based on characteristic information according to a characteristic of each nozzle included in the image forming unit, image data corresponding to an input print job into image data to be used for recording by the image forming unit; and
a control step of executing a plurality of correction processes selectively based on image data obtained by reading an image recorded by the image forming unit,
wherein the plurality of correction processes include first correction processing that is performed after the recording of the image according to the print job is stopped, and second correction processing that is performed without stopping the recording of the image according to the print job.

6. A non-transitory computer-readable storage medium storing a program which, when read and executed by a computer, causes the computer to execute the steps of an image processing method for generating image data for recording in an image forming apparatus including an image forming unit including a plurality of nozzles configured to discharge ink, the program comprising:
a converting step of converting, based on characteristic information according to a characteristic of each nozzle included in the image forming unit, image data corresponding to an input print job into image data to be used for recording by the image forming unit; and
a control step of executing a plurality of correction processes based on image data obtained by reading an image recorded by the image forming unit,
wherein the plurality of correction processes include first correction processing that is performed after the recording of the image according to the print job is stopped, and second correction processing that is performed without stopping the recording of the image according to the print job.

* * * * *